(12) United States Patent
Mowris et al.

(10) Patent No.: US 11,175,060 B2
(45) Date of Patent: Nov. 16, 2021

(54) FAN-ON DETECTION AND CORRECTION

(71) Applicants: Robert J. Mowris, Olympic Valley, CA (US); John M. Walsh, Bozeman, MT (US)

(72) Inventors: Robert J. Mowris, Olympic Valley, CA (US); John M. Walsh, Bozeman, MT (US)

(*) Notice: Subject to any disclaimer, the term of this patent is extended or adjusted under 35 U.S.C. 154(b) by 0 days.

(21) Appl. No.: 16/909,752

(22) Filed: Jun. 23, 2020

(65) Prior Publication Data

US 2020/0326088 A1 Oct. 15, 2020
US 2021/0199329 A9 Jul. 1, 2021

Related U.S. Application Data

(63) Continuation-in-part of application No. 16/897,634, filed on Jun. 10, 2020, now Pat. No. 11,029,057,
(Continued)

(51) Int. Cl.
*F24F 11/00* (2018.01)
*F24F 11/46* (2018.01)
(Continued)

(52) U.S. Cl.
CPC .............. *F24F 11/46* (2018.01); *F24F 11/56* (2018.01); *F24F 11/61* (2018.01); *F24F 11/64* (2018.01); *F24F 11/65* (2018.01); *F24F 11/74* (2018.01); *F24F 11/77* (2018.01); *G05B 19/042* (2013.01); *F24F 2011/0006* (2013.01); *F24F 2110/10* (2018.01); *F24F 2110/12* (2018.01);
(Continued)

(58) Field of Classification Search
None
See application file for complete search history.

(56) References Cited

U.S. PATENT DOCUMENTS 4,404,815 A  9/1983 Gilson
5,447,037 A  9/1995 Bishop
(Continued)

OTHER PUBLICATIONS

US 8,702,402 B1, 04/2014, Helt (withdrawn)
(Continued)

*Primary Examiner* — Paul B Yanchus, III
(74) *Attorney, Agent, or Firm* — Averill & Green; Kenneth L Green

(57) ABSTRACT

A fan-on Fault Detection Diagnostic (FDD) and correction method comprising at least one method selected from the group consisting of: detecting a Heating, Ventilating, Air Conditioning (HVAC) fan is controlled by a fan-on duration setting or a continuous or intermittent fan-on duration setting or schedule, and performing at least one action selected from the group consisting of: providing at least one fan-on alarm message, overriding the fan-on duration setting or the fan-on duration schedule, and turning off the HVAC fan for a fraction of the fan-on duration setting or schedule. Turning off the HVAC fan is based on at least one method selected from the group consisting of: a variable duration, skipping a scheduled fan-on duration setting, based on a call for cooling/heating, based on a geofencing or occupancy sensor signal, and based on a user-selected fan-on duration setting or a user-selected fan-off duration schedule.

21 Claims, 12 Drawing Sheets

Related U.S. Application Data which is a continuation-in-part of application No. 16/882,222, filed on May 22, 2020, now Pat. No. 11,029,061, which is a continuation-in-part of application No. 16/869,396, filed on May 7, 2020, now Pat. No. 11,022,335, which is a continuation-in-part of application No. 16/565,464, filed on Sep. 9, 2019, which is a continuation-in-part of application No. 16/289,313, filed on Feb. 28, 2019, now Pat. No. 10,712,036, which is a continuation-in-part of application No. 15/614,600, filed on Jun. 5, 2017, now Pat. No. 10,281,938, which is a continuation-in-part of application No. 15/358,131, filed on Nov. 22, 2016, now Pat. No. 9,671,125, said application No. 16/869,396 is a continuation-in-part of application No. 16/011,120, filed on Jun. 18, 2018, now Pat. No. 10,663,186, which is a continuation-in-part of application No. 15/169,586, filed on May 31, 2016, now Pat. No. 10,001,289.

(60) Provisional application No. 62/728,518, filed on Sep. 7, 2018.

(51) Int. Cl.

| | | |
|---|---|---|
| *F24F 11/61* | (2018.01) | |
| *F24F 11/64* | (2018.01) | |
| *F24F 11/65* | (2018.01) | |
| *F24F 11/74* | (2018.01) | |
| *F24F 11/77* | (2018.01) | |
| *G05B 19/042* | (2006.01) | |
| *F24F 11/56* | (2018.01) | |
| F24F 110/10 | (2018.01) | |
| F24F 110/12 | (2018.01) | |
| F24F 110/50 | (2018.01) | |
| F24F 110/52 | (2018.01) | |
| F24F 110/64 | (2018.01) | |
| F24F 110/66 | (2018.01) | |
| F24F 120/10 | (2018.01) | |
| F24F 140/60 | (2018.01) | |
| F24F 110/70 | (2018.01) | |

(52) U.S. Cl.
CPC ....... *F24F 2110/50* (2018.01); *F24F 2110/52* (2018.01); *F24F 2110/64* (2018.01); *F24F 2110/66* (2018.01); *F24F 2110/70* (2018.01); *F24F 2120/10* (2018.01); *F24F 2140/60* (2018.01); *G05B 2219/2614* (2013.01)

(56) References Cited

U.S. PATENT DOCUMENTS

| | | | |
|---|---|---|---|
| 5,544,809 A | 8/1996 | Keating | |
| 5,996,898 A | 12/1999 | Parker | |
| 6,223,544 B1 | 5/2001 | Seem | |
| 6,415,617 B1 | 7/2002 | Seem | |
| 6,684,944 B1 | 2/2004 | Byrnes | |
| 6,695,046 B1 | 2/2004 | Byrnes | |
| 6,805,733 B2 | 10/2004 | Engel | |
| 7,444,251 B2 | 10/2008 | Nikovski | |
| 7,469,550 B2 | 12/2008 | Chapman, Jr. | |
| 7,500,368 B2 | 3/2009 | Mowris | |
| 7,632,178 B2 | 12/2009 | Meneely | |
| 8,066,558 B2 | 11/2011 | Thomle | |
| 8,195,335 B2 | 6/2012 | Kreft | |
| 8,651,391 B2 | 2/2014 | Patch | |
| 8,747,753 B2 | 6/2014 | Engel | |
| 8,965,585 B2 | 2/2015 | Lombard | |
| 8,972,064 B2 | 3/2015 | Grabinger | |
| 9,435,557 B2 | 9/2016 | Albrecht | |
| 9,500,382 B2 | 11/2016 | Grabinger | |
| 9,765,986 B2 | 9/2017 | Thomle | |
| 9,784,468 B2 | 10/2017 | Bisson | |
| 9,874,364 B2 | 1/2018 | Bujak, Jr. | |
| 10,060,642 B2 | 8/2018 | Sikora | |
| 2002/0090908 A1* | 7/2002 | Estepp | F24F 11/745 454/236 |
| 2003/0021720 A1* | 1/2003 | Reisfeld | A61L 9/20 422/4 |
| 2005/0005616 A1* | 1/2005 | Bates | F24F 3/166 62/77 |
| 2006/0219382 A1* | 10/2006 | Johnson | B60H 1/00757 165/11.1 |
| 2007/0261422 A1 | 11/2007 | Crawford | |
| 2009/0032236 A1* | 2/2009 | Geadelmann | F24F 11/30 165/270 |
| 2009/0126382 A1* | 5/2009 | Rubino | F24F 3/166 62/259.1 |
| 2010/0105311 A1 | 4/2010 | Meneely | |
| 2011/0160914 A1 | 6/2011 | Kennett | |
| 2011/0190910 A1 | 8/2011 | Lombard | |
| 2014/0195106 A1* | 7/2014 | Mcquade | G07C 5/0841 701/33.9 |
| 2015/0204571 A1 | 7/2015 | Messmer | |
| 2015/0309120 A1 | 10/2015 | Bujak, Jr. | |
| 2016/0116177 A1 | 4/2016 | Sikora | |
| 2017/0299212 A1* | 10/2017 | Svitak | F24F 11/0001 |

OTHER PUBLICATIONS

American National Standards Institute (ANSI)/American Society of Heating, Refrigerating and Air-Conditioning Engineers, Inc. (ASHRAE)/Illuminating Engineering Society (IES), ANSI/ASHRAE/IES. Standard 90.1-2013 Energy Standard for Buildings Except Low-Rise Residential Buildings. pp. 278. Date: 2013. Published by ASHRAE Inc., 1791 Tullie Cir NE, Atlanta, GA 30329 USA.

Honeywell. Jade Economizer Module (Model W7220). pp. 32. Date: 2018. Published by Honeywell, Golden Valley, MN 55422, USA.

Belimo. Belimo ZIP Economizer™ Installation and Operation Manual. pp. 54. Date: Jan. 30, 2020. Belimo Americas, 33 Turner Rd., Danbury, CT 06810, USA.

Pelican Wireless Systems, Installation Guide Pearl Economizer Controller (WM500 Manual), Date Feb. 10, 2016, pp. 36 pages, Pelican Wireless Systems, 2655 Collier Canyon Rd., Livermore, CA 94551. USA. https://www.pelicanwireless.com/wp-content/uploads/2016/04/InstallGuide_PEARL.pdf.

Venstar Inc., Venstar Commercial Thermostat T2900 Manual, Date: Dec. 21, 2010, pp. 113 p. Venstar Inc., 9250 Owensmouth Ave., Chatsworth, California 91311. USA. https://files.venstar.com/thermostats/slimline/documents/T2900ManualRev5.pdf. The.

Ecobee Inc., Energy Management System Manual, Date: Apr. 11, 2013, pp. 68 pages, Ecobee Inc., 25 Dockside Dr Suite 700, Toronto, ON M5A 0B5, Canada https://support.ecobee.com/hc/en-US/articles/360012061792-EMS-Guides-and-Manuals.

Carrier Corporation Inc., Totaline Gold Commercial Thermostat Installation and Operating Instructions. Date Nov. 1999. pp. 12, United Technologies Corporation, One Carrier Place, Farmington, CT 06034-4015 USA https://dms.hvacpartners.com/docs/1005/Public/08/P274-2SI.pdf.

Honeywell International Inc., TB8220 Commercial VisionPRO™ Programmable Thermostat, Date: Mar. 15, 2005, pp. 24, Honeywell International Inc., 1985 Douglas Drive North, Golden Valley, MN 55422 USA. https://customer.honeywell.com/resources/techlit/TechLitDocuments/63-0000s/63-2625.pdf.

California Energy Commission (CEC). 2008. 2008 Residential Appendices for the Building Energy Efficiency Standards for Residential and Nonresidential Buildings. CEC-400-2008-004-CMF. Date: Dec. 2008, pp. 363, Published by the California Energy Commission, 1516 9th St, Sacramento, CA 95814 USA. https://ww2.energy.ca.gov/2008publications/CEC-400-2008-004/CEC-400-2008-004-CMF.PDF.

(56) References Cited

OTHER PUBLICATIONS

Yuill, David P., Braun, James E., Evaluating Fault Detection and Diagnostics Protocols Applied to Air-Cooled Vapor Compression Air-Conditioners. Date: Jul. 16, 2012, pp. 11, International Refrigeration and Air Conditioning Conference. Paper 1307. Published by Ray W. Herrick Laboratories, Purdue University, 177 S Russell St,, West Lafayette, IN 47907 USA (Yuill 2012). http://docs.lib.purdue.edu/iracc/1307.

California Energy Commission (CEC). 2012. Reference Appendices The Building Energy Efficiency Standards for Residential and Nonresidential Buildings. CEC-400-2012-005-CMF-REV3. Date: May 2012, pp. 10, 146/001 476, Published by the California Energy Commission, 1516 9th St, Sacramento, CA 95814 USA (CEC 2012). https://ww2.energy.ca.gov/2012publications/CEC-400-2012-005/CEC-400-2012-005-CMF-REV3.pdf.

California Energy Commission (CEC). 2018. 2019 Building Energy Efficiency Standards for Residential and Nonresidential Buildings. CEC-400-2018-006-20-CMF, Date: Dec. 2018, pp. 325, Published by the California Energy Commission, 1516 9th St., Sacramento, CA 95814 USA. https://ww2.energy.ca.gov/2018publications/CEC-400-2018-020/CEC-400-2018-020-CMF.pdf.

Mowris, R., E. Jones, R. Eshom, K. Carlson, J. Hill, P. Jacobs, J. Stoops. 2016. Laboratory Test Results of Commercial Packaged HVAC Maintenance Faults. Prepared for the California Public Utilities Commission. Prepared by Robert Mowris & Associates, Inc. (RMA 2016). http://www.calmac.org/publications/RMA_Laboratory_Test_Report_2012-15_v3.pdf.

Hart R., D. Morehouse, W. Price. 2006. The Premium Economizer: An Idea Whose Time Has Come. pp. 13. Date Aug. 2006. Prepared by the Eugene Water & Electric Board and published by the American Council for an Energy Efficient Economy (ACEEE). Washington, DC (Hart 2006). See https://www.semanticscholar.org/paper/The-Premium-Economizer%3A-An-Idea-Whose-Time-Has-Come-Hart/3b8311bdf8cb40210ccabd0cec8906bda00d0fec.

S. Taylor, C. Cheng. Economizer High Limit Controls and Why Enthalpy Economizers Don't Work. 2010 (Taylor 2010). pp. 11. Date: Nov. 2010. ASHRAE Journal. 52. 12-28, Published by the American Society of Heating, Refrigerating and Air-Conditioning Engineers, Inc. (ASHRAE). See https://www.scribd.com/document/390134082/ASHRAE-Why-Enthalpy-Economizers-Don-t-Work-Taylor-Cheng.

California Energy Commission (CEC). 2016. Reference Appendices the Building Energy Efficiency Standards for Residential and Nonresidential Buildings. Date: Jun. 2015. pp. 503, CEC-400-2015-038-CMF, Published by the California Energy Commission, 1516 9th St, Sacramento, CA 95814. USA. https://ww2.energy.ca.gov/2015publications/CEC-400-2015-038/CEC-400-2015-038-CMF.pd.

Lutron. Residential Sensor Specification Guide. Date: Feb. 8, 2013. pp. 26. Lutron Electronics Company Inc., 7200 Suter Rd Coopersburg, PA 18036-1299 USA. USA https://www.lutron.com/TechnicalDocumentLibrary/3672236_Sensor_Spec_Guide.pdf.

Ecobee Inc., How to control your HVAC system's fan with your ecobee thermostat, Date: Jan. 13, 2020, p. 7, Published by Ecobee Inc., 25 Dockside Dr., Suite 700, Toronto, ON M5A 0B5, Canada, https://support.ecobee.com/hc/en-us/articles/360004798951-How-to-control-your-HVAC-system-s-fan-with-your-ecobee-thermostat.

Google Inc. How to Control Your Fan with a Nest Thermostat, Date: Dec. 30, 2019, pp. 4, Published by Google, Inc. 1600 Amphitheatre Parkway, Mountain View, CA 94043 USA. https://support.google.com/googlenest/answer/9296419?hl=en.

Lawrence Berkeley National Laboratory (LBNL) and J. Hirsch. DOE-2.2 Building Energy Use and Cost Analysis Program vol. 2: Dictionary, Date: Feb. 2014, pp. 522, E. O. Lawrence Berkeley National Laboratory Simulation Research Group, Berkeley, California 94720 USA. http://doe2.com/download/doe-22/DOE22Vol2-Dictionary_48r.pdf.

Carrier Corporation. HVAC Servicing Procedures. SK29-01A, 020-040. Date: 1997. pp. 8 (Cover, preface, and pp. 145-150). Published by Carrier Corporation, 13995 Pasteur Blvd., Palm Beach Gardens, Florida 33418 USA.

* cited by examiner

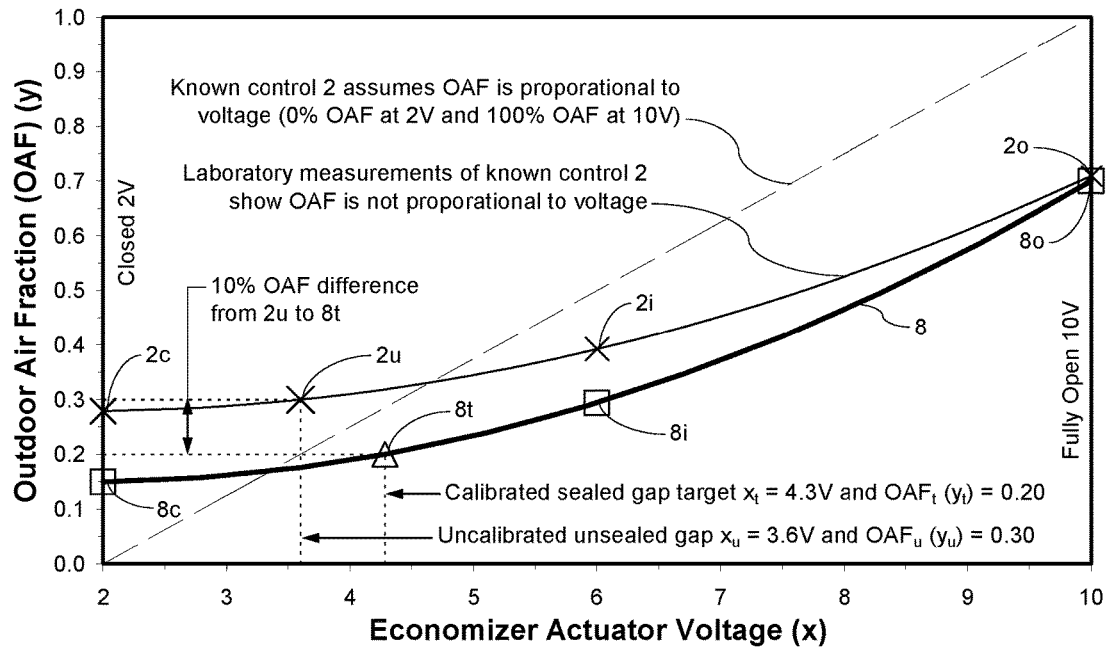

*FIG. 5*

| Calibrated and sealed gap 8 | $x_i$ (Volts) | $y_i$ (OAF) | Uncalibrated unsealed gap 2 | $x_i$ (Volts) | $y_i$ (OAF) |
|---|---|---|---|---|---|
| 8c Closed OAF | 2.0 | 0.15 | 2c Closed OAF | 2.0 | 0.279 |
| 8t Target $OAF_t$ ($y_t$) Eq. 19 | 4.3 | 0.20 | 2u Uncalibrated $OAF_u$ ($y_u$) | 3.6 | 0.30 |
| 8i Intermediate OAF | 6.0 | 0.294 | 2i Intermediate OAF | 6.0 | 0.392 |
| 8o Fully open OAF | 10.0 | 0.70 | 2o Fully open OAF | 10.0 | 0.709 |

Eq. 7 $\quad y_i = a x_i^2 + b x_i + c = 0.0082 x_i^2 - 0.0292 x_i + 0.1755$

Eq. 9 $\quad \begin{bmatrix} x_{11} & x_{12} & x_{13} \\ x_{21} & x_{22} & x_{23} \\ x_{31} & x_{32} & x_{33} \end{bmatrix} \begin{bmatrix} c_{11} \\ c_{21} \\ c_{31} \end{bmatrix} = \begin{bmatrix} y_{11} \\ y_{21} \\ y_{31} \end{bmatrix} = \begin{bmatrix} \sum x_i^4 & \sum x_i^3 & \sum x_i^2 \\ \sum x_i^3 & \sum x_i^2 & \sum x_i \\ \sum x_i^2 & \sum x_i & n \end{bmatrix} \begin{bmatrix} a \\ b \\ c \end{bmatrix} = \begin{bmatrix} \sum x_i^2 y_i \\ \sum x_i y_i \\ \sum y_i \end{bmatrix} = \begin{bmatrix} 11312 & 1224 & 140 \\ 1224 & 140 & 18 \\ 140 & 18 & 3 \end{bmatrix} \begin{bmatrix} a \\ b \\ c \end{bmatrix} = \begin{bmatrix} 81.19 \\ 9.064 \\ 1.144 \end{bmatrix}$ $\underbrace{\phantom{XXX}}_{X} \quad \underbrace{\phantom{C}}_{C} \quad \underbrace{\phantom{Y}}_{Y} \qquad \underbrace{\phantom{XXX}}_{X} \quad \underbrace{\phantom{C}}_{C} \quad \underbrace{\phantom{Y}}_{Y} \qquad \underbrace{\phantom{XXX}}_{X} \quad \underbrace{\phantom{C}}_{C} \quad \underbrace{\phantom{Y}}_{Y}$ Eq. 11 $\quad C = \begin{bmatrix} a \\ b \\ c \end{bmatrix} = \begin{bmatrix} c11 \\ c21 \\ c31 \end{bmatrix} = X^{-1} Y = \begin{bmatrix} 0.0059 & -0.0703 & 0.1484 \\ -0.0703 & 0.8750 & -1.9688 \\ 0.1484 & -1.9688 & 5.2188 \end{bmatrix} \begin{bmatrix} 81.19 \\ 9.064 \\ 1.144 \end{bmatrix} = \begin{bmatrix} 0.0082 \\ -0.0292 \\ 0.1755 \end{bmatrix}$ Eq. 19 $\quad x_t = \dfrac{-b + \sqrt{b^2 - [4a(c - y_t)]}}{2a} = \dfrac{0.0292 + \sqrt{(-0.0292)^2 - [4(0.0082)(0.1755 - 0.2)]}}{2(0.0082)} = 4.3V$

*FIG. 6*

| Known Prior Art HST or Deadband Fault | Known Prior Art CZ06 kWh/yr | FDD CDC CZ06 kWh/yr | FDD CDC CZ06 Savings | Known Prior Art CZ13 kWh/yr | FDD CDC CZ13 kWh/yr | FDD CDC CZ13 Savings | Known Prior Art CZ15 kWh/yr | FDD CDC CZ15 kWh/yr | FDD CDC CZ15 Savings |
|---|---|---|---|---|---|---|---|---|---|
| Default 62F HST | 10,479 | 7,981 | 23.8% | 27,307 | 25,604 | 6.2% | 59,697 | 58,049 | 2.8% |
| -1F HST deadband | 8,065 | 7,981 | 1.0% | 25,579 | 25,604 | -0.1% | 58,006 | 58,049 | -0.1% |
| -2F HST deadband | 8,172 | 7,981 | 2.3% | 25,590 | 25,604 | -0.1% | 58,018 | 58,049 | -0.1% |
| Average | 9,277 | 7,981 | 12.5% | 26,444 | 25,604 | 3.1% | 58,852 | 58,049 | 1.3% |

FIG. 7

| OAT (F) a | Economizer heat removal $Q_e$ Btu b | Occupied Sensible cooling load $Q_i$ Btu c | Room air volume heat $Q_v$ Btu d | DX AC coil sensible cooling $Q_{sc}$ Btu e | Exceeds time delay or dead band? F | Net DX AC sensible capacity $Q_{sc}$ Btu g=e+b+c | DOE-2 DX AC kWh $e_{ac}$ h | Corrected DOE-2 DX AC energy kWh $e_c$ i=h*(1-d/g) | Occupied FDD CDC cooling savings $\Delta e_{FT}$ j=1-h/i |
|---|---|---|---|---|---|---|---|---|---|
| 63 | 63,302 | -61,636 | -2,285 | 3,824 | Yes | 5,489 | 0.33 | 0.46 | 29.4% |
| 64 | 57,621 | -58,101 | -2,285 | 6,297 | Yes | 5,816 | 0.50 | 0.70 | 28.2% |
| 65 | 51939 | -56972 | -2,285 | 11529 | Yes | 6,496 | 0.94 | 1.27 | 26.0% |
| 66 | 46258 | -58755 | -2,285 | 19723 | Yes | 7,226 | 1.67 | 2.19 | 24.0% |
| 67 | 40576 | -59721 | -2,285 | 27013 | Yes | 7,868 | 2.18 | 2.82 | 22.5% |
| 68 | 34895 | -56470 | -2,285 | 31190 | Yes | 9,614 | 2.43 | 3.00 | 19.2% |
| 69 | 29213 | -58713 | -2,285 | 39373 | Yes | 9,873 | 3.17 | 3.90 | 18.8% |
| 70 | 23532 | -54389 | -2,285 | 41930 | Yes | 11,072 | 3.44 | 4.15 | 17.1% |
| 71 | 17850 | -54763 | -2,285 | 49015 | Yes | 12,103 | 3.63 | 4.31 | 15.9% |
| 72 | 12168 | -59245 | -2,285 | 60610 | Yes | 13,533 | 4.53 | 5.29 | 14.4% |
| 73 | 6487 | -56268 | -2,285 | 64113 | Yes | 14,331 | 4.93 | 5.72 | 13.8% |
| 74 | 805 | -51190 | -2,285 | 64603 | Yes | 14,219 | 5.13 | 5.96 | 13.8% |
| 75 | -4876 | -54363 | -2,285 | 72883 | Yes | 13,643 | 5.86 | 6.84 | 14.3% |

FIG. 8

| OAT (F) a | Economizer heat removal $Q_e$ Btu b | Unoccupied sensible cooling load $Q_i$ Btu c | Room air volume heat $Q_v$ Btu d | DX AC coil sensible cooling $Q_{sc}$ Btu e | Exceeds time delay or dead band? F | Net DX AC sensible capacity $Q_{sc}$ Btu g=e+b+c | DOE-2 DX AC kWh $e_{ac}$ h | Corrected DOE-2 DX AC energy kWh $e_c$ i=h*(1-d/g) | Unoccupied FDD CDC cooling savings $\Delta e_{FT}$ j=(i-h)/i |
|---|---|---|---|---|---|---|---|---|---|
| 69 | 29,213 | -23,686 | -2,285 | 6,451 | Yes | 11,978 | 0.60 | 0.72 | 16.0% |
| 70 | 23,532 | -20,638 | -2,285 | 9,606 | Yes | 12,500 | 0.88 | 1.04 | 15.5% |
| 71 | 17850 | -22049 | -2,285 | 17381 | Yes | 13,182 | 1.59 | 1.86 | 14.8% |
| 72 | 12168 | -23118 | -2,285 | 24637 | Yes | 13,687 | 2.34 | 2.73 | 14.3% |
| 73 | 6487 | -21167 | -2,285 | 29737 | Yes | 15,057 | 2.75 | 3.16 | 13.2% |
| 74 | 805 | -21043 | -2,285 | 36007 | Yes | 15,770 | 3.36 | 3.85 | 12.7% |
| 75 | -4876 | -21925 | -2,285 | 42895 | Yes | 16,095 | 4.21 | 4.81 | 12.4% |

FIG. 9

| Description | OAT (F) [a] | Total power (W) [b] | Sensible cooling (Btuh) [c] | Sensible (EER*) [d=c/b] | Economizer only cooling savings (%) [e] | FDD CDC cooling savings (%) [f] |
|---|---|---|---|---|---|---|
| 1st-stage AC compressor | 95 | 5,684 | 20,485 | 3.60 | | |
| 1st + 2nd-stage AC compressor | 95 | 8,987 | 53,195 | 5.92 | | 39.1% |
| 1st-stage AC compressor | 82 | 5,103 | 21,532 | 4.22 | | |
| 1st + 2nd-stage AC compressor | 82 | 7,845 | 52,707 | 6.72 | | 37.2% |
| Economizer fan only | 70 | 1,539 | 5,015 | 3.26 | | |
| Economizer + 1st-stage AC | 70 | 4,586 | 35,264 | 7.69 | | |
| Economizer +1st+2nd-stage AC | 70 | 6,989 | 62,863 | 8.99 | | 14.5% |
| Economizer fan only | 65 | 1,550 | 12,989 | 8.38 | -25.3% | |
| Economizer + 1st-stage AC | 65 | 4,446 | 43,053 | 9.68 | | |
| Economizer +1st+2nd-stage AC | 65 | 6,651 | 69,813 | 10.50 | | 7.7% |
| Economizer fan only | 60 | 1,585 | 20,697 | 13.06 | 11.5% | |
| Economizer + 1st-stage AC | 60 | 4,342 | 49,245 | 11.34 | | |
| Economizer +1st+2nd-stage AC | 60 | 6,341 | 73,295 | 11.56 | | 1.9% |
| Economizer fan only | 55 | 1,583 | 28,942 | 18.28 | 27.3% | |
| Economizer + 1st-stage AC | 55 | 4,205 | 55,897 | 13.29 | | |
| Economizer +1st+2nd-stage AC | 55 | 6,052 | 79,444 | 13.13 | | -1.3% |

*FIG. 12*

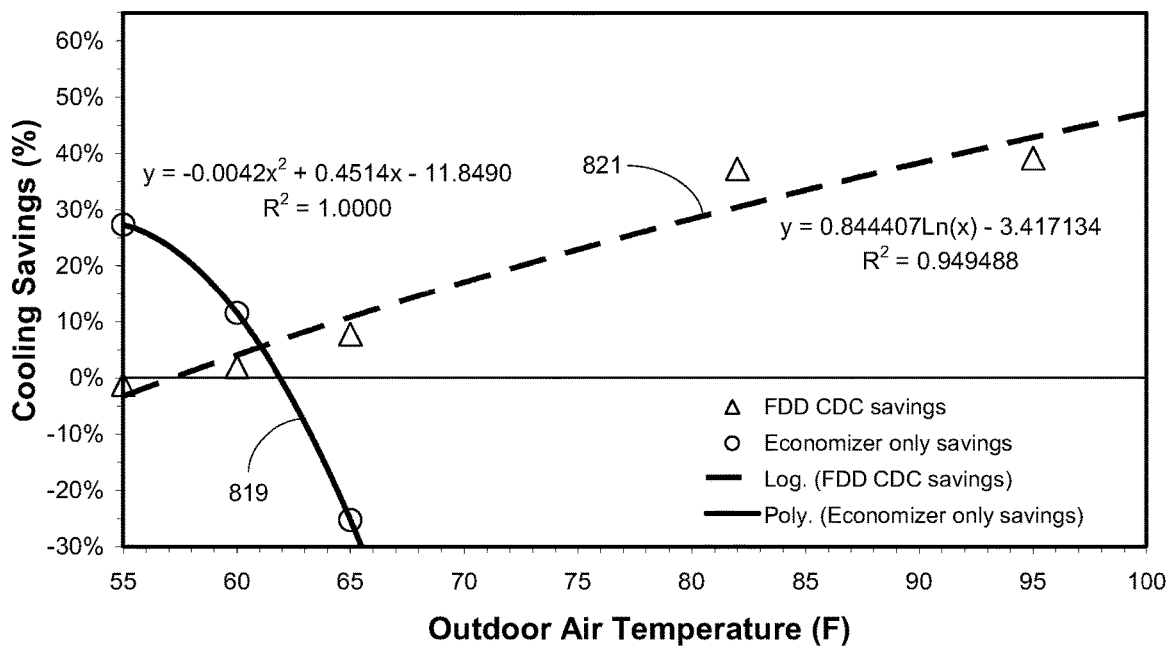

*FIG. 13*

FAN-ON DETECTION AND CORRECTION

CROSS-REFERENCE TO RELATED APPLICATIONS

The present application is a Continuation In Part of U.S. patent application Ser. No. 16/882,222 filed May 22, 2020, which is a Continuation In Part of U.S. patent application Ser. No. 16/869,396 filed May 7, 2020, which is a Continuation In Part of U.S. patent application Ser. No. 16/289,313 filed Feb. 28, 2019, which is a Continuation In Part of U.S. patent application Ser. No. 15/614,600 filed Jun. 5, 2017, which is a Continuation In Part of U.S. patent application Ser. No. 15/358,131 filed Nov. 22, 2016, the present application claiming the priority of the above applications which are incorporated in their entirety herein by reference. The present application is also a Continuation In Part of U.S. patent application Ser. No. 16/897,634 filed Jun. 10, 2020, which is a Continuation In Part of U.S. patent application Ser. No. 16/882,222 filed May 22, 2020, which is a Continuation In Part of U.S. patent application Ser. No. 16/869,396 filed May 7, 2020, which is a Continuation In Part of U.S. patent application Ser. No. 16/565,464 filed Sep. 9, 2019 which claims the priority of U.S. Provisional Patent Application Ser. No. 62/728,518 filed Sep. 7, 2018, and the U.S. patent application Ser. No. 16/565,464 filed Sep. 9, 2019 is a Continuation In Part of U.S. patent application Ser. No. 16/289,313 filed Feb. 28, 2019, which is a Continuation In Part of U.S. patent application Ser. No. 15/614,600 filed Jun. 5, 2017, which is a Continuation In Part of U.S. patent application Ser. No. 15/358,131 filed Nov. 22, 2016, and U.S. patent application Ser. No. 16/869,396 filed May 7, 2020, is a Continuation In Part of U.S. patent application Ser. No. 16/011,120 filed Jun. 18, 2018, which is a Continuation In Part of U.S. patent application Ser. No. 15/169,586 filed May 31, 2016.

BACKGROUND OF THE INVENTION

The present invention relates to a Heating, Ventilating, and Air Conditioning (HVAC) system.

Known prior art economizers include an economizer frame that connects to a HVAC system cabinet, a supply damper assembly to provide an economizer cooling and an outdoor airflow ventilation to maintain indoor air quality, a relief damper assembly to provide airflow from the building to relieve the internal air pressure and balance the supply airflow, an economizer controller, an economizer actuator to position the economizer supply and return dampers using a coupling mechanism (i.e., gears, levers, rack and pinion, etc.), and sensors to measure air temperature, relative humidity and/or Carbon Dioxide ($CO_2$) concentration in parts per million (ppm) for an outdoor airflow, a return airflow, a supply airflow, and a mixed airflow.

Buildings are required to provide a minimum flow of outdoor air into their HVAC systems per the American Society of Heating Refrigeration and Air-Conditioning Engineers (ASHRAE) Standard 62.1 (ANSI/ASHRAE 62.1-2019. Standard Ventilation for Acceptable Indoor Air Quality) and the 2019 California Energy Commission (CEC) Building Energy Efficiency Standards for Residential and Nonresidential Buildings (https://ww2.energy.ca.gov/2018publications/CEC-400-2018-020/CEC-400-2018-020-C MF.pdf). When the outdoor airflow exceeds the minimum required airflow during severe weather (also referred to as the target minimum airflow), the additional airflow may introduce unnecessary hot outdoor air when the HVAC system is cooling the building, or introduce unnecessary cold outdoor air when the HVAC system is heating the building. During severe weather, this unnecessary or unintended outdoor airflow reduces space cooling and heating capacity and efficiency and increases cooling and heating energy consumption and the energy costs required to provide space cooling and heating to building occupants.

Known prior art economizer controllers fully open an economizer damper to provide a maximum amount of outdoor air to cool the building without using Direct Expansion (DX) refrigerant-based Air Conditioning (AC) during cool weather when the Outdoor Air Temperature (OAT) is cooler than the Conditioned Space Temperature (CST) and the OAT is less than an economizer drybulb setpoint temperature referred to as a High-limit Shut-off Temperature (HST) or the outdoor air enthalpy is less than the enthalpy setpoint. During moderate weather when the OAT is less than the CST, but greater than the HST or the outdoor air enthalpy is greater than the enthalpy setpoint typically 28 British thermal units (Btu) per pound mass (lbm) of dry air (da) (Btu/lbm), the economizer damper is set to a minimum outdoor air position and one or more DX AC compressors are used to provide cooling to the building without economizer cooling.

Known methods for measuring the amount of outdoor airflow introduced into buildings to meet minimum requirements are inaccurate and better methods are required to improve thermal comfort of occupants, reduce cooling and heating energy use, and improve energy efficiency. Known methods for cooling the building with economizers are inefficient and better methods are required to improve thermal comfort of occupants, reduce cooling energy use, and improve energy efficiency.

Non-patent publication by the American Society of Heating, Refrigerating and Air-Conditioning Engineers, Inc. (ASHRAE) "ANSI/ASHRAE/IEE Standard 90.1-2007, Energy Standard for Buildings Except Low-Rise Residential Buildings." Pages 25. Date: August 2010. Published by ASHRAE Inc., 1791 Tullie Cir NE, Atlanta, Ga. 30329 USA. https://www.ashrae.org/File%20Library/Technical%20Resources/Standards%20and%20 Guidelines/Standards%20Addenda/90-1-2007/90_1_2007cy_co_dd_de_df.pdf. p. 3-4 section 6.5.1.1.3 discloses a "High-Limit Shutoff. All air economizers shall be capable of automatically reducing outdoor air intake to the design minimum outdoor air quantity when outdoor air intake will no longer reduce cooling energy usage. High-limit shutoff control types for specific climates shall be chosen from Table 6.5.1.1.3A. High-limit shutoff control settings for these control types shall be those listed in Table 6.5.1.1.3B." Table 6.5.1.1.3B (p. 4) provides the High-Limit Shut-off Temperature (HST) hereinafter referred to as the HST wherein the HST ranges from 70 F to 75 F for US climate zones. The HST is also referred to by Honeywell as the DRYBLB Set and by Belimo as the Single Dry Bulb Changeover temperature. Temperatures in degrees Fahrenheit are indicated by an "F" directly following a number and temperatures in degrees Celsius are indicated by a "C" directly following a number.

Non-patent publication by HONEYWELL INC., "JADE Economizer Module (JADE W7220)," Date: 2014, Pages: 32, Copyright 2018, HONEYWELL INC., Golden Valley, Minn. 55422, USA. https://customer.honeywell.com/resources/techlit/TechLitDocuments/63-0000s/63-2700.pdf. The HONEYWELL JADE W7220 controller receives a first-stage AC input (Y1-I), a second-stage AC Y2 input (Y2-I), and an occupancy sensor input (OCC). The JADE W7220 provides an economizer actuator 2-10 VDC output (AC 2-10) to control the supply/return dampers, a first-stage AC compressor (mechanical cooling) output (Y1-O), and a second-stage AC output (Y2-O). When the JADE W7220 receives a thermostat first-stage cooling signal, and OAT is 62 F or 1 F less then the HST (DRYBLB Set default 63 F), then the JADE W7220 provides a 10V signal to the economizer actuator (AC 2-10) to fully open the damper with only the HVAC fan operating. If Y1-I is energized and the OAT is "64 F and above," then the JADE W7220 will provide a 2.8V signal on the AC 2-10 output and energize the first-stage cooling signal output (Y1-O) to operate the first-stage AC compressor. According to the JADE W7220 manual "Setpoint determines where the economizer will assume outdoor air temperature is good for free cooling; e.g.; at 63 F setpoint unit will economizer at 62 F and below and not economize at 64 F and above. There is a 2 F deadband." The 1 F deadband below the HST (2 F deadband total) cannot be changed by a user input, and the 1 F deadband below HST increases cooling energy use by 1 to 5.2% depending on climate zone. Table 5 (Page 21) describes parameter "DRYBLB DIF Available firmware 1.15, June 2018, and later." If JADE W7220 DRYBLB DIF is set to default of 0 F for a 2-stage AC system and only Y1-I is energized, then the JADE W7220 will fully open damper and operate fan by itself and attempt to satisfy the thermostat call for cooling until the thermostat second-stage cooling signal is received and Y2-I is energized due to the call for cooling not being satisfied. Most commercial thermostats have a thermostat second-stage time delay of 2 to 60 minutes and a thermostat second-stage deadband temperature delay of 2 F to 10 F. While the economizer is attempting to cool the building, the fan will operate, but no AC compressor cooling will be provided unless the thermostat provides the second-stage cooling signal to energize Y2-I which only occurs if the CST is 3 F above the setpoint temperature (2 F above the differential) AND the Y1-I has been energized for 2 to 60 minutes. Page 23 of the Honeywell JADE W7220 manual describes a default Parameter "STG3 DLY" time delay parameter setting of 2 hours to energize the economizer second-stage cooling signal output to energize a second-stage AC compressor after receiving a thermostat second-stage cooling signal. The Honeywell JADE economizer second-stage time delay reduces thermal comfort and increases cooling system energy use by 3 to 15% due to operating the first-stage AC compressor for 120 minutes before energizing the second-stage AC compressor causing the CST to increase by 2 F to 10 F. The Honeywell JADE economizer controller provides specific temperature sensor inputs for the OAT and the Mixed Air Temperature (MAT), and SYLK BUS inputs for the Return Air Temperature (RAT) and the Supply Air Temperature (SAT).

Non-patent publication by BELIMO, "Belimo ZIP Economizer™ Installation and Operation Manual" (BELIMO ZIP MANUAL), Date: Jan. 1, 2020, Pages: 54, BELIMO, Danbury, Conn. 06810, USA. https://www.belimo.us/mam/americas/technical_documents/pdf-web/zip_economizer/zip_economizer_installation_operation_manual.pdf. BELIMO ZIP MANUAL page 34 discloses a Single Dry Bulb Changeover (similar to the ASHRAE 90.1 HST). The BELIMO ZIP HST is described as follows: "If only an OAT sensor is connected, it will be analyzed against the reference Outdoor Air changeover temperature value (based on entered ZIP code). IF OAT is 2° F. below the reference value THEN economizing will be enabled. IF OAT is above the reference value THEN economizing will be disabled." The BELIMO ZIP has a 2 F deadband delay and the HST is based on US ZIP codes mapped to the ASHRAE 90.1 climate HST climate zones per ASHRAE 90.1, California Title 24, and Canada NECB see BELIMO Page 34). The 2 F deadband below the HST cannot be changed by a user input, and the 2 F deadband below HST increases cooling energy use by 1 to 5.2% depending on climate zone. The BELIMO ZIP MANUAL page 34 also discloses a "Differential Dry Bulb Changeover" using OAT and RAT sensors analyzed against the reference Differential Temperature High Limit (DTHL) based on entered ZIP code. IF OAT is 4° F. below the RAT and OAT is 3° F. below the reference DTHL, then economizing will be enabled. IF OAT is greater than or equal to 2° F. below the RAT or the OAT is greater than the reference DTHL, then economizing will be disabled. When economizing the ZIP does not energize the AC Compressor output Y1 unless the thermostat second-stage cooling signal is energized which occurs after the CST is 3 F greater than the thermostat setpoint AND after a delay of 2 to 60 minutes (i.e., user input). Page 33 of the BELIMO ZIP MANUAL describes a default time delay to energize a second-stage cooling signal to energize a second-stage AC compressor after receiving a thermostat second-stage cooling signal. "If Y2 Limit is set to "On" compressor 2 is delayed by 240 seconds to evaluate if the single compressor already operating can bring SAT less than or equal to setpoint +1.5° F. (56.5° F.)." The Belimo ZIP economizer second-stage time delay reduces thermal comfort and increases cooling system energy use by 3 to 15% or more due to operating the first-stage AC compressor for a 4 minute delay before energizing the second-stage AC compressor causing the CST to increase by 2 F. The Belimo ZIP economizer controller does not provide a sensor input for the Mixed Air Temperature (MAT).

Non-patent publication by PELICAN WIRELESS SYSTEMS, Installation Guide Pearl Economizer Controller (WM500 MANUAL), Date: Feb. 10, 2016, Pages: 36 pages, Pelican Wireless Systems, 2655 Collier Canyon Rd. Livermore, Calif. 94551. USA. https://www.pelicanwireless.com/wp-content/uploads/2016/04/InstallGuide_PEARL.pdf. The PELICAN WM550 Manual provides installation instructions on pages 27-32. "The economizer sequence provides cool outside air to satisfy room cooling demand either by itself or in combination with mechanical cooling stages. The proprietary algorithm maximizes the use of free cooling and minimizes the use of mechanical cooling." The Pelican WM550 PEARL economizer controller does not provide a temperature sensor input for the Mixed Air Temperature (MAT).

Non-patent publication by Venstar Inc., Venstar Commercial Thermostat T2900 Manual, Date: Dec. 21, 2010, Pages: 113 pages, Venstar Inc., 9250 Owensmouth Ave, Chatsworth, Calif. 91311. USA. https://files.venstar.com/thermostats/slimline/documents/T2900ManualRev5.pdf. The Venstar Commercial Thermostat T2900 manual provides the following instructions for economizer operation. "ECONOMIZER OPERATION—If your HVAC unit is equipped with an economizer system, the thermostat will provide power to the MISC2 or MISC3 terminal of the thermostat when the thermostat is in an occupied time period. The MISC2 or MISC3 terminal will be de-energized when the thermostat is in an unoccupied time period. Y2 OPERATION—Section 13 Control up to two Cool stages. The 2nd Stage of heat or cool is turned on when: (A) The 1st Stage has been on for the time required (step #27, page 13.6). It is adjustable from 0-60 minutes and the default is two minutes. AND (B) The temperature spread from the setpoint is equal to or greater than: the setpoint plus the deadband (step #24, page 13.5), plus the 2nd deadband (step #25, page 13.5). This 2nd deadband is adjustable from 0-10 degrees and the default is two degrees." The Venstar T2900 thermostat does not energize the Y2 operation (for second-stage cooling) until BOTH the $1^{st}$ stage time (default 2 minutes) AND the $2^{nd}$ deadband (default 2 F) have been met. Temperatures in degrees Fahrenheit are indicated by an "F" directly following a number and temperatures in degrees Celsius are indicated by a "C" directly following a number.

Non-patent publication by Ecobee Inc., ENERGY MANAGEMENT SYSTEM Manual, Date: Apr. 11, 2013, Pages: 26 pages, Ecobee Inc., 25 Dockside Dr Suite 700, Toronto, ON M5A 0B5, Canada https://support.ecobee.com/hc/en-us/articles/360012061792-EMS-Guides-and-Manuals. Page 27 provides the following information: "Stage X Maximum Runtime The maximum amount of time X stage will run before engaging the next stage. Options are Auto and 10-120 minutes. Stage X Temperature Delta. The minimum difference between the current temperature and the set temperature that will activate this stage (regardless if the maximum run time of the previous stage was reached). Options are Auto and 1-10 F." The Ecobee EMS controller does not energize the Y2 Stage 2 operation (for second-stage cooling) until the Stage 1 temperature difference is met or a maximum runtime of 10 to 120 minutes has been met.

Non-patent publication by Carrier Corporation Inc., Totaline Gold Commercial Thermostat Installation and Operating Instructions. Date: November 1999. Pages: 12, United Technologies Corporation, One Carrier Place, Farmington, Conn. 06034-4015 USA https://dms.hvacpartners.com/docs/1005/Public/08/P274-251.pdf. Page 9 provides the following instructions. "ALLOW CONTINUOUS FAN DURING UNOCCUPIED HOURS (Configuration Number 20)—The fan can be configured by the user to run continuously (set to ON) or only during heating or cooling (set to AUTO). When the fan is set to ON (run continuously), the Allow Continuous Fan During Unoccupied Hours configuration determines whether the fan will run during unoccupied periods when heating or cooling is not active. When the configuration is set to ON and the fan is set to ON, the fan will run continuously during unoccupied periods, even when heating or cooling is not active. When the configuration is set to OFF, the fan will run during unoccupied periods only when heating or cooling is active. The default is On." Page 11 provides instructions for multi-stage heating or cooling. "Fifteen-Minute Staging Timer—When multi-stage heating or cooling is used, the staging timer prevents any higher stage from energizing until at least 15 minutes has passed from the start of the previous stage. The timer is disabled if the temperature demand is greater than 5 degrees." The Totaline second-stage control method would require about 2.5 times more AC compressor operation than the Venstar T2900 thermostat which has a default 2 minutes AND 2 F deadband. The Totaline thermostat provides default continuous fan-on during unoccupied periods.

US patent application US 2015/0204571 A1 (Messmer '571) discloses a method to save energy providing control of outdoor ventilation by "attempting to minimize the periods of operating the fan during periods of time in which the air conditioning system is not heating or cooling and the damper is open." The Messmer '571 further discloses: "If there is no call for heating, cooling, or recirculation at any time during ventilation, the control circuit 16 will operate the fan 12 at a "continuous ventilation rate," which is the speed at which the fan would need to run continuously for 24 hours with damper 14 open in order to bring in the minimum daily amount of fresh air." The Messmer '517 abstract discloses "An air-conditioning system comprises a fan and a ventilation damper for drawing fresh air into a living space. The damper is able to open and close. The air-conditioning system is adapted and configured to store data indicative of air flow output of the fan over time, and to close the damper based on said data." Messmer '571 Claim 11 discloses "A method in accordance with claim 10 comprising operating the fan during periods of time in which the air conditioning system is not heating or cooling air, and, based on the data, attempting to minimize the periods of operating the fan during time in which the air-conditioning system is not heating or cooling and the damper is open." The Messmer '571 FIG. 1 flow chart is the only disclosure where the word "off" appears regarding turning off the fan when the HVAC system is not heating or cooling, and "Shut off fan" is what known thermostats do when the thermostat fan control is set to "AUTO" and the system is not heating or cooling.

A non-patent publication by Honeywell International Inc., "TB8220 Commercial VisionPRO™ Programmable Thermostat," Date: Mar. 15, 2005, Pages: 24, Honeywell International Inc., 1985 Douglas Drive North, Golden Valley, Minn. 55422 USA. https://customer.honeywell.com/resources/techlit/TechLitDocuments/63-0000s/63-2625.pdf. The Honeywell TB8220 page 21 describes "While maintaining setpoint, several factors affect when $2^{nd}$ stage energizes such as load conditions, environmental conditions, P+I control, and home insulation. The second stage energizes when the thermostat senses 1st stage is running at 90% capacity. This operation is droopless control." The Honeywell thermostat uses a patented Proportional plus Integral (P+I) control method to determine when to energize the second-stage cooling (Y2) signal.

U.S. Pat. No. 6,415,617 (Seem 2002) discloses a method for controlling an air-side economizer of an HVAC system using a model of the airflow through the system to estimate building cooling loads when minimum and maximum amounts of outdoor air are introduced into the building and uses the model and a one-dimensional optimization routine to determine the fraction of outdoor air that minimizes the load on the HVAC system.

US Patent Application Publication No. 2015/0,309,120 (Bujak 2015) discloses a method to evaluate economizer damper fault detection for an HVAC system including moving dampers from a baseline position to a first damper position and measuring the fan motor output at both positions to determine successful movement of the baseline to first damper position.

U.S. Pat. No. 7,444,251 (Nikovski 2008) discloses a system and method to detect and diagnose faults in HVAC equipment using internal state variables under external driving conditions using a locally weighted regression model and differences between measured and predicted state variables to determine a condition of the HVAC equipment.

U.S. Pat. No. 6,223,544 (Seem 2001) discloses an integrated control and fault detection system using a finite-state machine controller for an air handling system. The '544 method employs data regarding system performance in the current state and upon a transition occurring, determines whether a fault exists by comparing actual performance to a mathematical model of the system under non-steady-state operation.

U.S. Patent Application US20160116177 (Sikora '177) discloses: "A damper controller may be configured to send damper control commands to open and close an outdoor air damper to provide free cooling as necessary to satisfy a temperature setpoint inside the building. In some cases, the damper controller may initiate a damper fault test to determine if a damper fault is present. The damper fault test may be based, at least in part, on an outdoor air temperature input, a discharge air temperature input, a commanded damper position, and a damper fault temperature threshold. If a damper fault is determined, the damper controller may send an alert indicative of a detected damper fault. In some cases, the damper fault test results may be weighted to reduce the false positives alerts."

U.S. Patent Application US20110160914 (Kennett '914) discloses: "A tilt sensor apparatus and method provide sensing and feedback of angular orientation. In preferred embodiments, the tilt sensor apparatus and method of the present disclosure may advantageously be used in an HVAC system to provide feedback on damper position to an HVAC controller."

U.S. Pat. No. 8,747,753 B2 (Engel '753) discloses "A controller for an ultraviolet (UV) purification system having UV lamps includes a sensor in communication with a given UV lamp as well as a processor in communication the sensor. The sensor provides the UV light intensity rate of the UV lamp (sensed rate) and transmits this information to the processor which compares the sensed rate with a memory stored desired UV light intensity rate (desired rate). An indicator in communication with the processor indicates when the UV lamp is producing a UV light intensity below the desired rate. Current is provided to the UV lamp by a ballast. The processor includes a memory stored predetermined UV light intensity rate (predetermined rate) that is greater than the desired rate. When the sensed rate is lesser than the predetermined rate, the current provided by the ballast is increased such that the UV lamp produces a UV light intensity at least equal to the predetermined rate."

U.S. Pat. No. 6,805,733 B2 (Engel '733) discloses "An outwardly projecting air purifier including a support, a generally cylindrical array of UV lamp assemblies mounted to the support, wherein each UV lamp assembly includes a reflector having a generally parabolic inner surface and a UV lamp so mounted to the reflector that the inner surface of the reflector reflects a portion of the ultraviolet radiation emitted by the lamp in an outward, radial, direction is described herein. The air purifier also includes a convex shaped deflector element so mounted to the support that the airflow is deflected by the deflector element and brought near the lamps."

Carrier. 1995. HVAC Servicing Procedures. SK29-01A, 020-040 (Carrier 1995). The Carrier 1995, page 149-150, describes the "Proper Airflow Method" (pp. 7-8 of PDF) based on measuring Temperature Split (TS), hereinafter referred to as the TS method. The CEC TS method focuses on measuring temperature split to determine if there is proper airflow and does not mention that temperature split can be used to detect low cooling capacity or other faults. The TS method is recommended after the superheat (non-TXV) or subcooling (TXV) refrigerant charge diagnostic methods are performed (pp. 145-149). The TS method was first required in the 2000 CEC Title 24 standards to check proper airflow, but not proper cooling capacity.

Non-patent publication by the California Energy Commission (CEC). 2008. "2008 Residential Appendices for the Building Energy Efficiency Standards for Residential and Nonresidential Buildings. CEC-400-2008-004-CMF." Date: December 2008, Pages 363, Published by the California Energy Commission, 1516 9th St, Sacramento, Calif. 95814 USA (CEC 2008). https://ww2.energy.ca.gov/2008publications/CEC-400-2008-004/CEC-400-2008-004-CMF.PDF. Pages RA3-9 to RA3-24 of the CEC 2008 report provides a Refrigerant Charge Airflow (RCA) protocol disclosed in the Carrier 1995 HVAC Servicing Procedures document and defined in Appendix RA3 of the CEC 2008 Building Energy Efficiency Standards, which is a California building energy code. The Temperature Split (TS) method is used to check for minimum airflow across the evaporator coil in cooling mode per pp. RA3-15, Section RA3.2.2.7 Minimum Airflow. "The temperature split test method is designed to provide an efficient check to see if airflow is above the required minimum for a valid refrigerant charge test." In 2013, the CEC adopted the 2012 Building Energy Efficiency Standards (CEC-400-2012-005-CMF-REV3), and no longer allowed the TS method to check for minimum airflow due to the perceived inaccuracy of the TS method as disclosed in the Yuill 2012 report.

Non-patent publication by Yuill, David P., Braun, James E., "Evaluating Fault Detection and Diagnostics Protocols Applied to Air-Cooled Vapor Compression Air-Conditioners." Date: Jul. 16, 2012, Pages: 11, International Refrigeration and Air Conditioning Conference. Paper 1307. Published by Ray W. Herrick Laboratories, Purdue University, 177 S Russell St, West Lafayette, Ind. 47907 USA (Yuill 2012). http://docs.lib.purdue.edu/iracc/1307. Yuill 2012 evaluated the Refrigerant Charge Airflow (RCA) protocol including the TS method specified in the Appendix RA3 of the CEC 2008 Building Energy Efficiency Standards, which is the California building energy code. Yuill 2012 evaluated the accuracy of correctly diagnosing evaporator airflow faults from −90% to −10% of proper airflow (equivalent to 10% to 90% of proper airflow.) Yuill reported that the TS method was 100% accurate for diagnosing low airflow from −90% to −50% (i.e., 10% to 50% of proper airflow), but the accuracy was unacceptable for diagnosing low airflow from −40% to −10% (i.e., 60% to 90% of proper airflow). Based on the Yuill 2012, the CEC no longer recommends using the TS method for checking "proper airflow" or any other fault. In 2013, the CEC Title 24 standards mentioned the TS method, but did not allow this method to be used for field verification of proper airflow or to check low capacity or other faults. From 2000 through 2020, the CEC has not required using the TS method to diagnose low capacity faults which waste energy.

Non-patent publication by the California Energy Commission (CEC). 2012. "Reference Appendices The Building Energy Efficiency Standards for Residential and Nonresidential Buildings," CEC-400-2012-005-CMF-REV3. Date: May 2012, Pages 476, Published by the California Energy Commission, 1516 9th St, Sacramento, Calif. 95814 USA (CEC 2012). https://ww2.energy.ca.gov/2012publications/CEC-400-2012-005/CEC-400-2012-005-CMF-REV3.pdf. CEC 2012 reference appendices of the building standards page RA3-27-28 require the following methods to measure airflow: 1) supply plenum pressure measurements are used for plenum pressure matching (fan flow meter), 2) flow grid measurements (pitot tube array "TrueFlow"), 3) powered-flow capture hood, or 4) traditional flow capture hood (balometer) methods to verify proper airflow. CEC 2012 required supply plenum pressure measurements to be taken at the supply plenum measurement access locations shown in Figure RA3.3-1. These holes were previously used to measure TS, but TS is not required since the CEC and persons having ordinary skill in the art do not believe the TS method provides useful information.

Non-patent publication by the California Energy Commission (CEC). 2018. "2019 Building Energy Efficiency Standards for Residential and Nonresidential Buildings," CEC-400-2018-006-20-CMF, Date: December 2018, Pages 325, Published by the California Energy Commission, 1516 9th St, Sacramento, Calif. 95814 USA, https://ww2.energy.ca.gov/2018publications/CEC-400-2018-020/CEC-400-2018-020-CMF.pdf (CEC 2018). CEC 2018, page 210 provides the following requirements for economizer controllers. "E. The space conditioning system shall include the following: "A. Unit controls shall have mechanical capacity controls interlocked with economizer controls such that the economizer is at 100 percent open position when mechanical cooling is on and does not begin to close until the leaving air temperature is less than 45 F." This CEC 2018 requirement refers to the thermostat second-stage cooling signal (Y2) input after the economizer has attempted to satisfy the thermostat first-stage cooling signal (Y1). CEC 2018 page 210 also provides the following statement "3. Systems that include a water economizer to meet Section 140.4(e)1 shall include the following: B. Economizer systems shall be integrated with the mechanical cooling system so that they are capable of providing partial cooling even when additional mechanical cooling is required to meet the remainder of the cooling load." An "integrated" economizer system fully opens dampers and operates the fan by itself to attempt to satisfy the thermostat first-stage cooling signal (Y1) without DX AC compressor operation. If the "integrated" economizer cannot satisfy the thermostat first-stage cooling signal (Y1) before the Conditioned Space Temperature (CST) increases by 2 F (default) above the first dead band (or 3 F above the setpoint) AND a minimum time delay of 2 to 60 minutes, then the thermostat second-stage cooling signal (Y2) is energized for the "integrated" economizer to energize the first-stage DX AC compressor. The term "integrated" economizer defines the combination of economizer cooling and DX AC compressor cooling during the thermostat second-stage cooling signal (Y2). The CEC 2018 standards (p. 209, Table 140.4-E) require a High-limit Shut-off Temperature (HST) of 69 F to 75 F based on a climate zone.

R. Mowris, E. Jones, R. Eshom, K. Carlson, J. Hill, P. Jacobs, J. Stoops. 2016. Laboratory Test Results of Commercial Packaged HVAC Maintenance Faults. Prepared for the California Public Utilities Commission. Prepared by Robert Mowris & Associates, Inc. (RMA 2016). The RMA 2016 laboratory study states that the TS method was accurate 90% of the time when diagnosing low airflow (cfm) and low cooling capacity (Btu/hr) faults. Page iii of the RMA 2016 abstract makes the following statement. "The CEC temperature split protocol average accuracy was 90+/−2% based on 736 tests of faults causing low airflow or low capacity." The prior art does not disclose a method or a need to use the TS method to diagnose a low capacity fault based on excess outdoor air ventilation, blocked air filters or coils, low refrigerant charge, restrictions, non-condensables, or other cooling system faults. Due to the poor performance of the TS method for checking low airflow from −10 to −40% as disclosed by Yuill 2012, starting in 2013, the CEC no longer requires using the TS method to check minimum airflow.

U.S. Pat. No. 7,500,368 filed in 2004 and issued in 2009 to Robert Mowris (Mowris '368) discloses a method for correcting refrigerant charge (col 13:1-16). If "the delta temperature split is less than minus the delta temperature split threshold, and the air conditioning system is not a Thermostatic Expansion Valve (TXV) system: computing one of the a refrigerant undercharge and a refrigerant overcharge based on a superheat temperature; if the delta temperature split is less than minus the delta temperature split threshold, and the air conditioning system is the TXV system: computing one of the refrigerant undercharge and the refrigerant overcharge based on subcooling temperature; and adjusting the amount of refrigerant in the air conditioning system based on one of the refrigerant undercharge and the refrigerant overcharge." The Mowris '368 patent discloses a method to compute a refrigerant undercharge or overcharge based on superheat (non-TXV) or subcooling (TXV).

U.S. Pat. No. 8,066,558 (Thomle '558) discloses a method for demand control ventilation to address the issue of temperature sensor failure using an occupancy indicator such that if a temperature sensor measurement is determined to be incorrect, unexpected or otherwise erroneous, the ventilation system can provide an amount of fresh air sufficient for adequate ventilation without over-ventilating a building.

U.S. Pat. No. 8,195,335 (Kreft '335) discloses a method for controlling an economizer of an HVAC system with an outside air stream, a return air stream, and a mixed air stream to provide outdoor air cooling to an HVAC system. The economizer includes one or more controllable outdoor air dampers for controlling a mixing ratio of incoming outside air to return air in the mixed air stream. The control method includes positioning the one or more controllable dampers in first and second configurations such that the mixed air stream has first and second mixing ratios of incoming outside air to return air in the mixed air stream.

U.S. Pat. No. 9,435,557 (Belimo '577) discloses a control unit for an HVAC system comprising an economizer configured to introduce outdoor air into the HVAC system for cooling and/or ventilation purposes where the economizer is controlled by a control unit comprising a base module with: a control circuit, an interface, and first I/O means for connecting at least one sensor of the HVAC system to control circuit for delivering at least one control signal from the control circuit to control the operation of the economizer where the base module is configured to optionally receive at least one extension module, which can be snapped on and electrically connected to the base module for expanding the functionality of the control unit.

R. Hart, D. Morehouse, W. Price. 2006. The Premium Economizer: An Idea Whose Time Has Come. Pages 13. Date: August 2006. Prepared by the Eugene Water & Electric Board and published by the American Council for an Energy Efficient Economy (ACEEE). Washington, D.C. (Hart 2006). See https://www.semanticscholar.org/paper/The-Premium-Economizer%3A-An-Idea-Whose-Time-Has-Come-Hart/3b8311bdf8cb40210ccabd0cec8906bda-00d0fec. Hart 2006 discloses five (5) levels of "integrated cooling" where an economizer is ""capable of providing partial cooling even when additional mechanical cooling is required to meet the remainder of the cooling load" (ASHRAE 2004, 38). The five levels include: 1) "Non-integrated" where below the changeover, only the economizer operates and above only mechanical cooling operates; 2) "Time-delay integration" economizer operates for a set time beyond which mechanical cooling operates; 3) "Alternating integration" first-stage economizer and second-stage mechanical; 4) "Partial integration" with first-stage economizer and multiple-stage or variable-speed mechanical cooling where economizer dampers reduce outdoor airflow; and 5) "Full integration" with economizer cooling and hydronic chilled-water cooling coil modulated to any cooling output with a differential changeover.

U.S. Pat. No. 5,447,037 (Bishop et al. 037) assigned to American Standard Inc., discloses "A method of utilizing an economizer to reduce the energy usage of a mechanical refrigeration system. The method comprises the steps of: economizing if both cooling demand and the prerequisites to economize are present; measuring economizer capacity; determining if the measured economizer capacity is sufficient to meet the needs of a zone being conditioned; continuing to economize as long as there is both a cooling demand and the prerequisites to economize; and initiating the use of the mechanical cooling system only if the economizer capacity has been determined to be insufficient to meet the needs of the zone being conditioned."

S. Taylor, C. Cheng. Economizer High Limit Controls and Why Enthalpy Economizers Don't Work. 2010 (Taylor 2010). Pages 11. Date: November 2010. ASHRAE Journal. 52. 12-28, Published by the American Society of Heating, Refrigerating and Air-Conditioning Engineers, Inc. (ASHRAE). See https://www.scribd.com/document/390134082/ASHRAE-Why-Enthalpy-Economizers-D on-t-Work-Taylor-Cheng. Page 2 of the Taylor 2010 article describes the economizer is fully "integrated" in the figures and discussion "meaning the economizer and mechanical cooling can operate simultaneously" during the thermostat second-stage cooling signal (as discussed above with respect to the CEC 2018 non-patent publication CEC-400-2018-006-20-CMF). Page 10 of the Taylor 2010 article provides Table 2 "High limit control recommendations for integrated economizers" providing economizer HST values when: OAT exceeds 69 F for climate zones 1A through 5A, OAT exceeds 71 F for climate zones 5 C through 7, OAT exceeds 73 F for climate zones 1AB through 5B, and OAT exceeds 75 F for climate zones 3C through 8. For each HST control strategy, the "integrated" economizer fully opens dampers and operates the fan by itself to satisfy the thermostat first stage (Y1) call for cooling without operating the first stage DX AC compressor.

U.S. Pat. No. 8,972,064 B2 (Grabinger et al. '064) assigned to Honeywell discloses: "A system incorporating an actuator. The actuator may have a motor unit with motor controller connected to it. A processor may be connected to the motor controller. A coupling for a shaft connection may be attached to an output of the motor unit. The processor may incorporate a diagnostics program. The processor may be connected to a polarity-insensitive two-wire communications bus. Diagnostic results of the diagnostics program may be communicated from the processor over the communications bus to a system controller. If the diagnostic results communicated from the processor over the communications bus to the system controller indicate an insufficiency of the actuator, then an alarm identifying the insufficiency may be communicated over the communications bus to the system controller."

U.S. Pat. No. 4,404,815 (Gilson '815) assigned to Carrier discloses: "An air conditioning economizer control method and apparatus for integrating the operation of the economizer with an air conditioning system is disclosed. An economizer position control arrangement is further disclosed incorporating a rotor locking circuit for maintaining the damper in position against a bias applied by mechanical means such as a spring. A multiple position indicator or multiple temperature sensor is utilized to modulate the position of the damper utilizing the motor for opening the damper, a spring for returning the damper and a rotor locking circuit for maintaining the damper in position. Multiple temperature sensors are also disclosed for making effective use of outdoor air when cooling through economizer operation is available. Staged cooling loads relative to outdoor ambient temperatures are utilized to select the appropriate mode of operation."

U.S. Pat. No. 9,500,382 B2 (Grabinger '382) assigned to Honeywell discloses: "methods and systems for automatically calibrating one or more damper positions of a demand control ventilation system are disclosed. In one illustrative embodiment, a demand control ventilation system includes a damper for controlling a flow of outside air into a building. A controller may be programmed to automatically execute a calibration algorithm from time to time to calibrate one or more calibration damper positions such that a predetermined flow of outside air is drawn through the damper and into the building at each of the one or more calibration damper positions. This calibration can, in some instances, help increase the efficiency and/or utility of the demand control ventilation system." Col. 9, lines 1-14 of the Grabinger '382 disclose an equation and method for modulating a damper position to achieve a Mixed Air Temperature (MAT) based on a % Ventilation rate (also referred to as a percent Outdoor Airflow Fraction or OAF). "(OAT-RAT)x % Ventilation+RAT=MAT {Equation 1} where OAT=Outside air temperature, RAT=Return air temperature, and MAT=Mixed air temperature. During the calibration, the outdoor and/or return air dampers may be repositioned by the controller until the correct ventilation percentage (% Ventilation) is achieved for each minimum and maximum ventilation settings. The controller 302 may then be programmed to interpolate an intermediate ventilation rate, depending on actual, sensed or scheduled occupancy, by modulating between these two calibrated damper positions (or extrapolating beyond the values). This calibration may be performed for each fan speed of fan 119 of the HVAC system 102." Grabinger '382 discloses a trial-and-error calibration method using three independent variables OAT, RAT, and OAF, and a dependent variable MAT. Grabinger '382 uses the temperature measurements and the desired OAF to interpolate or extrapolate from trial-and-error values to a desired MAT. Trial-and-error calibration consists of adjusting damper positions until a desired MAT value is obtained which is time consuming and does not provide a functional relationship without additional trial-and-error steps.

U.S. Pat. No. 9,765,986 B2 (Thomle '986) assigned to Honeywell Inc. discloses: "a Demand Control Ventilation (DCV) and/or Economizer system that is capable of drawing outside air into an HVAC air stream. In some instances, the DCV and/or Economizer system may be configured to help perform one or more system checks to help verify that the system is functioning properly. In some instances, the DCV and/or Economizer system may provide some level of manual control over certain hardware (e.g. dampers) to help commission the system. The DCV and/or Economizer system may store one or more settings and or parameters used during the commissioning process (either in the factory or in the field), so that these settings and/or parameters may be later accessed to verify that the DCV and/or Economizer system was commissioned and commissioned properly."

Non-patent publication by the California Energy Commission (CEC). 2016. "Reference Appendices the Building Energy Efficiency Standards for Residential and Nonresidential Buildings." Date: June 2015. Pages: 503, CEC-400-2015-038-CMF, Published by the California Energy Commission, 1516 9th St, Sacramento, Calif. 95814 USA (CEC 2016). https://ww2.energy.ca.gov/2015publications/CEC-400-2015-038/CEC-400-2015-038-CMF.pdf. The CEC 2016 Reference Appendices of the Building Standards JA6.3 Economizer Fault Detection and Diagnostics (pp. JA6-7 through JA6-12), requires economizer controllers to be capable of detecting the following faults: 1) air temperature sensor failure/fault, 2) not economizing when it should, 3)

economizing when it should not, 4) damper not modulating and 5) excess outdoor air. However, the CEC 2016 does not describe methods to diagnose or evaluate these faults. Therefore, an unresolved need remains to develop apparatus and methods for evaluating economizer faults to improve HVAC energy efficiency.

U.S. Pat. No. 6,684,944 (Byrnes et al, 2004) and U.S. Pat. No. 6,695,046 (Byrnes et al, 2004) disclose a variable speed fan motor control for forced air heating/cooling systems using an induction-type fan motor controlled by a controller circuit which is operable to continuously vary the speed of the fan motor during a start-up phase and a shut-down phase of the heating and/or cooling cycle. The Byrnes fan motor controller circuit includes a Return Air Temperature (RAT) sensor and a Supply Air Temperature (SAT) sensor which are operable to control start-up and shutdown of the fan motor over continuously variable speed operating cycles in response to sensed temperature of the air being circulated by the fan. Byrnes does not disclose an economizer controller monitoring a Mixed Air Temperature (MAT) where the MAT is based on a mixture of air at the OAT and the RAT where the MAT varies based on an economizer damper position and the OAT and the RAT.

The Chapman et al. U.S. Pat. No. 7,469,550 ('550) is an energy saving control for appliances via an intelligent thermostat that provides programmatic control over the HVAC system, and provides coordinated control over the appliances via a communications network between the thermostat and appliances. The appliances include occupancy sensors and transmit usage and occupancy information to the thermostat.

The Keating U.S. Pat. No. 5,544,809 ('809) assigned to Senercomm, Inc., provides an apparatus and methods to control an HVAC system for enclosed areas. Selected internal environmental variables in an enclosed area are measured including data from a motion sensor indicating an occupancy status of the area for automatically controlling the operation of the HVAC system. Control settings are made to meet desired temperature and energy consumption levels. A logic algorithm and microcomputer determine humidity levels. The humidity levels are controlled to minimize the occurrence of mold and mildew. Algorithm timing strategies optimize air drying initiated by an occupancy sensor.

The Parker U.S. Pat. No. 5,996,898 ('898) assigned to University of Central Florida, describes a ceiling fan operation control for turning a ceiling fan on and off based on a passive infrared sensor, combined with a temperature sensor to regulate the speed of the fan. The passive infrared sensor, the temperature sensor and controls for both are in a housing directly mounted to the fan motor of the ceiling fan.

The Lutron occupancy sensor wall switch model MS-OPS5M can be used to turn on the lights or an exhaust fan "ON" when occupants enter a room and turn "OFF" the lights or an exhaust fan when the room is vacant. The Lutron wall switch has not been used to control an HVAC fan and does not provide a fault detection diagnostic method to detect, report, and override a fan-on setting fault for an HVAC system. http://www.lutron.com/TechnicalDocumentLibrary/3672236_Sensor_Spec_Guide.pdf Non-patent publication by Ecobee Inc., "How to control your HVAC system's fan with your ecobee thermostat" Date: Jan. 13, 2020, Page 7, Published by Ecobee Inc. 25 Dockside Dr Suite 700, Toronto, ON M5A 0B5, Canada https://support.ecobee.com/hc/en-us/articles/360004798951-How-to-control-your-HVAC-system-s-fan-with-your-ecobee-thermostat. The non-patent publication by Ecobee Inc. describes an intermittent fan-on minimum setting operating on an hourly basis. "If the Fan Min On Time is set for 15 minutes or lower, the fan will operate in two separate segments across the hour; if the Fan Min On Time is set for 20 minutes or higher, the fan will run in four equal segments across the hour. If a heating or cooling cycle operates within any given hour, the length of either cycle will be deducted from the Fan Min On Time. For example, if your cooling runs for 5 minutes and your Fan Min On Time is set to 20 minutes, 5 minutes will be deducted from the Fan Min On Time."

The U.S. Pat. No. 9,784,468B2 (Bisson '468) assigned to filed by Honeywell Inc., assigned to Ademco, discloses a thermostat providing a fan schedule to provide automatic, ON, or circulation options. Col. 38, lines 54-56 disclose: "As noted above, the thermostat 10 may include a view schedule mode that may be entered to allow a user to view and/or verify their HVAC system schedule."

Non-patent publication by Google Inc. "How to Control Your Fan with a Nest Thermostat," Date: Dec. 30, 2019, Pages 1, Published by Google, Inc. 1600 Amphitheatre Parkway, Mountain View, Calif. 94043 USA. https://support.google.com/googlenest/answer/9296419?hl=en The non-patent publication by Google describes an intermittent fan-on setting operating on an hourly basis.

Non-patent publication by Lawrence Berkeley National Laboratory (LBNL) and Hirsch, J. "DOE-2.2 Building Energy Use and Cost Analysis Program Volume 2: Dictionary," Date: February 2014, Pages: 522, E. O. Lawrence Berkeley National Laboratory Simulation Research Group, Berkeley, Calif. 94720 USA http://doe2.com/download/doe-22/DOE22Vol2-Dictionary_48r.pdf. The DOE-2 building energy analysis program is used to predict the energy use and cost for residential and commercial buildings based on a description of the building layout, constructions, usage, lighting, equipment, and HVAC systems.

Known prior art economizer controllers would position the economizer outdoor air dampers to a minimum position and energize one or more DX AC compressors if: 1) the OAT is 62 F or 1 to 2 F less than the HST (63 F default DRYBLB Set and +/−1 F deadband); or 2) if the OAT is 0 to 1 F greater than the HST (i.e., 69 to 75 F per the CEC-400-2018-020-CMF, p. 209, Table 140-E) or the OAT is greater than or equal to a threshold temperature 2 F below the RAT or the OAT is greater than a reference Differential Temperature High Limit (DTHL).

Known prior art "integrated" (i.e., a combination of economizer cooling and DX AC compressor cooling during the thermostat second-stage cooling signal (Y2)) economizer controllers fully open dampers and operate the fan by itself to attempt to satisfy the thermostat first-stage cooling signal (Y1) without DX AC compressor operation. If the "integrated" economizer cannot satisfy the thermostat first-stage cooling signal (Y1) before the Conditioned Space Temperature (CST) increases by 2 F (default) above the first dead band (or 3 F above the setpoint) AND a minimum first-stage time delay of 2 to 60 minutes, then the thermostat second-stage cooling signal (Y2) is energized for the "integrated" economizer to energize the first-stage DX AC compressor. Compressor operation is delayed until both the thermostat second-stage time delay (default 2 minutes up to 10 minutes) AND the thermostat second-stage temperature deadband (2 F default) have been met.

Known prior art economizer calibration methods disclose an unresolved need for economizer cooling fault detection diagnostics, but fail to provide solutions to resolve the unresolved need to improve economizer calibration and cooling system efficiency.

BRIEF SUMMARY OF THE INVENTION

The present invention provides a Heating, Ventilating, Air Conditioning (HVAC) fan and ultraviolet lamp control solution for an unresolved need to override or supersede a fan-on setting and turning off an ultraviolet (UV) lamp after the HVAC fan is turned off to reduce or eliminate unnecessary or unintentional HVAC fan and ultraviolet lamp energy and also reduce cooling and heating energy caused by outdoor air introduced into the building by an economizer or duct leakage. The present invention provides a HVAC fan-on correction method, the method comprising: detecting that a HVAC fan is controlled by at least one fan-on duration control selected from the group consisting of: at least one fan-on duration setting selected by a user, at least one fan-on duration schedule selected by a user, and at least one fan-on duration command selected by a user; wherein the at least one fan-on duration control operates the HVAC fan to recirculate air in a conditioned space for at least one fan-on duration; and performing at least one action selected from the group consisting of: providing at least one fan-on alarm message after the at least one fan-on duration is greater than or equal to a Threshold Fan-on Time (TFT) duration, and overriding the at least one fan-on duration control. The method may also comprise turning off an ultraviolet lamp after the HVAC fan is turned off, and turning on the ultraviolet lamp when the HVAC fan is turned on.

An ultraviolet (UV) lamp operating in the germicidal electromagnetic wavelength of 250 to 280 nanometers (nm) © spectrum), and preferably 254 nm can destroy the Deoxy-riboNucleic Acid (DNA) of bacteria and viruses. The germicidal UV radiation (in the C spectrum) also destroys parasites which are extremely resistant to chemical disinfectants, such as *Cryptosporidium* or *Giardia*. The UV lamp is preferably installed in an air handler (directing UV light on an evaporator) of an Air Conditioning (AC) system.

The 254 nm ultraviolet lighting power density required to kill viruses is approximately 1 to 3 J/cm² or 1 to 3 Watt-seconds/cm². A typical 3-ton (36,000 British Thermal Units or Btu or 10.5 kW) HVAC system evaporator coil surface area is about 5200 cm2 (depending on face area to coil surface area). A 34 W UV lamp operating at a germicidal electromagnetic wavelength of preferably 254 nm is typically installed in a 3-ton HVAC system. The time required the 254 nm UV lamp to kill a virus after the HVAC fan has been turned off is about 10 to 60 minutes depending on lamp placement and evaporator geometry and exposure. The UV lamps are typically turned on 24 hours per day even when the fan is turned off. The UV lamp only needs to operate for about 10 to 60 minutes to sanitize an HVAC evaporator coil of a 3-ton AC system after the HVAC fan is turned off.

A 34 W UV lamp operating 24 hours per day and 365 days per year instead of only during a building occupancy when the HVAC fan is operating can waste about 120 to 170 kWh/year of energy. Continuously operating the UV lamp may also reduce the UV lamp Effective Useful Life (EUL) by about 20 to 50%. The UV lamp performs useful work to sanitize the evaporator coil during the HVAC fan operation and for about 10 to 60 minutes after the HVAC fan is turned off. An air ionizer only provides useful work to sanitize the air when the HVAC fan is operating. Therefore, the present invention provides a solution to resolve an unresolved need to turn off a UV lamp or an ionizer after the HVAC fan is turned off, and turn on the UV lamp or the ionizer after the HVAC is turned on again. The method turns off the UV lamp (or ionzer) preferably 10 to 60 minutes after the HVAC fan is turned off to disinfect the evaporator coil.

The fan-on correction method may also include turning off an ionizer after the HVAC fan is turned off and turning the ionizer on when the HVAC fan is turned on. An ionizer installed in the HVAC fan blower provides a plasma of negatively ionized air preferably greater than 150 million ions/cc concentration to kill airborne viruses, bacteria, mold, and fungi. The ionizer can kill airborne viruses and bacteria during the fan operation.

The FDD fan-on correction method may also comprise: superseding the fan-on setting, superseding and modifying the fan-on setting, and superseding the fan-on setting and turning off the HVAC fan. The fan-on setting may comprise at least one fan-on setting selected from the group consisting of: a continuous fan-on setting, an intermittent fan-on setting, an hourly intermittent fan-on setting, a daily intermittent fan-on setting, and a scheduled fan-on setting. The TFT is preferably at least one time period or duration selected from the group consisting of: 60 minutes, adjustable from 60 minutes based on at least one indoor air quality measurement, and a sum of an intermittent fan-on duration of at least 60 minutes over a 1 to 12 hour time period.

Overriding the fan-on setting and turning off the HVAC fan may comprise at least one action selected from the group consisting of: turning off the HVAC fan, turning off the HVAC fan for a variable or a fixed time period, turning off the HVAC fan for 0 to 100% of a scheduled fan-on time, skipping a scheduled fan-on setting by not turning on the HVAC fan, turning off the HVAC fan for a fraction of a scheduled fan-on time, turning off the HVAC fan for a fraction of time based on a thermostat call for cooling or a thermostat call for heating, and turning off the HVAC fan based on a geofencing or an occupancy sensor signal. The call for cooling or heating may provide a fan operation and may also provide a fan-off delay operation. The FDD fan-on correction method may comprise overriding or superseding an intermittent fan-on setting based on the thermostat call for cooling or heating or a fan-off delay subsequent to a call for cooling or heating. The call for cooling may be based on at least one signal selected from the group consisting of: a thermostat first-stage cooling signal, and a thermostat second-stage cooling signal. The call for heating may be based on at least one signal selected from the group consisting of: a thermostat first-stage heating signal, and a thermostat second-stage heating signal.

The intermittent fan-on setting may comprise a smart communicating thermostat user-selected setting where a minimum fan-on setting of 5 to 55 minutes occurs at hourly intervals divided into two or four time periods per hour. Another intermittent fan-on setting turns on automatically each day for a user-selected time and duration selected. Known prior art smart thermostat may adjust the intermittent fan-on setting based on the call for cooling or the call for heating, but the known prior art thermostat does not reduce the total fan-on setting. The present invention reduces detects, reports, and overrides a fan-on setting to save energy and improve occupant comfort.

The present invention may also include a HVAC fan-on correction method to monitor, detect, report, and override a fan-on setting and turn off an HVAC fan controlled by a fan-on setting where the fan-on setting is enabled for longer than a Threshold Fan-on Time (TFT) or the fan-on setting is enabled when a building is unoccupied. The method checks if the fan-on time (F6) is greater than the TFT, which may vary depending on monitored HVAC parameters, in combination with an occupancy sensor to evaluate building occupancy or a Carbon Dioxide (CO2) sensor or other sensors to evaluate indoor air quality requirements. The method monitors the fan-on duration, and the at least one fan-on alarm message is provided after the at least one fan-on duration is greater than or equal to the TFT duration. The TFT duration is at least one duration selected from the group consisting of: 60 minutes, adjustable from 60 minutes based on occupancy, adjustable from 60 minutes based on the at least one indoor air quality measurement, a user-selected TFT duration, a fixed TFT duration, and a variable TFT duration based on the at least one fan-on duration control selected from the group consisting of: the at least one fan-on duration setting, the at least one fan-on duration schedule, the at least one fan-on duration command, and the at least one fan-on duration. As noted above, prior art patents '550, '809, and '898 and the Lutron wall sensor switch use occupancy sensors to turn OFF appliances ('550), the HVAC system ('809), a ceiling fan ('898), or an exhaust fan (Lutron) when a building is unoccupied. However, these prior art patents and products do not detect a fan-on setting, report a fan-on setting, or override a fan-on setting, to turn off an HVAC fan. Prior art and persons having ordinary skill in the art do not recognize a fan-on setting as a fault. After the FDD method detects the fan-on setting controlling the HVAC fan to be on by itself when the building is unoccupied or when the fan-on time (F6) is greater than a TFT, or reduce an intermittent fan-on time when the building is occupied as shown in FIG. 16, the present invention can generate a fan-on alarm message using a software display message, an email message, a text message, or other communication method, and override the fan-on setting to turn off the HVAC fan.

The decision to override the fan-on setting may include a user-setting control or an automatic control. A user might need the fan-on setting when the conditioned space is unoccupied for equipment such as computer servers or for air filtration, air circulation, or air sanitation to maintain an Indoor Air Quality (IAQ) requirement using, for example, an Ultra-Violet (UV) lamp and/or an air ionizer. To meet an IAQ criteria, the HVAC fan may be programmed to operate intermittently with a schedule intermittent hourly or daily fan-on schedule. If the HVAC fan-on correction method detects intermittent fan-on operation, then the method may override the intermittent fan-on operation every other intermittent cycle or override the intermittent fan-on cycle to reduce fan-on energy use when a building is unoccupied or for hours when a thermostat call for cooling or heating occurs. Overriding the fan-on setting during unoccupied periods of time is the most energy efficient control method, but most building occupants might want to override the fan-on setting when the building is occupied to save energy since IAQ and CO2 concentrations can be maintained when the HVAC fan operates during the thermostat call for cooling or heating or for a shorter intermittent time in between a call for cooling or heating.

Known conventional thermostats provide a fan-on setting to operate the fan-on ALWAYS (24×7 continuously), or operate the fan-on AUTO where the HVAC fan only operates only during a thermostat call for cooling or heating. Some smart communicating thermostats provide similar fan-on setting for ALWAYS and AUTO, and also provide an intermittent fan-on setting where the fan-on setting will operate the HVAC fan intermittently for 1 to 24 hours per day (e.g., Nest). Other smart communicating thermostats (e.g., Ecobee) provide an intermittent fan-on setting to operate the HVAC fan for a minimum hourly setting. For example, the non-patent publication by Ecobee Inc. describes an intermittent fan-on minimum setting operating on an hourly basis: "If the Fan Min On Time is set for 15 minutes or lower, the fan will operate in two separate segments across the hour; if the Fan Min On Time is set for 20 minutes or higher, the fan will run in four equal segments across the hour. If a heating or cooling cycle operates within any given hour, the length of either cycle will be deducted from the Fan Min On Time. For example, if cooling runs for 5 minutes and Fan Min On Time is set to 20 minutes, 5 minutes will be deducted from the Fan Min On Time." The known prior art thermostat method does not reduce the overall fan-on time. Nor do the known prior art thermostats provide a HVAC fan-on correction method to detect, report, and override a fan-on setting to turn off the HVAC fan or reduce an intermittent fan-on setting to reduce or eliminate the number of intermittent fan-on settings for an hourly, daily, weekly, or monthly schedule.

Known prior art thermostats also provide a method for a fan-on duration schedule or at least one fan-on duration control to provide an ON, an AUTO, a recurring, or an intermittent time period also referred to as at least one fan-on duration, to circulate or recirculate air in a conditioned space for a number of minutes per hour or a number of consecutive hours per day. The fan-on schedule or at least one fan-on duration control is a plan in a programmable thermostat, a smart thermostat, or a software application on a mobile device, or an internet website (hereafter "software application") for enabling or carrying out a fan-on setting or the at least one fan-on duration control selected by a user for a specific recurring or nonrecurring time in the future such as a continuous fan-on duration setting, a continuous fan-on duration schedule, an intermittent fan-on duration setting, an intermittent fan-on duration schedule, a variable fan-on duration setting, a variable fan-on duration schedule, a fan-on duration setting, a fan-on duration schedule, a recurring fan-on duration setting, a recurring fan-on duration schedule, a fractional fan-on duration setting, a fractional fan-on duration schedule, continuous fan-on schedule, an hourly fan-on schedule, or an intermittent fan-on schedule where the HVAC fan is turned on continuously for a specific period of time herein referred to as a fan-on schedule or the at least one fan-on duration control. The known prior art programmable thermostat or smart thermostat software applications do not provide a method to detect a HVAC fan is controlled by at least one fan-on duration control selected by a user; wherein the at least one fan-on duration control operates the HVAC fan to recirculate air in a conditioned space for at least one fan-on duration; and performing at least one action selected from the group consisting of: providing at least one fan-on alarm message, and automatically overriding the at least one fan-on duration control. The FDD fan-on correction method can detect a fan-on duration setting or a fan-on duration schedule and report a fan-on alarm, and override or supersede a continuous or intermittent fan-on setting or a fan-on schedule to reduce a continuous fan-on operation and turn off an HVAC fan or reduce the HVAC fan-on duration to save energy.

An intermittent fan-on setting or an fan-on schedule operating for only 10 minutes per hour can increase annual fan electricity consumption by about 750 kWh/year for a typical small commercial or residential building. Continuous fan-on settings or fan-on schedules can increase annual fan electricity consumption by 3000 to 4500 kWh/year for a typical single family home. Continuous or intermittent fan-on settings or fan-on schedules will also waste cooling and heating energy use due to increasing the frequency of the thermostat call for a cooling or heating due to increased outdoor airflow through the economizer and ducts (i.e., duct leakage) and increased outdoor airflow through the building shell from infiltration and exfiltration due to fan-induced indoor-outdoor pressure differences. The FDD fan-on correction method may also check geofencing signals and occupancy sensor signals to override the fan-on setting and turn off the HVAC fan when a building is unoccupied. The present invention may override each and every fan-on setting or fan-on schedule to reduce or eliminate a continuous or intermittent fan-on setting or a continuous or intermittent fan-on schedule.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 5 provides a chart showing the an assumed OAF, a known prior art uncalibrated OAF, and a present invention calibrated OAF versus the economizer control voltage (x) on an HVAC system according to the present invention.

FIG. 6 shows a table of damper position data, and equations 7, 9, 11, and 19, according to the present invention.

FIG. 7 provides calculations of the FDD CDC savings from correcting the default 62 F HST and superseding the HST deadband delay fault.

FIG. 8 provides calculations of the FDD Cooling Delay Correction (CDC) savings when the building is occupied.

FIG. 9 provides calculations of the FDD CDC savings when the building is unoccupied.

FIG. 12 provides a table of laboratory measurements of the total power (Watts), sensible cooling capacity (Btu per hour, Btuh), sensible Energy Efficiency Ratio (EER) (EER*s equal to Btuh divided by Watts), and energy savings for a HVAC system with two compressors, a first-stage and a second-stage, and an economizer.

FIG. 13 provides cooling savings versus OAT for the HVAC system for OAT ranging from 55 to 100 F.

Corresponding reference element numbers indicate corresponding components throughout several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined based on the claims.

Where the terms "about" or "generally" are associated with an element of the invention, it is intended to describe a feature's appearance to the human eye or human perception, and not a precise measurement, or within 10 percent of a stated value. Drybulb temperature measurements at indicated without asterisks and corresponding wetbulb temperatures are indicated by the addition of an asterisk. As noted previously, temperatures in degrees Fahrenheit are indicated by an "F" directly following a number.

Figure 1:
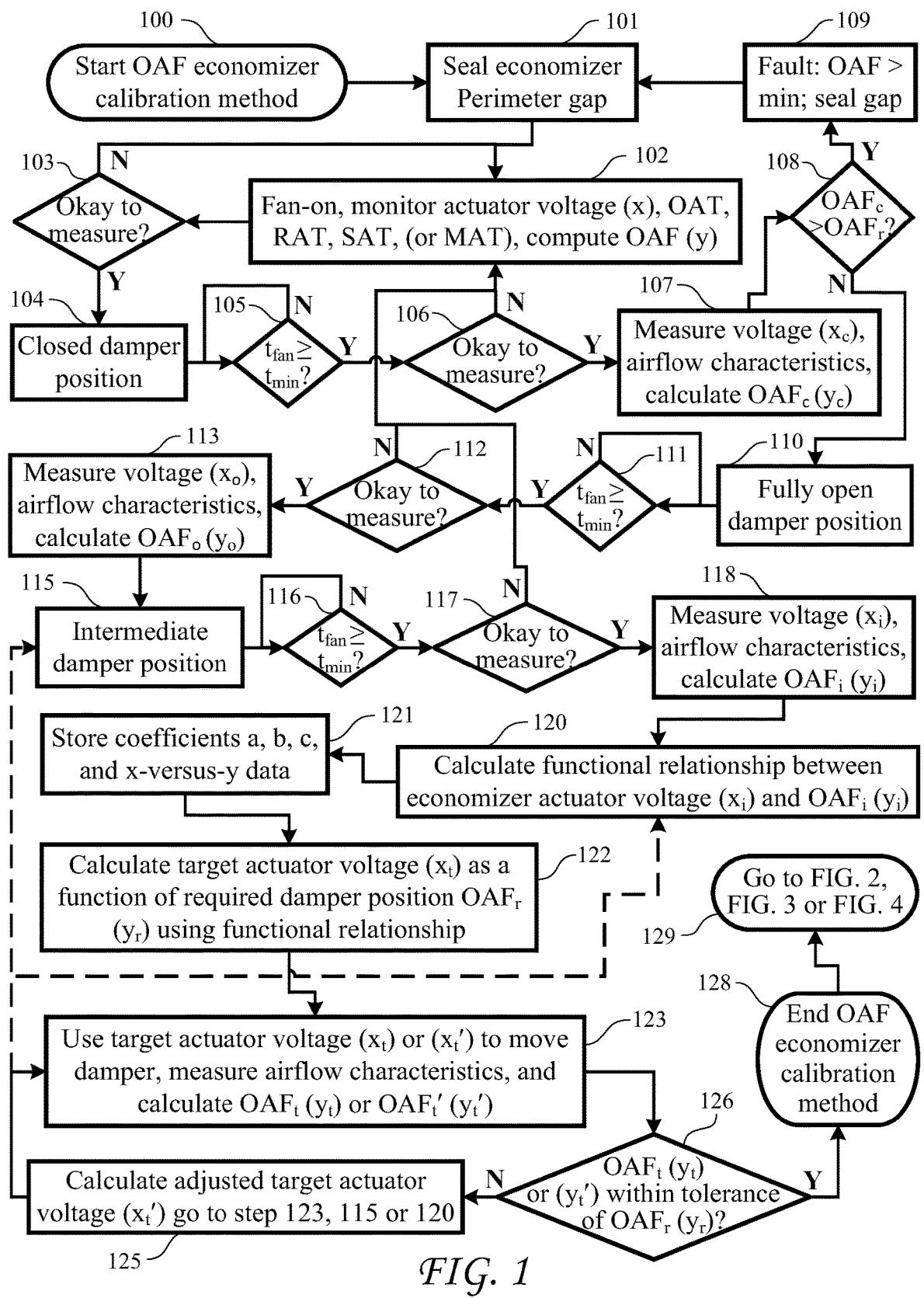
FIG. 1 shows an Outdoor Airflow Fraction (OAF) Economizer Controller Calibration (ECC) method for an HVAC system while the HVAC system is operating, according to the present invention.
Figure 17:
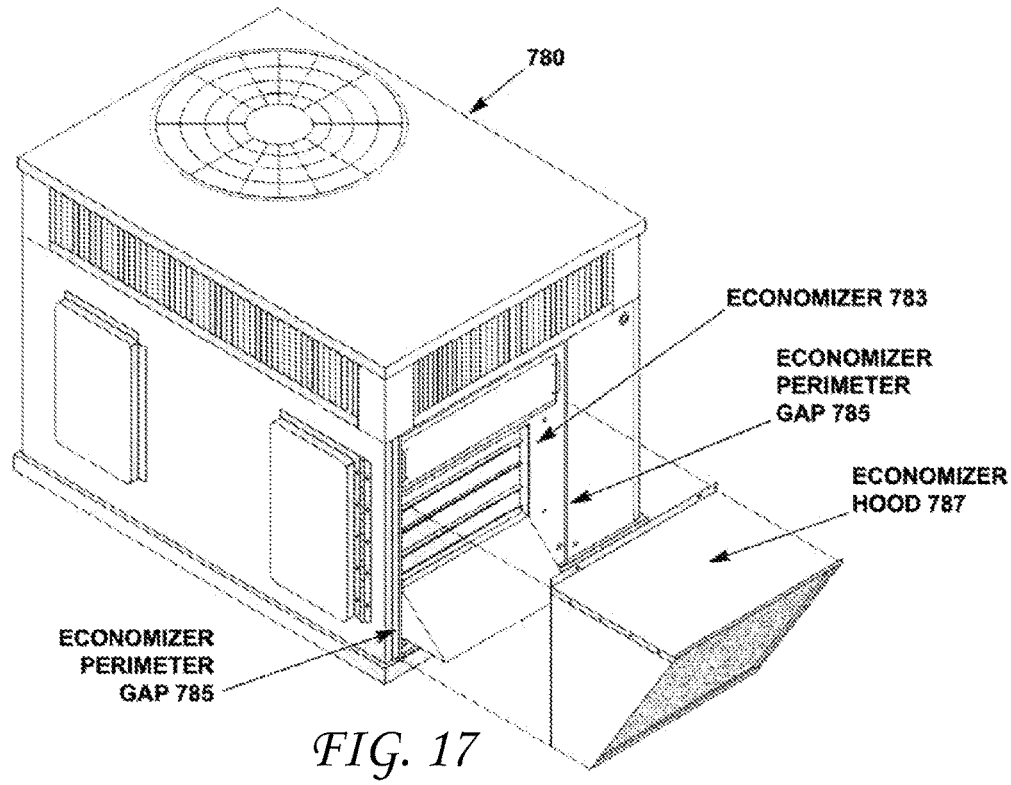
FIG. 17 shows the economizer 783 installed into a HVAC system cabinet 780 showing an economizer perimeter gap 785 of an economizer frame where it connects to the HVAC system cabinet and the economizer hood 787 temporarily removed to allow the economizer perimeter gap 785 to be sealed.

FIG. 1 shows an Outdoor Air Fraction (OAF) Economizer Controller Calibration (ECC) method for an HVAC system with the HVAC fan-on during occupied or unoccupied periods according to the present invention. The OAF ECC method starts at step 100. At step 101, the method comprises sealing the economizer perimeter gap 785 (see FIG. 17), if not already sealed. Known prior art ECC methods do not seal the economizer perimeter gap 785 which allows unintended, uncontrolled, and unconditioned outdoor airflow to enter the economizer, HVAC system, and conditioned space whether or not the ventilation fan is operating. FIG. 17 shows the economizer hood 787 must be removed in order to properly seal the economizer perimeter gap 785. Sealing around the perimeter gap of the economizer frame where it connects to the HVAC system cabinet is performed with at least one sealant selected from the group consisting of: an adhesive tape sealant, a UL-181 metal tape sealant, a UL-181A-P/B-FX tape sealant, an adhesive sealant, a mastic sealant, a caulking, a weatherstripping, a hook-and-loop fastener sealing material, a metal or plastic sealing material, and a rubber or flexible material comprising an EPDM, SBR, a silicone, a neoprene rubber, a synthetic rubber. The sealant is installed around, over, and into the perimeter gap to reduce untended outdoor air leakage through the economizer perimeter frame to prevent unintended outdoor airflow during the off cycle or during the cooling or heating cycle. Sealing the economizer perimeter gap 785 includes sealing the metal surfaces between the economizer frame and the HVAC system cabinet 780 to reduce unintended outdoor airflow and increase cooling and heating efficiency by about 5 to 10% during severe hot or cold weather when the economizer dampers are closed or at minimum position during operation of the DX AC compressor(s). After the economizer perimeter gap is sealed, the OAF ECC method proceeds to step 102 to calibrate the economizer damper position as a function of actuator voltage.

At step 102 of FIG. 1 with the fan-on, the OAF ECC method monitors and stores the economizer actuator voltage (x) and measures and stores the following drybulb temperatures: Return Air Temperature (RAT) (or $t_r$), the Outdoor Air Temperature (OAT) (or $t_o$), and the Supply Air Temperature (SAT) (or $t_s$), and computes the initial OAF (y) at step 102 using the following equation.

$$OAF = \frac{t_r - t_o + t_{fan}}{t_r - t_o} = \frac{RAT - SAT + T_{fan}}{RAT - OAT} \qquad \text{Eq. 1}$$

Where, OAF=Outdoor Airflow Fraction (dimensionless),
$t_r$=RAT=Return Air Temperature (F), and
$t_s$=SAT=Supply Air temperature (F),
$t_o$=OAT=Outdoor Air Temperature (F), and
$t_{fan}$=$T_{fan}$=a fan heat temperature increase from the HVAC fan heat (F)
where the fan heat temperature increase is calculated as follows.

$$T_{fan} = \frac{W_{fan} - (V\Delta p 0.117802)}{0.314575V} \approx \frac{W_{fan} 0.82}{0.314575V} \approx 1.1 \pm 0.5F \qquad \text{Eq. 2}$$

Where, $W_{fan}$=electric power used by the fan (W),
$\Delta p$=total static pressure of air (inches H2O),
V=total HVAC system volumetric airflow rate (ft$^3$/min or cfm),
0.117802=conversion constant (W/cfm-inH2O),
0.314575=conversion constant (W/F), and
0.82=conversion constant (cfm).

Field and laboratory tests of AC units from 1.5 to 7.5 tons indicate about 18% of the fan power ($W_{fan}$) performs useful work providing airflow and static pressure, and about 82% of the fan power generates heat which is added to the airflow. For most HVAC systems, the fan heat temperature increase is about 1.1 F+/−0.5 F depending on static pressure, airflow, air temperature, air density, and fan power. Known prior art OAF measurement methods do not include the fan heat added to SAT. If the fan heat is not included, then the OAF calculation will be incorrect. Calculating the OAF using only one sensor in the Mixed Air (MA) chamber may also introduce errors into the OAF calculations. Incorrect OAF measurements may cause incorrect damper positions and increased heating energy and increased peak cooling energy of 10 to 40%. Some economizer controller manufacturers (e.g., Belimo ZIP and Pelican WM550 PEARL) do not provide a sensor input to measure the MAT. The present invention provides a solution to measure the SAT, RAT, and OAT, accurately calculate the OAF, and calibrate an economizer controller for economizer manufacturers that do not provide a sensor to measure the MAT. The supply airflow is well mixed and measuring the SAT after the HVAC fan with only the HVAC fan operating and without the cooling or the heating system operating will provide an accurate SAT measurement. However, the fan heat temperature increase must be included to correctly calculate the OAF. The fan heat temperature increase may be based on at least one method selected from the group consisting of: a temperature increase between the SAT and the RAT with the damper closed, the temperature increase between the SAT and the RAT with a damper assembly sealed with an impermeable membrane to reduce or eliminate an outdoor airflow from mixing with a return airflow, the temperature increase between the SAT and the RAT when the OAT is within +/−0.5 F of the RAT, and a 0.5 to 2 F temperature increase.

U.S. Pat. No. 9,500,382 B2 (Grabinger '382) assigned to Honeywell discloses an equation and method for modulating a damper position to achieve a Mixed Air Temperature (MAT) based on a % Ventilation rate (also referred to as a percent OAF) "(OAT-RAT)x % Ventilation+RAT=MAT where OAT=Outside air temperature, RAT=Return air temperature, and MAT=Mixed air temperature." The MAT may be difficult to measure at different damper positions due to stratification caused by the economizer supply air dampers and return air dampers causing the return and mixed air to not be well mixed. Laboratory and field measurements show that the MAT measurements can vary by 1 F to 20 F depending on where the measurement sensors are located inside the Mixed Air (MA) chamber. Eq. 3 uses measurements of the RAT, the OAT, and the MAT to calculate the OAF.

$$OAF = \frac{t_r - t_m}{t_r - t_o} = \frac{RAT - MAT}{RAT - OAT} \qquad \text{Eq. 3}$$

Where, OAF=Outdoor Airflow Fraction (dimensionless),
$t_r$=RAT=Return Air Temperature (F), and
$t_m$=MAT=Supply Air temperature (F),
$t_o$=OAT=Outdoor Air Temperature (F), and
Eq. 3 may be less accurate than Eq. 1 due to the difficulty with measuring MAT.

At step 102, if the economizer actuator voltage (x) is at the fully open, closed, or intermediate damper position. The method may also loop back to step 102 from a previous OAF calibration, and one (or more) measurement steps may be skipped (i.e., from the previous OAF calibration). At step 103, the method checks if it is "okay to measure?" the HVAC characteristics used to calculate the OAF including the outdoor air, the return air, and the supply air (or the mixed air) characteristics. The characteristics include: an air temperature, a relative humidity, a humidity ratio, a volumetric airflow rate, and a Carbon Dioxide (CO2) concentration. Step 103 checks whether or not it is "okay to measure" based on a minimum threshold condition of an absolute value of a difference between an Outdoor Air (OA) characteristic minus a Return Air (RA) characteristic wherein the minimum threshold condition is selected from the group consisting of: an air temperature difference of at least 10 F, an air relative humidity difference of at least 10%, an air humidity ratio difference of at least 0.005 mass water vapor per mass dry air, and an air CO2 concentration difference of at least 400 ppm.

At step 103 the method checks if it is "okay to measure?" The absolute value of the outdoor air minus return air characteristic $|\Delta C|$ is greater than a minimum threshold characteristic ($C_{min}$), according to the following equation.

$$|\Delta C| = |c_o - c_r| \geq C_{min} \qquad \text{Eq. 4}$$

Where, $|\Delta C|$=absolute value of the outdoor minus return airflow characteristic, $c_o$=outdoor airflow characteristic, $c_r$=return airflow characteristic, and $C_{min}$=the minimum airflow characteristic threshold to obtain an accurate measurement of the OAF within a tolerance (for example +/−5%) of the desired OAF.

If not "okay to measure," then the method loops back to step 102. The OAF calibration steps for the fully open, closed, or intermediate damper positions shown in FIG. 1 may be performed in a different order. Eq. 4 checks a minimum airflow characteristic threshold based on an absolute value of a difference between the airflow characteristic of an Outdoor Air (OA) minus the airflow characteristic of a Return Air (RA) wherein the minimum airflow characteristic threshold is selected from the group consisting of: a temperature difference of at least 10 F, a relative humidity difference of at least 10 percent, a humidity ratio difference of at least 0.005 mass water vapor per mass dry air, a volumetric flow rate difference of at least 5% of the design minimum airflow in cubic feet per minute (cfm), a Carbon Dioxide (CO2) concentration difference of at least 400 parts per million (ppm), and a tracer gas concentration difference of at least 400 ppm.

At step 103, if it is "okay to measure," then the method proceeds to step 104 and moves the economizer damper to the closed position based on 2V economizer actuator voltage ($x_{closed}$ or $x_c$). The method proceeds to step 105 and waits for the fan on time ($t_{fan}$) to be greater than or equal to a minimum wait time ($t_{min}$) for sensors to reach equilibrium. The minimum wait time ($t_{min}$) may comprise waiting preferably 5 to 10 minutes depending on sensor measurement stability. The method then proceeds to step 106 to check if it is "okay to measure?" (i.e., absolute value of the difference characteristic is greater than or equal to the minimum threshold). The minimum temperature difference is preferably 10 F. If step 106 is No (N), then the method loops back to step 102 and returns to step 106 to finish calibration, when the outdoor air conditions are suitable for measuring the OAF. If step 106 is Yes (Y), then the method proceeds to step 107 to monitor or measure and store the closed economizer controller actuator voltage ($x_c$) for the closed damper position (e.g. 2V), measure and store the airflow characteristics, and calculate the $OAF_c$ ($y_c$) based on the OAT ($t_o$), the RAT ($t_r$), and the SAT ($t_s$) preferably using Eq. 1. Eq. 3 may also be used to calculate the MAT per Grabinger '382. The airflow characteristics may comprise at least one airflow characteristic selected from the group consisting of: a temperature, a relative humidity, a humidity ratio, a volumetric airflow rate, a Carbon Dioxide (CO2) concentration, and a tracer gas concentration.

After step 107 of FIG. 1, the method proceeds to step 108 to check if the closed damper position $OAF_c$ is greater than a required $OAF_r$ (typically 10 to 20%)? If step 108 is "Yes" (Y) (closed $OAF_c$ is >required $OAF_r$), then the method proceeds to step 109 to provide an FDD alarm: "Fault: excess outdoor airflow OAF is greater than the required $OAF_r$ (may also be referred to as the target $OAF_t$) and unable to provide minimum outdoor airflow. Please seal economizer perimeter gap to reduce unintended excess outdoor airflow to calibrate economizer." After step 109, the method loops back to step 101 to seal the economizer perimeter gap. If step 108 is "No" (N), the closed damper position $OAF_c$ is not greater than the required $OAF_r$, then the method proceeds to step 110. In step 108 of FIG. 1, the OAF ECC method may comprise checking the "$OAF_c > OAF_r$," more than once for multiple or variable speed fans in order to obtain multiple target economizer actuator voltage ($x_1$) values for multiple or variable fan speeds.

At step 110 of FIG. 1, the FDD ECC method energizes the economizer actuator to the fully open damper position (e.g., typically 10V maximum). The method proceeds to step 111, waits for the fan on time ($t_{fan}$) to be greater than or equal to the minimum time ($t_{min}$) for sensors to reach equilibrium (to measure the OAT, RAT, and SAT (or MAT), and proceeds to step 112 to check if it is "okay to measure?" (i.e., absolute value of the difference of the airflow characteristic is greater than or equal to the minimum threshold). If step 112 is No (N), then the method loops back to step 102 and returns to step 112 to finish the calibration when the outdoor air conditions are suitable for measuring the OAF. If step 112 is Yes (Y), the method proceeds to step 113 to monitor or measure and store the fully open economizer controller actuator voltage ($x_o$) for the fully open damper position, and measure and store the airflow characteristics, and calculate and store the $OAF_o$ ($y_o$) based on the OAT ($t_o$), the RAT ($t_r$), and the SAT ($t_s$) preferably using Eq. 1.

The method proceeds to step 115 to energize the economizer actuator to at least one intermediate damper position ($x_i$) (e.g., middle of the 2 to 10V range). The method proceeds to step 116 and waits for the fan on time ($t_{fan}$) to be greater than or equal to the minimum time ($t_{min}$) for sensors to reach equilibrium (to measure the OAT, RAT, and SAT), and proceeds to step 117 to check if it is "okay to measure?" (i.e., absolute value of the difference of the airflow characteristic is greater than or equal to the minimum threshold). If step 117 is No (N), then the method loops back to step 102, and returns to step 115 to finish calibration when the outdoor air conditions are suitable for measuring the OAF. If step 117 is Yes (Y), then the method proceeds to step 118 to monitor or measure and store the intermediate actuator voltage ($x_i$) for the intermediate damper position, measure and store the airflow characteristics, and calculate the OAF, ($y_i$) based on the OAT ($t_o$), the RAT ($t_r$), and the SAT ($t_s$) (or the MAT) preferably using equation Eq. 1. The method may also calculate the OAF using outdoor-air, return-air, and supply-air (or mixed-air) drybulb, wetbulb, relative humidity, humidity ratio, or CO2 measurements. After step 118, the method proceeds to step 120.

Figure 18:
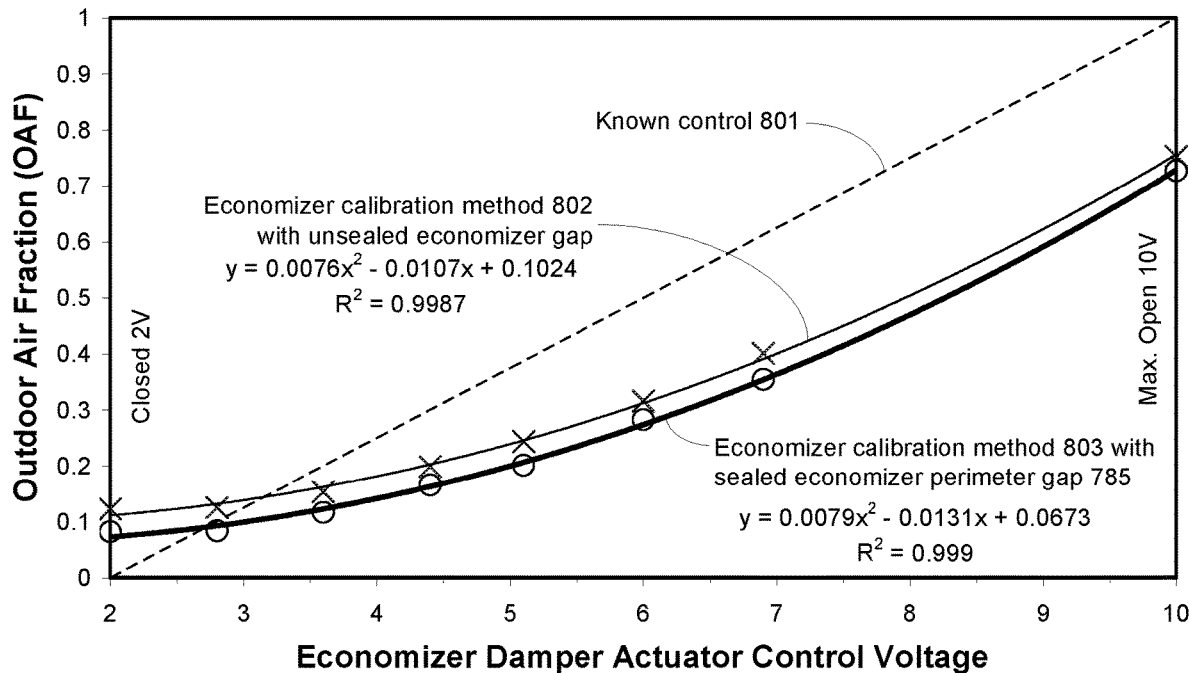
FIG. 18 shows measurements of OAF versus economizer actuator voltage measurements for economizer #1.

At step 120 of FIG. 1, the method determines, calculates, or recalculates the functional relationship between economizer control voltage ($x_i$) and the corresponding damper position $OAF_i$ ($y_i$), using at least one method selected from the group consisting of: fitting a straight line (y=mx+b) to the x-versus-y data for which the sum of the squares of the residual errors between the data and the straight line is a minimum (see FIG. 19), fitting an Nth order function to the x-versus-y data, a line-fit of a nth order equation to n+1 points, calculating the coefficients of the second order functional relationship between the economizer actuator voltage (x) and the corresponding damper position OAF (y) by solving three equations in three unknowns using the set of x-versus-y data (see FIG. 18), a least squares regression equation method involving n ordered pairs of the set of x-versus-y data (see FIG. 5), and a second order curve fit to a set of three x-versus-y data points to obtain the coefficients a, b, and c, for example, by solving three equations in three unknowns (see FIG. 5 or FIG. 18).

The second order curve fit method calculates three coefficients of a second order function based on the x-versus-y data using at least one step selected from the group consisting of: forming at least three equations where each of the at least three equations involves at least three coefficients, solving a first equation for a first coefficient, substituting a first equation for a first coefficient into a second equation and a third equation, multiplying the second equation or the third equation by a ratio to subtract and remove a second coefficient to solve for a third coefficient, substituting a third coefficient into the second equation to solve for the second coefficient, and substituting the first coefficient and the second coefficient into the first equation to solve for the third coefficient.

The least squares regression equation method may use the following equations (also shown in FIG. 6).

$$y_i = ax_i^2 + bx_i + c \qquad \text{Eq. 7}$$

Where, $y_i$=the corresponding damper position $OAF_i$ (0 to 1 dimensionless),
- $x_i$=economizer actuator voltage from 2V closed to 10V fully open (V),
- a=a first regression coefficient ($V^{-2}$),
- b=a second regression coefficient ($V^{-1}$), and
- c=a third regression coefficient (dimensionless).

The regression equation coefficients are calculated using the following matrix equations and measurements of the economizer actuator voltage (x) and the corresponding damper position OAF (y) for at least two damper positions, and preferably for at least three damper positions selected from the group consisting of: a closed damper position, at least one intermediate damper position, and a fully open damper position. Eq. 8 provides the element numbers used in the claims to refer to each row and each column of a 3×3 matrix X, a 3×1 matrix C and a 3×1 matrix Y. Eq. 9 provides the same element numbers with subscripts for the least squares regression equation method for each ordered pair of the set of x-versus-y data.

$$\underbrace{\begin{bmatrix} x11 & x12 & x13 \\ x21 & x22 & x23 \\ x31 & x32 & x33 \end{bmatrix}}_{X} \underbrace{\begin{bmatrix} c11 \\ c21 \\ c31 \end{bmatrix}}_{C} = \qquad \text{Eq. 8}$$

$$\underbrace{\begin{bmatrix} y11 \\ y21 \\ y31 \end{bmatrix}}_{Y} = \underbrace{\begin{bmatrix} \sum x_i^4 & \sum x_i^3 & \sum x_i^2 \\ \sum x_i^3 & \sum x_i^2 & \sum x_i \\ \sum x_i^2 & \sum x_i & n \end{bmatrix}}_{X} \underbrace{\begin{bmatrix} a \\ b \\ c \end{bmatrix}}_{C} = \underbrace{\begin{bmatrix} \sum x_i^2 y \\ \sum x_i y_i \\ \sum y_i \end{bmatrix}}_{Y}$$

$$\underbrace{\begin{bmatrix} x_{11} & x_{12} & x_{13} \\ x_{21} & x_{22} & x_{23} \\ x_{31} & x_{32} & x_{33} \end{bmatrix}}_{X} \underbrace{\begin{bmatrix} c_{11} \\ c_{21} \\ c_{31} \end{bmatrix}}_{C} = \qquad \text{Eq. 9}$$

$$\underbrace{\begin{bmatrix} y_{11} \\ y_{21} \\ y_{31} \end{bmatrix}}_{C} = \underbrace{\begin{bmatrix} \sum x_i^4 & \sum x_i^3 & \sum x_i^2 \\ \sum x_i^3 & \sum x_i^2 & \sum x_i \\ \sum x_i^2 & \sum x_i & n \end{bmatrix}}_{X} \underbrace{\begin{bmatrix} a \\ b \\ c \end{bmatrix}}_{C} = \underbrace{\begin{bmatrix} \sum x_i^2 y \\ \sum x_i y_i \\ \sum y_i \end{bmatrix}}_{Y}$$

Where, X=the 3×3 matrix X containing a number of n measurements or n monitored values of the actuator voltage x-values with exactly one n element (x33), n−1 summations of the x-values (x23 and x32), n summations of the x-values to the power n−1 (x13, x22, x31), n−1 summations of x-values to the power n (x12, x21), and exactly one summation of x-values to the power n+1 (x11), C=the 3×1 matrix C regression equation coefficient-matrix C containing the coefficients of a regression equation for a quadratic formula including a first coefficient a (c11), a second coefficient b (c21), and a third coefficient c (c31) of the functional relationship, and Y=the 3×1 matrix Y containing the damper position OAF y-values calculated from a number of n measurements of the economizer airflow characteristics corresponding to a number of n economizer actuator voltage x-values including one summation of y-values (y31), one summation of x-values times y-values (y21), and one summation of x-values to the power n−1 times y-values (y11).

The method includes solving the above equation by multiplying the 3×3 inverse-matrix X times the 3×1 matrix Y and obtaining the 3×1 coefficient-matrix C using the following equation.

$$C = X^{-1} Y \qquad \text{Eq. 11}$$

Where, $X^{-1}$=the 3×3 inverse-matrix X of the matrix X calculated according to the following equation, C=the 3×1 regression equation coefficient-matrix C containing a first coefficient a (c11), a second coefficient b (c21), and a third coefficient c (c31) of the regression equation for the quadratic formula, and Y=3×1 matrix Y described above.

The method includes solving the 3×3 inverse-matrix X using the following equations where the element numbers of the 3×3 inverse-matrix X are shown with subscripts.

$$X^{-1} = \qquad \text{Eq. 15}$$
$$\frac{1}{\det X} \begin{bmatrix} X_{22}X_{33} - X_{23}X_{32} & X_{13}X_{32} - X_{12}X_{33} & X_{12}X_{23} - X_{13}X_{22} \\ X_{23}X_{31} - X_{21}X_{33} & X_{11}X_{33} - X_{13}X_{21} & X_{13}X_{21} - X_{11}X_{23} \\ X_{21}X_{32} - X_{22}X_{31} & X_{12}X_{31} - X_{11}X_{32} & X_{11}X_{22} - X_{12}X_{21} \end{bmatrix}$$

$$\frac{1}{\det X} = \frac{1}{X_{11}X_{22}X_{33} + X_{21}X_{32}X_{13} + X_{31}X_{12}X_{23} - X_{11}X_{32}X_{23} - X_{31}X_{22}X_{13} - X_{21}X_{12}X_{33}} \qquad \text{Eq. 17}$$

Where, detX=determinant of the 3×3 matrix X which cannot equal zero.

After calculating the 3×1 coefficient-matrix C coefficients using the above equations or an alternative method at step 120, the method proceeds to step 121. At step 121 of FIG. 1 the OAF ECC method stores the first coefficient a (c11), the second coefficient b (c21), and the third coefficient c (c31) and the x-versus-y data including the economizer actuator voltages ($x_i$) and the corresponding damper position $OAF_i$ ($y_i$) values. Step 121 may optionally store the OAT, the RAT, and the SAT (or the MAT) data for reference.

At step 122 of FIG. 1, the OAF ECC method calculates the target economizer actuator voltage ($x_t$) as a function of the required $OAF_r$ ($y_r$) using the coefficients of the functional relationship based on the x-versus-y data. The target economizer actuator voltage ($x_t$) is calculated using Eq. 19. The target economizer actuator voltage ($x_t$) calculated based on a quadratic formula comprising: a first quantity: minus one times the second coefficient b (c21) plus a second quantity: the square root of a third quantity: the second coefficient b (c21) squared minus a fourth quantity: four times a first coefficient a (c11), times a fifth quantity: the coefficient c (c31) minus the required $OAF_r$ ($y_r$), where the first quantity is divided by a sixth quantity: two times the coefficient a (c11) according to the following equation.

$$x_t = \frac{-b + \sqrt{b^2 - 4a(c - y_t)}}{2a} = \frac{-b + \sqrt{b^2 - 4a(c - y_r)}}{2a} \quad \text{Eq. 19}$$

Where, $x_t$=target actuator voltage ($x_t$) to achieve the required $OAF_r$ ($y_r$) (V), and $OAF_r$=$y_r$=required $OAF_r$ ($y_r$)=the minimum Outdoor Airflow Fraction for the building occupancy based on ASHRAE 62.1 (ANSI/ASHRAE 62.1-2019. Standard Ventilation for Acceptable Indoor Air Quality) or a different minimum required $OAF_r$ ($y_r$) or intermediate OAF value based on other criteria selected by the user (dimensionless).

After the target economizer actuator voltage ($x_t$) is used to move the damper, the airflow characteristics are measures, and the target damper position $OAF_t$ ($y_t$) is calculated using Eq. 1. In Eq. 19, the variables $OAF_r$ (or $y_r$) may be substituted with the variables OAF (or y) using any numerical value from the closed damper position $OAF_c$ ($y_c$) to the fully open damper position $OAF_o$ ($y_o$) (a number less than 1.0) to calculate a corresponding target economizer actuator voltage (x) that can range from the closed actuator voltage ($x_c$) to the fully open actuator voltage ($x_o$).

At step 123 the method energizes the economizer actuator with the calculated or the adjusted target economizer actuator voltage ($x_t$), and moves the economizer damper towards the target damper position $OAF_t$ ($y_t$) or the adjusted target damper position $OAF_t'$($y_t'$). When the damper movement is complete, step 123 measures the target damper position $OAF_t$($y_t$) or the adjusted target damper position $OAF_t'$($y_t'$) computed based on airflow characteristics (described previously). The method then proceeds to step 124 to check if the target damper position $OAF_t$ ($y_t$) or the adjusted target damper position $OAF_t'$($y_t'$) is within a tolerance (for example +/−5%) of the required $OAF_r$ ($y_r$).

If step 126 is No (N), then method goes to step 125 to calculate an adjusted target economizer actuator voltage ($x_t'$) using Eq. 20 where the target economizer actuator voltage ($x_t$) (computed in step 123) is used to calculate the adjusted target economizer actuator voltage ($x_t'$) to adjust the damper position to provide an adjusted target damper position $OAF_t'$ ($y_t'$) within the tolerance of the required $OAF_r$ ($y_r$). The following Newton's method equation is used to calculate the adjusted target economizer actuator voltage ($x_t'$) based on the present value of the target economizer actuator voltage ($x_t$) minus a ratio of a numerator comprising the zero value of the function f(x) or f($x_o$) divided by a derivative of the zero value of the function f($x_o$) or df($x_o$)/dx with respect to the target economizer actuator voltage ($x_t$).

$$x_t' = x_o - \frac{f(x_o)}{df(x_o)/dx} = x_t - \frac{y_t - y_r}{2ax_t + b} \quad \text{Eq. 20}$$

Where, $x_t'$=present value of the adjusted target actuator voltage (V), f($x_o$)=zero value of the function f(x) based on Eq. 7=difference between the present target damper position OAF ($y_t$) computed in step 123 minus the required OAF ($y_r$)=$y_t$−$y_r$ (dimensionless), df($x_o$)/dx=derivative of the function f($x_o$) based on Eq. 7 ($V^{-1}$), $x_t$=$x_o$=the present target actuator voltage computed in step 122 (V), $y_t$=present target damper position ($OAF_t$) computed in step 123 based on measured airflow characteristics (dimensionless), $y_r$=required $OAF_r$ based on ASHRAE 62.1 or other criteria (dimensionless), a=first coefficient of $x^2$ term of line fit, and b=second coefficient of x term of line fit.

After step 125 and depending on the magnitude of the adjusted target economizer actuator voltage ($x_t'$), the OAT, the building occupancy, or presence of a call for cooling or heating, the economizer controller calibration method includes returning to at least one step selected from the group consisting of:

a) step 123 where the adjusted target economizer actuator voltage ($x_t'$) is used to move the economizer damper, measure airflow characteristics, and calculate the adjusted target damper position $OAF_t'$($y_t'$);

b) step 115 through step 123 where the adjusted target economizer actuator voltage ($x_t'$) replaces the intermediate economizer actuator voltage ($x_i$) and the adjusted target economizer actuator voltage ($x_t'$) is used to move the damper at step 115, measure airflow characteristics to compute the coefficients of a recalculated functional relationship at step 120, and compute a second adjusted target economizer actuator voltage ($x_t'$) using the required $OAF_r$ ($y_r$) and the recalculated functional relationship at step 122, and the second adjusted target economizer actuator voltage ($x_t'$) is used to move the damper and measure the a second adjusted target damper position $OAF_t'$($y_t'$) at step 123; and c) step 120 through step 123 where the adjusted target economizer actuator voltage ($x_t'$) replaces the intermediate economizer actuator voltage ($x_i$) and the required $OAF_r$ ($y_r$) replaces the intermediate $OAF_i$ ($y_i$) to compute the coefficients of a recalculated functional relationship at step 120, and compute a second adjusted target economizer actuator voltage ($x_t'$) using the required $OAF_r$ ($y_r$) and the recalculated functional relationship at step 122, and the second adjusted target economizer actuator voltage ($x_t'$) is used to move the damper and measure a second adjusted target damper position $OAF_t'$($y_t'$) at step 123. The method may repeat step 125 if necessary, but generally does not require another calculation step to achieve an adjusted target damper position $OAF_t'$($y_t'$) within +/−5% of the required $OAF_r$ ($y_r$).

After step 123, the method proceeds to step 126 to check if the target damper position $OAF_t$ ($y_t$) or the adjusted target damper position $OAF_t'$($y_t'$) is within a tolerance (for example +/−5%) of the required $OAF_r$ ($y_r$). If step 126 is No (N), the method returns to step 125 to calculate the adjusted economizer actuator voltage ($x_t'$) again, and loops back through the at least one step described above. If step 126 is Yes (Y), then the method proceeds to step 128.

At step 128 the OAF calibration method ends. After step 128 the method may go to FIG. 2 "HVAC FDD methods" or to FIG. 3 to the "Heating Economizer Damper Position FDD" method or to FIG. 4 to perform the FDD Cooling Delay Correction (CDC) method.

The OAF ECC method shown in FIG. 1 may be implemented manually or automatically on units with an analog economizer controller with temperature sensors and economizer actuator voltage output signals. The method may also be implemented on units with a digital economizer controller with FDD capabilities, temperature, RH, enthalpy, or $CO_2$ sensors, and economizer actuator voltage output signals. The method may optionally comprise calculating the OAF based on Relative Humidity (RH), Humidity Ratio (HR), Carbon Dioxide ($CO_2$) concentration (ppm), or tracer gas concentration in the return airflow, the supply airflow (or the mixed airflow), and the outdoor airflow. The method may also comprise calculating humidity ratio (lbm/lbm) of return-air $W_r$, outdoor-air, $W_o$, supply-air $W_s$ (or mixed-air $W_m$) using the Hyland Wexler formulas from the 2013 ASHRAE Handbook. The method may also comprise calculating the saturation humidity ratio ($W^*_s$) from the saturation pressure ($p_{ws}$).

Figure 2:
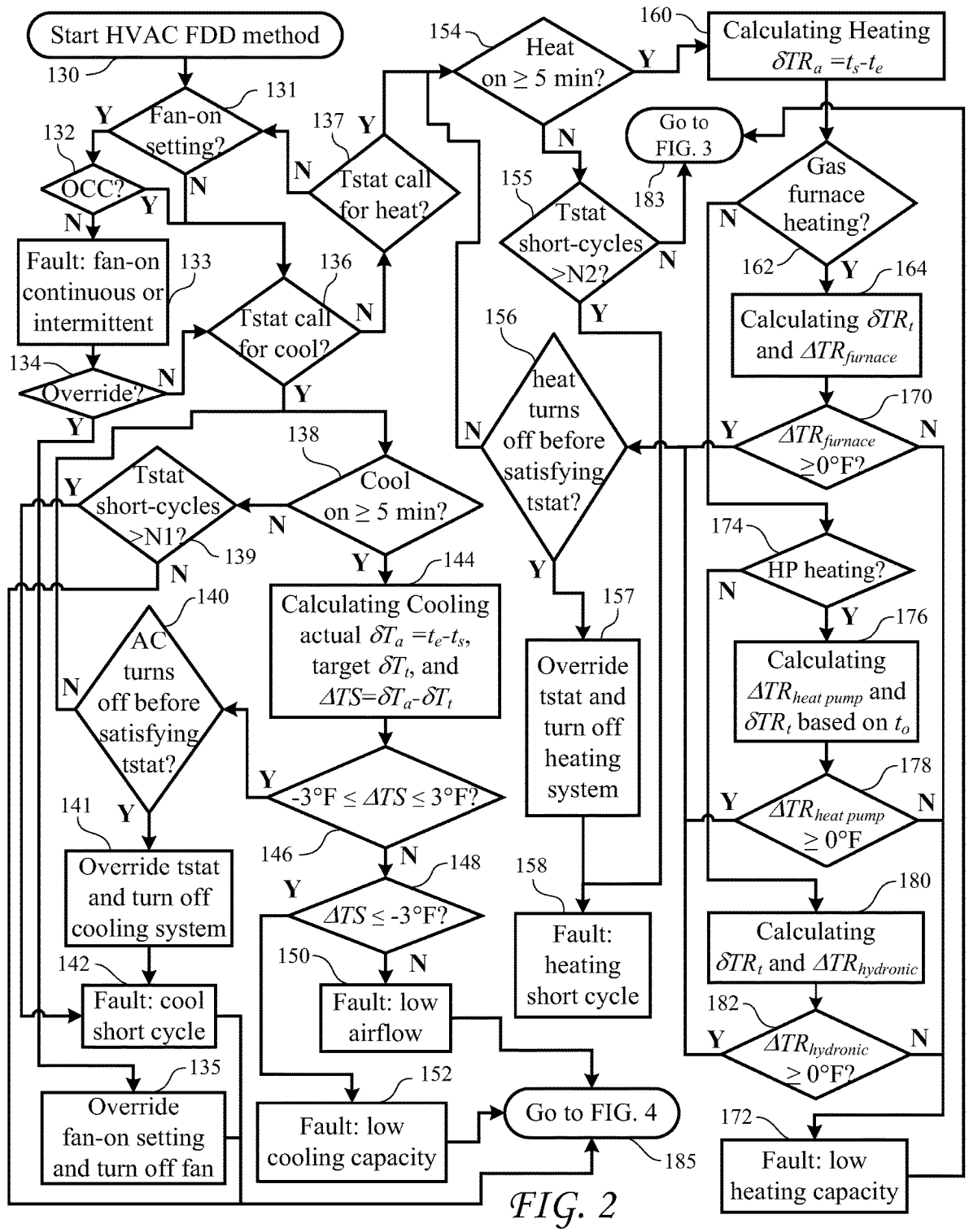
FIG. 2 shows a method for an HVAC Fault Detection Diagnostic (FDD) method while the HVAC system is operating, according to the present invention.

FIG. 2 shows a method for performing a Fault Detection Diagnostic (FDD) method on an HVAC system while the HVAC system is operating. The FDD method starts at step 130 and proceeds to step 131. If Step 131 is Yes (Y), a fan-on setting is operating, then the method proceeds to step 132 to check if the conditioned space is occupied based on a geofencing signal or an occupancy sensor signal. If step 132 is Yes (Y), then the method proceeds to step 136 to check the thermostat call for cooling. If step 132 is No (N), conditioned space is not occupied, then the method proceeds to step 133 to provide a "FDD alarm: fan-on continuously fault or fan-on intermittently fault." After step 133, the method proceeds to step 134 to determine whether or not to "override" the fan-on setting? If step 134 is No (N), the method loops back to step 136 to check the thermostat call for cooling. If step 134 is Yes (Y), override the fan-on setting, then the method proceeds to step 135 and overrides the fan-on setting to turn off the HVAC fan. After step 134, the FDD method proceeds to step 185 to Go to FIG. 4 step 700 to continue the thermostat call for cooling for the FDD CDC method (including known economizer or DX AC cooling).

If step 131 is No (N), the fan-on setting is not operating, then the method proceeds to Step 136 and checks whether or not the HVAC system is in cooling or heating mode. If in cooling mode, the method includes detecting and diagnosing low airflow and low cooling capacity faults in steps 138 through 185. In some embodiments in cooling mode, the method includes performing FDD of refrigerant superheat based on $t^*_m$ and $t_o$ in steps 138 through 185. If in heating mode, the method includes FDD for low heating capacity and fan-on faults in steps 154 through 182.

At step 138 of FIG. 2, the FDD method checks if the cooling system has operated for a minimum operating time (at least 5 minutes). If step 138 is Yes (Y), the cooling system is on for 5 minutes, then the method proceeds to step 144 (skip to next paragraph). If step 138 is No (N), then the method continues to step 139 to check for if the number of thermostat short-cycle cooling events is greater than N1 where N1 is based on at least one number of cooling short-cycles selected from the group consisting of: user-selected number of cooling short-cycles from 2 to 10, a number of cooling short-cycles based on the OAT, a number of cooling short-cycles based on a cooling capacity of the AC compressor, a number based on the cooling cycle duration.

Figure 4:
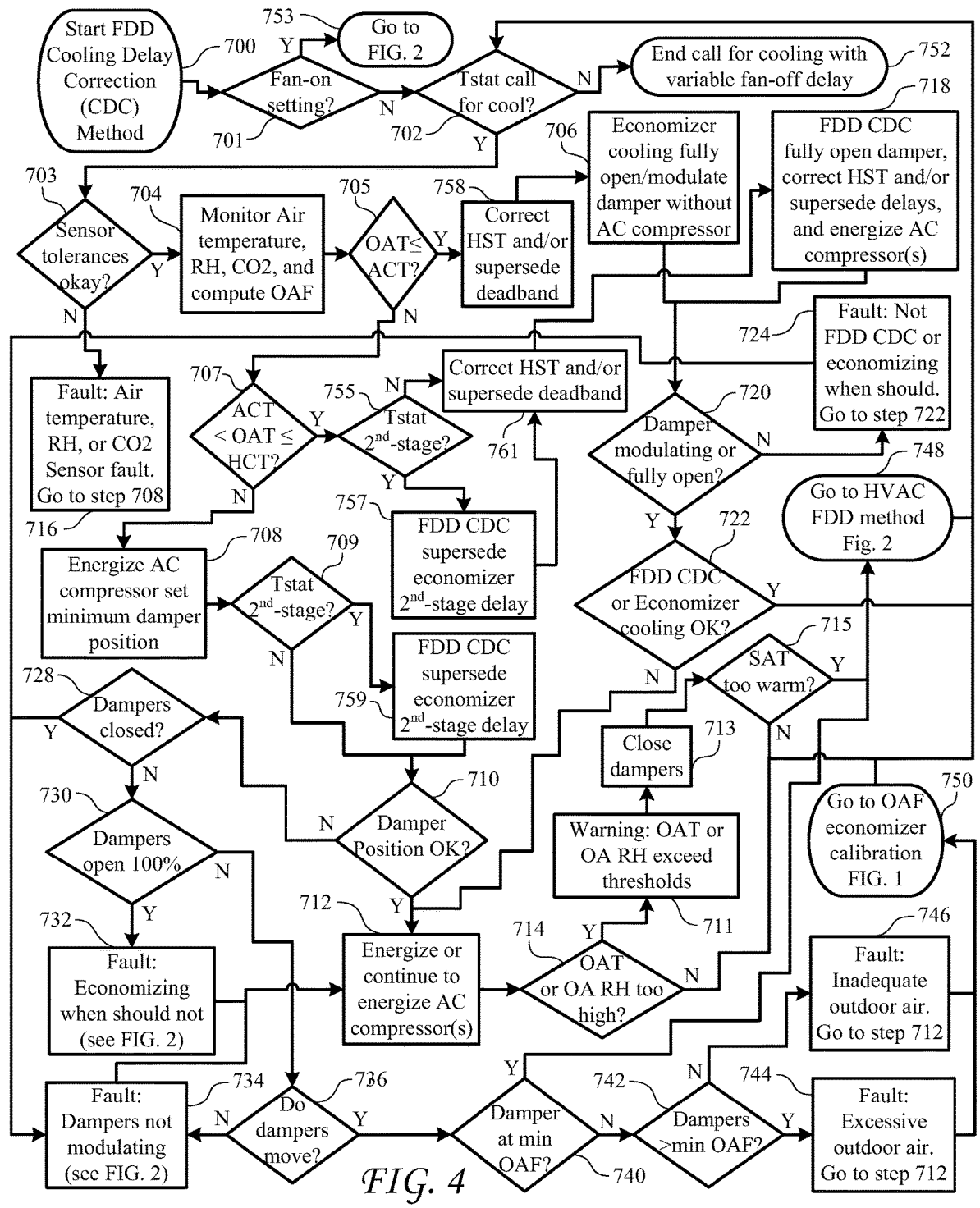
FIG. 4 shows a flow chart according to the present invention of: 1) FDD Cooling Delay Correction (CDC) method; 2) conventional economizer cooling; 3) DX AC cooling; and 4) a variable fan-off delay based on HVAC parameters.

If step 139 of FIG. 2 is Yes (Y), the number of thermostat short-cycle cooling events is greater than N1, then the method proceeds to step 142 to provide an FDD alarm cooling short cycle fault, and proceeds to step 185 to Go to FIG. 4 step 700 to continue the thermostat call for cooling for the FDD CDC method. If step 139 is No (N), the number of thermostat short-cycle cooling events is not greater than N1, then the method proceeds to step 185 to Go to FIG. 4 for the FDD CDC method.

At step 144 of FIG. 2, the method includes calculating the actual Temperature Split (TS) difference ($dT_a$) based on the entering air-drybulb temperature EAT (or $t_e$) minus the supply air-drybulb temperature (SAT) (or $t_s$) according to the following equation.

$$\delta T_a = t_r - t_e = RAT - EAT \qquad \text{Eq. 21}$$

Where, $t_e$=EAT=entering air-drybulb temperature (F) is calculated using the following equation based on the calibrated OAF from the OAF economizer calibration method in FIG. 1.

$$t_e = EAT = RAT + (OAT - RAT)OAF \qquad \text{Eq. 22}$$

Where, RAT=return air-drybulb temperature (F),
OAT=outdoor air-drybulb temperature (F), and
OAF=Outdoor Air Fraction (dimensionless).

The entering air may also be referred to as the air entering the evaporator which may also be referred to as the mixed air (i.e., mixture of return air and outdoor air). At step 144, the method comprises calculating the target TS difference ($dT_t$) across the cooling system evaporator and the delta TS difference ($\Delta TS$) defined as the actual TS minus the target TS. The method comprises calculating the target TS difference ($dT_t$) using a target TS lookup table, where the independent variables are the evaporator Entering Air-drybulb EAT (or $t_e$) and evaporator entering air wetbulb temperature, $t^*_e$. The method also comprises calculating the target TS difference ($dT_t$) using the following equation.

$$dT_t = C_7 + C_8 t_e + C_9 t_e^2 + C_{10} t^*_e + C_{11} t^{*2}_e + C_{12}(t_e \times t^*_e) \qquad \text{Eq. 23}$$

Where, $dT_t$=target temperature difference between entering air (or return air) and supply air in cooling mode (F),
$t_e$=measured entering air-drybulb temperature (F),
$t^*_e$=entering air wetbulb temperature (F),
$C_7$=−6.509848526 (F),
$C_8$=−0.942072257 (dimensionless),
$C_9$=0.009925115 ($F^{-1}$),
$C_{10}$=1.944471104 (dimensionless),
$C_{11}$=−0.0208034037991888 ($F^{-1}$)
$C_{12}$=−0.000114841 ($F^{-1}$)

At step 144 of FIG. 2, the method also includes calculating the delta TS difference ($\Delta TS$) based on the actual TS difference ($dT_a$) minus the target TS difference ($dT_t$) using the following equation.

$$\Delta TS = dT_a - dT_t \qquad \text{Eq. 25}$$

Where, $\Delta TS$=delta TS difference between actual TS and target TS (F).

At step 146 the method checks whether or not the delta TS difference is within plus or minus of the delta TS threshold, preferably ±3 F (or a user input value). If the delta TS difference is within plus or minus of the delta TS threshold (or the user input value), then the cooling system is within tolerances, no FDD alarm signals are generated, and the method proceeds to step 148 to check if the delta TS difference is less than −3 F.

If step 148 of FIG. 2 is No (N), then the method determines the TS>3 F indicating low airflow, then the method continues to step 150 and reports an FDD alarm fault: "low airflow" which can cause ice to form on the air filter and evaporator and block airflow and severely reduce cooling capacity and efficiency. The method then proceeds to step 185, Go to FIG. 4 step 700 of the FDD CDC method to continue call for cooling.

If step 148 is Yes (Y), the delta TS difference ($\Delta TS$) is less than a negative minimum delta TS difference threshold (preferably less than −3 F or a user input value), then the method proceeds to step 152 and provides a FDD alarm fault: "low cooling capacity" which can be caused by many faults including excess outdoor airflow, dirty or blocked air filters, blocked evaporator caused by dirt or ice buildup, blocked condenser coils caused by dirt or debris buildup, low refrigerant charge, high refrigerant charge, refrigerant restrictions, or non-condensable air or water vapor in the refrigerant system.

After step 152, the method proceeds to step 185, Go to FIG. 4 step 700 for the FDD CDC method and continue call for cooling.

If step 146 is no, then the method proceeds to step 140 to check if the AC compressor is turning off before satisfying the thermostat call for cooling. If step 140 is Yes (Y), then the method proceeds to step 141 to override the thermostat call for cooling and turn off the cooling system by de-energizing the cooling signal to the AC compressor. Step 140 can be determined based on the Temperature Split (TS) between the RAT and SAT. If the TS is decreasing during the call for cooling, then the method will detect the AC compressor is turning off before satisfying the thermostat. The FDD method can also use a wired or wireless signal to detect the AC compressor contactor signal being de-energized by the control board during the call for cooling indicating a short-cycle fault. After step 141, the FDD method proceeds to step 142 and generates a FDD alarm reporting a "cooling short-cycle" fault via display, text, email, or other message. If step 140 is No (N), then the method loops back to step 138.

The FDD method for heating starts when step 136 is No (N), the thermostat is not calling for cooling, and then the method proceeds to step 137 to check if the thermostat is calling for heating. If step 137 is No (N), then the method loops back to step 132 to check the fan-on setting? If step 137 is Yes (Y), the thermostat is calling for heating, then the method proceeds to step 154.

At step 154 of FIG. 2, the FDD method checks if the heating system has operated for a minimum heating operating time (at least 5 minutes). If step 154 is No (N), then the method continues to step 155 to check for if the number of thermostat short-cycle heating events is greater than N1 where N1 is based on at least one number of heating short-cycles selected from the group consisting of: user-selected number from 2 to 10, a number based on the OAT, a number based on a heating capacity, a number based on the heating cycle duration. If step 155 is Yes (Y), the number of thermostat short-cycle cooling events is greater than N1, then the method proceeds to step 158 to provide an FDD alarm heating short cycle fault. If step 155 is No (N), the number of thermostat short-cycle heating events is not greater than N1, then the method loops back to step 183 to Go to FIG. 2 step 600 to continue the thermostat call for heating.

Step 156 of FIG. 2 and checks for a heating short-cycle (i.e., successive short-cycle heating operation) or detecting heating system turning off before satisfying the thermostat call for heating. Step 156 can be determined based on the Temperature Rise (TR) between the SAT and the MAT. If the TR is decreasing during the thermostat call for heating, then the FDD method will detect the heating system is turning off before satisfying the thermostat. The FDD method can also use a wired or wireless electrical signal to detect the burner signal for a gas furnace or heat pump compressor signal being de-energized by the control board during the call for heating indicating a short-cycle fault. If step 156 is Yes (Y), then the method proceeds to step 157 to override the call for heating and turn off the heating system by de-energizing the signal to the heat source. After step 157, the FDD method proceeds to step 158 and generates a FDD alarm reporting a heating short cycle fault via display, text, email, or other message. If step 156 is No (N), then the method loops back to 154 and checks if the heating system has been operating for greater then a minimum run time, preferably ten minutes.

After at least the minimum heater run time of the heating system operation at Step 160, the method includes calculating the actual temperature rise ($dTR_a$) for heating based on the Supply Air Temperature (SAT) minus the Entering Air Temperature (EAT) according to the following equation.

$$\delta TR_a = t_s - t_e = SAT - EAT \qquad \text{Eq. 27}$$

At step 162, the method includes checking whether or not the heating system is a gas furnace, and if the method determines the heating system is a gas furnace, then the method proceeds to step 164.

At step 164, the method includes calculating the minimum acceptable target supply-air temperature rise for a gas furnace which is preferably a function of airflow and heating capacity based on furnace manufacturer temperature rise data, and is preferably 30 F as shown in the following equation.

$$\delta TR_{t_{furnace}} = 30 \qquad \text{Eq. 31}$$

Where, $\delta TR_{t_{furnace}}$=minimum acceptable furnace temperature rise (F).

The minimum acceptable furnace temperature rise may vary from 30 to 100 F or more depending on make and model, furnace heating capacity, airflow, and return temperature.

At step 164, the method also includes calculating the delta temperature rise for the gas furnace heating system, $\Delta TR_{furnace}$, according to the following equation.

$$\Delta TR_{furnace} = \delta T_a - \delta TR_{t_{furnace}} \qquad \text{Eq. 33}$$

At step 170 the method includes calculating whether or not the delta temperature rise for the furnace is greater than or equal to 0 F according to the following equation.

$$\Delta TR_{furnace} = \delta T_a - \delta TR_{t_{furnace}} \geq 0 \qquad \text{Eq. 35}$$

At step 170, if the method determines the delta temperature rise for the furnace is greater than or equal to 0 F, then the gas furnace heating system is considered to be within tolerances, no FDD alarm signals are generated, and the method includes a loop to continue checking the temperature rise while the furnace heating system is operational using steps 160 through 170.

At step 170, if the method determines the delta temperature rise for the furnace is less than 0 F, then proceeds to step 172.

At step 172, for a gas furnace heating system, the method comprises preferably providing at least one FDD alarm signal reporting a low heating capacity fault which can be caused by excess outdoor airflow, improper damper position, improper economizer operation, dirty or blocked air filters, low blower speed, blocked heat exchanger caused by dirt buildup, loose wire connections, improper gas pressure or valve setting, sticking gas valve, bad switch or flame sensor, ignition failure, misaligned spark electrodes, open rollout, open limit switch, limit switch cycling burners, false flame sensor, cracked heat exchanger, combustion vent restriction, improper orifice or burner alignment, or non-functional furnace. After step 172, the method loops back to step 183 to Go to FIG. 2 step 600 to continue the call for heating.

At step 162 of FIG. 2, the method includes checking whether or not the heating system is a gas furnace, and if the method determines the heating system is not a gas furnace, then the method proceeds to step 170.

At step 174, the method includes checking whether or not the heating system is a heat pump, and if the method determines the heating system is a heat pump, then the method proceeds to step 176.

pump heating based on the minimum acceptable target temperature rise which is preferably a function of OAT as shown in the following equation based on heat pump manufacturer minimum acceptable temperature rise data.

$$\delta TR_{t\,heat\,pump}=[C_{21}t_o^2+C_{22}t_o+C_{23}] \qquad \text{Eq. 37}$$

Where, $\delta TR_{t_{heat\,pump}}$=minimum acceptable heat pump temperature rise,
$C_{21}$=0.0021 (F$^{-1}$),
$C_{22}$=1.845 (dimensionless), and
$C_{23}$=8.0 (F).

Temperature rise coefficients may vary depending on user input, heat pump model, heating capacity, airflow, OAT, and return air (or entering air) temperature. Minimum temperature rise coefficients for a heat pump are based on an OAT ranging from −10 F to 65 F, airflow from 300 to 400 cfm/ton, and return temperatures from 60 to 80 F.

At step 176, the method also includes calculating the delta temperature rise for the heat pump heating system, $\Delta TR_{heat\,pump}$, according to the following equation.

$$\Delta TR_{heat\,pump}=\delta T_a-\delta TR_{t_{heat\,pump}} \qquad \text{Eq. 38}$$

At step 178, the method includes calculating whether or not the delta temperature rise for the heat pump heating system is greater than or equal to 0 F according to the following equation.

$$\Delta TR_{heat\,pump}=\delta T_a-\delta TR_{t_{heat\,pump}} \geq 0 \qquad \text{Eq. 39}$$

At step 178, if the method determines the delta temperature rise for the heat pump is greater than or equal to 0 F, then the heat pump heating system is considered to be within tolerances, no FDD alarm signals are generated, and the method includes a loop to continue checking the temperature rise while the heat pump heating system is operational using steps 160 through 178.

At step 178 of FIG. 2, if the method determines the delta temperature rise for the heat pump is less than 0 F, then the method proceeds to step 172.

At step 172 of FIG. 2, for a heat pump heating system, the method includes preferably providing at least one FDD alarm signal reporting a low heating capacity fault to check the system for low heating capacity. After step 172, the method loops back to step 183 to Go to FIG. 2 step 600 to continue the call for heating.

At step 174, if the method determines the heating system is not a heat pump, then the method proceeds to step 180.

At step 180, the method measures the target temperature rise for the hydronic heating system based on the minimum acceptable target supply-air temperature rise according to the following equation which is preferably a function of hot water supply temperature and may vary from 18 to 73 F depending on airflow, coil heating capacity, and hot water supply temperature, $t_{hw}$.

$$\delta TR_{t_{hydronic}}=[C_{25}t_{hw}+C_{26}] \qquad \text{Eq. 41}$$

Where, $\delta TR_{t_{hydronic}}$=minimum acceptable hydronic temperature rise,
$C_{25}$=0.35 (F$^{-1}$), and
$C_{26}$=−24 (F).

The method also includes the following simplified equation to measure the target temperature rise for the hydronic heating system for all systems regardless of hot water supply temperature.

$$\delta TR_{t_{hydronic}}=C_{27} \qquad \text{Eq. 42}$$

Where, $\delta TR_{t_{hydronic}}$=minimum acceptable hydronic temperature rise,
$C_{27}$=19 F.

At step 180, the method also includes calculating the delta temperature rise for the hydronic heating system according to the following equation.

$$\delta TR_{t_{hydronic}}=\delta T_a-\delta TR_{t_{hydronic}} \qquad \text{Eq. 43}$$

At step 182, the method includes calculating whether or not the delta temperature rise for the hydronic heating systems greater than or equal to 0 F according to the following equation.

$$\delta TR_{t_{hydronic}}=\delta T_a-\delta TR_{t_{hydronic}} \geq 0 \qquad \text{Eq. 45}$$

At step 182 of FIG. 2, if the method determines the delta temperature rise for the hydronic heating system is greater than or equal to 0 F, then the hydronic heating system is considered to be within tolerances, no FDD alarm signals are generated, and the method includes a loop to continue checking the temperature rise while the hydronic heating system is operational using steps 160 through 182.

At step 182 of FIG. 2, if the method determines the delta temperature rise for the hydronic heating system is less than 0 F, then the method proceeds to step 172.

At step 172 of FIG. 2, for a hydronic heating system, the method includes preferably providing at least one FDD alarm signal reporting a low heating capacity fault to check the system for low heating capacity. After step 172, the method loops back to step 183 and Go to FIG. 2 step 600 call for heating.

Figure 3:
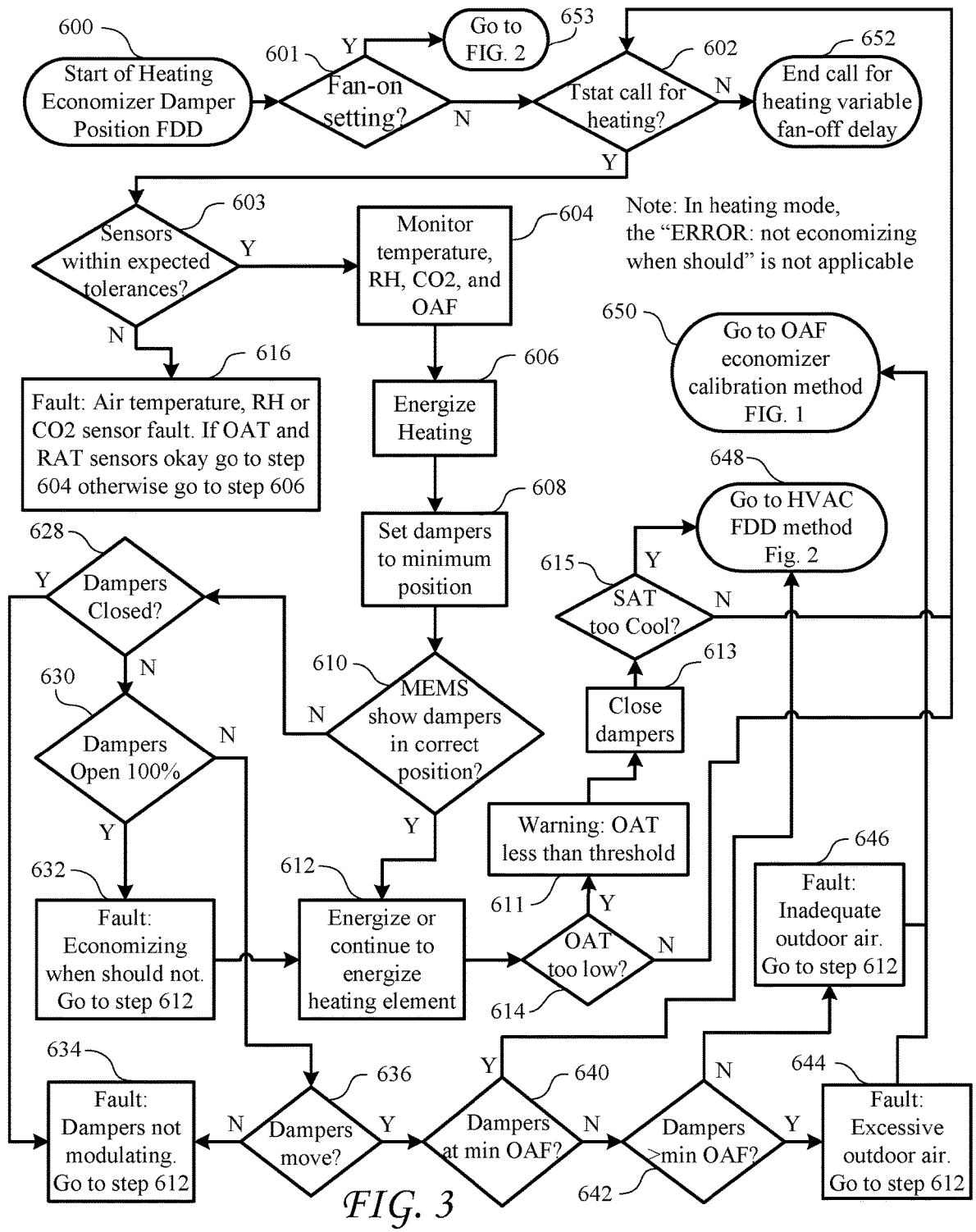
FIG. 3 shows a flow chart according to the present invention of a FDD method during a thermostat call for heating.

FIG. 3 shows the heating economizer damper position FDD method using a magnetometer or other MEMS device to measure the physical position of the dampers and determine if there is a fault with the economizer damper positioning mechanism. The FDD process involves positioning the dampers to a fully closed position, intermediate position, and fully open damper position and a MEMS device is sampled to measure and store these positions. As the dampers modulate between the fully closed and fully open positions, the MEMS device provides an angular value and the physical position of the dampers can be calculated.

Step 600 is the start of the heating economizer damper position FDD method. In step 601, the method checks if the fan-on setting is enabled. If step 601 is Yes (Y), then the method proceeds to step 653 to Go to FIG. 2 FDD HVAC Methods. If step 601 is No (N), then the method proceeds to step 602 to check if there is a thermostat a call for cooling. If step 602 is No (N), the thermostat call for heating has ended, then the method proceeds to step 652 and after a thermostat call for heating, the method provides a variable fan-off delay based on detecting the OAT is less than or equal to the CST or RAT, and the method further including positioning the economizer damper to a minimum position or a closed position and operating the HVAC fan for the variable fan-off delay until the CST or RAT reach at least one threshold selected from the group consisting of: a maximum temperature, and the rate of change of the CST or RAT with respect to time reach an inflection point and start to decrease. At step 602, if Yes (Y), there is a thermostat call for heating, then the method proceeds to step 603.

Step 603 determines if the air temperature, RH, CO2 sensors, and the magnetometer MEMS device within expected tolerances or failed/faulted. Step 603 continuously monitors the OAT, MAT, RAT, RH, and CO2, and computes the OAF based on air temperature, RH, or CO2 measurements.

If step 603 is No (N), then the method proceeds to step 616 to flag this fault and provide a FDD alarm "Fault: air temperature, RH, or CO2 sensor failure/fault" for sensors not working. If the OAT and RAT sensors are okay, then the FDD method proceeds to step 604. Otherwise, if the OAT and RAT sensors are faulted and the economizer controller cannot work properly, then the FDD method continues to step 606 to energize the heating system.

If step 603 is Yes (Y), then the method proceeds to continuously monitor the OAT, MAT, and RAT air temperature, RH, and CO2 sensors, and compute the OAF based on sensor measurements of air temperature, RH, and CO2 concentration.

In step 606, the method energizes the heating system and the method proceeds to step 608. In step 608, the economizer positions the dampers to the minimum position to provide a minimum amount of outdoor air to the conditioned space to satisfy the ASHRAE 62.1 minimum IAQ requirements or Demand Control Ventilation (DCV) based on carbon dioxide thresholds (typically ~1000 ppm per ASHRAE 62.1-2019). The method then proceeds to step 610.

Step 610 uses the magnetometer MEMS device to determine if the actuator responded by positioning the damper to the correct minimum position. This will be indicated by the MEMS device providing an angular reading that the dampers have been positioned to the minimum position. If the dampers are at the minimum position, the method proceeds to step 612 and heating continues to be enabled. If the MEMS device indicates an incorrect damper position, then the method proceeds to step 628.

If step 628 is (Y) the dampers are in the closed position, the method proceeds to step 634 and the economizer provides a FDD alarm "Fault: dampers not modulating." If step 628 is No (N), the dampers are not in a closed position, then the method proceeds to step 630. If step 630 is Yes (Y), the dampers are 100% open, the method proceeds to step 632 and provides a FDD alarm "Fault: economizing when should not."

If step 630 is No (N), the dampers are not 100% open, then the method proceeds to step 636. If step 636 is No (N), the dampers did not move, then the method proceeds to step 634 and the economizer provides a FDD alarm "Fault: dampers not modulating." If step 636 is Yes (Y), the dampers move, then the method proceeds to step 640. If step 640 is Yes (Y), the dampers are the minimum position, then the method proceeds to step 648 to go to the FDD evaluation method FIG. 2.

If step 640 is No (N), the dampers are not at the minimum position, then method proceeds to step 642. If step 642 is Yes (Y), the damper position is greater then the minimum position, then the method proceeds to step 644 and provides a FDD alarm "Fault: excessive outdoor air" entering the conditioned space and proceeds to step 650 to go to the OAF ECC method FIG. 1 to correct this fault. If step 642 is No (N), the dampers are less than the minimum position, then the method proceeds to step 646 and provides a FDD alarm "Fault: inadequate outdoor air" and proceeds to step 650 and to FIG. 1 of the OAF ECC method to correct this fault.

After step 610 the method proceeds to step 612 to enable or continue enabling the heating element and proceeds to step 614. If step 614 is Yes (Y) the economizer low limit setpoint OAT is too low during heating (OAT less than −20 F to 32 F), then the method goes to step 611 and provides a: "FDD alarm or warning: OAT less than the outdoor air low-limit threshold" and the method proceeds to 613 to close the dampers by overriding the actuator voltage control signal based on a geofencing or occupancy sensor signal (OCC). If step 614 is No (N), the method returns to step 602.

At step 613, the microprocessor overrides the economizer actuator voltage control signal based on a geofencing or occupancy sensor signal (OCC) and closes the dampers. The method closes the economizer dampers to reduce excess outdoor airflow from entering the mixed air chamber to satisfy the thermostat call for heating and save energy. After step 613, the method proceeds to step 615.

If step 615 is Yes (Y), the SAT is too cool (i.e., below 105 F or Temperature Rise [TR] less than 30 F), then the method proceeds to step 648 to go to the HVAC FDD Method FIG. 2 to determine if another heating fault is present. If step 615 is No (N), the SAT is above hot (i.e., above 105 F or TR greater than 30 F) and the heating system is able to meet the SAT minimum requirement, then the method loops back to 602 to continue heating until the thermostat call for heating is satisfied.

FIG. 4 provides a flow chart for the present invention Fault Detection Diagnostic (FDD) Cooling Delay Correction (CDC) method to improve energy efficiency for a Heating, Ventilating, Air Conditioning (HVAC) system with an economizer and a thermostat by fully opening an economizer damper and simultaneously energizing a DX AC system (including the first-stage DX AC compressor and HVAC fan) based on receiving a first-stage cooling signal from a thermostat when an Outdoor Air Temperature (OAT) is greater than the ACT and the OAT is less than or equal to the HCT. The FDD method may also comprise calibrating the economizer by sealing an economizer perimeter gap to reduce uncontrolled outdoor airflow, and determining a functional relationship between the economizer actuator voltage and a corresponding damper position Outdoor Airflow Fraction (OAF) using a line-fit equation or least squares matrix regression equation (discussed in FIG. 5 and FIG. 6). The OAF is defined as a ratio of an outdoor air volumetric flow rate through the economizer divided by a total HVAC system volumetric flow rate. The OAF is calculated based on measurements of at least one airflow characteristic selected from the group consisting of: an air temperature, an air relative humidity, an air humidity ratio, a volumetric flow rate, a Carbon Dioxide (CO2) concentration, and a tracer gas concentration. The FDD method detects, reports, corrects, and supersedes economizer and HVAC faults including: an economizer deadband delay, a thermostat second-stage time or temperature deadband delay, an economizer second-stage mechanical cooling time delay or temperature delay, a cooling or heating short-cycle fault, fan-on setting fault, a sensor/damper/actuator fault, and an insufficient or excess outdoor air fault.

The FDD method includes operating an HVAC fan for a variable fan-off delay after a thermostat call for cooling or heating based on a difference between a MAT and a SAT, where the MAT is based on an economizer damper position and an HVAC fan operating and providing a mixture of an outdoor airflow at an OAT and a return airflow at a RAT. The FDD method for overriding an economizer actuator control signal may be based on a geofencing/occupancy signal, and closing the economizer damper when the OAT conditions are above/below an OAT threshold temperature.

The method uses a magnetometer, MEMS sensor, or other suitable sensor to measure the physical damper position and determine whether or not there is a fault with the economizer damper position actuator mechanism. The method determines a computed OAF with respect to a damper position command or the economizer actuator voltage command (i.e., closed, intermediate, or fully open position) where the computed OAF is based on the ratio of the difference between the RAT minus the MAT divided by the difference between the RAT minus the OAT. The computed OAF may also be based on humidity or CO2 measurements.

FIG. 4 step 700 is the start of the FDD Cooling Delay Correction (CDC) method which detects, supersedes, and corrects: 1) an HST deadband delay, 2) a thermostat second-stage time delay or a thermostat second-stage deadband temperature delay; and 3) an economizer second-stage cooling signal time delay. In step 701, the method checks if the fan-on setting is enabled. If step 701 is Yes (Y), then the method proceeds to step 753 to Go to FIG. 2 FDD HVAC Methods. If step 701 is No (N), then the method proceeds to step 702 to check if there is a thermostat a call for cooling. In step 702, the method monitors signals from the thermostat to determine if there is a thermostat call for cooling. If the thermostat call for cooling has ended at step 702, then the method proceeds to step 752, and at end of thermostat call for cooling provides a variable fan-off delay based on at least one HVAC parameter selected from the group consisting of: a thermostat call for cooling, a cooling cycle duration P4, a thermostat call for heating, a heating cycle duration P3, and an air temperature difference between the MAT and the SAT where the MAT is based on a mixture of outdoor air and return air. If step 702 call for cooling is Yes (Y), then the method proceeds to step 703.

At step 703 of FIG. 4, the FDD method determines if the air temperature, RH, CO2 sensors, and the magnetometer MEMS device are within expected tolerances. If step 703 is No (N), one or more sensors are an open circuit or a short circuit, then the method proceeds to step 716 to flag this fault and provide a FDD alarm "Fault: air temperature, RH, or CO2 sensor failure/fault" for sensors not working. If the OAT and RAT sensors are okay and step 703 is Yes (Y), then the method proceeds to 704. Otherwise, if the OAT and RAT sensors are faulted and the economizer controller cannot function, then the method continues to step 716 and on to step 708 (see below).

At step 704 the method continuously monitors sensors to measure the OAT, RAT, and MAT and compute the OAF (described above). After step 704, the method proceeds to step 705. At step 705 the method checks if the OAT is less than the AC Control Temperature (ACT) or Variable Economizer-drybulb Setpoint Temperature (VEST). The ACT (or VEST) is based on at least one occupancy indicator selected from the group consisting of: an occupancy sensor signal, a geofencing signal, or an occupancy schedule (see previous description). The ACT or VEST may be adjusted up or down to allow conventional economizer cooling with the HVAC fan operating and fully open damper position to satisfy the call for cooling. During unoccupied periods with fewer people in the building and less of lights/equipment turned on, the ACT or VEST can be adjusted up to allow more economizer cooling to satisfy the call for cooling without AC compressor operation (i.e., preferably OAT<66 to 69 F).

If step 705 is Yes (Y), and the OAT is less than or equal to the ACT which may be the VEST, then the method proceeds to step 758. At step 758, the FDD CDC method corrects a default High-limit Shut-off Temperature (HST) and/or supersedes the HST deadband temperature (1 F or 2 F deadband or default 62 F HST) to fully open the damper. After step 758, the method proceeds to step 706. At step 706, the method provides economizer cooling with the damper fully open (or modulated during cold weather) using the HVAC fan without the first-stage DX AC compressor. If the thermostat call for cooling is not satisfied within a 2 to 60 minutes AND the CST increases by 3 F above the setpoint (or 2 F deadband above upper differential), then the thermostat second-stage cooling signal (Y2-I) is energized and the known prior art economizer controller will energize the first-stage signal (Y1) to energize the first-stage DX AC compressor. Energizing the first-stage signal (Y1) to operate the DX AC system (including the first-stage DX AC compressor and HVAC fan) will only happen if the economizer receives the thermostat second-stage cooling signal (Y2) signal.

If step 705 is No (N), OAT is not less than or equal to the AC control temperature, then the method proceeds to step 707. At step 707, the FDD CDC method detects whether or not the OAT is greater than the ACT and the OAT is less than or equal to the HCT at the beginning of or during a call for cooling. Alternatively, at step 707, the FDD CDC method detects whether or not the OAT is less than or equal to the HST at the beginning of or during a thermostat call for cooling, and if Yes (Y).

If step 707 is Yes (Y), then the FDD CDC method proceeds to step 755 and determines whether or not the thermostat second-stage cooling signal is energized. If step 755 is No (N), the thermostat second-stage cooling signal is not energized, then the FDD CDC method proceeds to 761 and corrects the HST fault (default or user-selected HST setting below the HST or the HCT) and/or supersedes the HST deadband delay and fully opens the damper to enable the economizer cooling otherwise precluded or delayed by the HST fault or the HST delay. After step 761, the FDD CDC method proceeds to step 718. If step 755 is Yes (Y), the method proceeds to step 757.

At step 757, the FDD CDC method supersedes an economizer-second-stage time delay and proceeds to step 761. At step 761 the FDD CDC method corrects the default HST and/or supersedes the HST deadband (1 or 2 F HST deadband or default 62 F HST) which prevent the damper from fully opening. After step 761, the method proceeds to step 718.

At step 718, the FDD CDC method corrects the at least one fault or supersedes the at least one delay selected from the group consisting of: an HST fault, an HST deadband delay, a thermostat second-stage time delay, a thermostat second-stage temperature deadband delay, an economizer second-stage time delay, and an economizer second-stage time temperature delay, wherein the at least one fault or at least one delay is used to determine when to energize the economizer cooling or at least one AC compressor (i.e., first-stage or second-stage). The correcting or superseding comprises: energizing an economizer actuator to move a damper to a fully open damper position for an HVAC fan to provide the economizer cooling and energizing at least one AC compressor selected from the group consisting of: a first-stage AC compressor (Y1), and a second-stage AC compressor (Y2) otherwise precluded or delayed by the at least one fault or the at least one delay.

If step 707 is No (N), where the OAT is greater than the HCT, then the method proceeds to Step 708. At step 708, the FDD CDC method energizes the first-stage AC compressor and sets the damper to a minimum position to provide a minimum outdoor airflow to the conditioned space to satisfy the ASHRAE 62.1 minimum Indoor Air Quality (IAQ) requirements. Optionally, the FDD method may command the economizer actuator to modulate the damper position from a closed to fully open damper position based on a Demand Control Ventilation (DCV) control comparing a CO2 concentration measurement to an indoor air CO2 control threshold. The CO2 control threshold is typically 1200 ppm (per ASHRAE 62-2019, page 38 "maintaining a steady-state CO2 concentration in a space no greater than about 700 ppm above outdoor air levels will indicate that a substantial majority of visitors entering a space will be satisfied with respect to human bioeffluents (body odor). CO2 concentrations in acceptable outdoor air typically range from 300 to 500 ppm." 1200 ppm CO2 threshold equals 700 ppm above the 500 ppm outdoor CO2 concentration). After step 708, the FDD CDC method proceeds to step 709.

At step 709, the FDD CDC method determines whether or not the thermostat second-stage cooling signal is energized. If step 709 is No (N), the thermostat second-stage cooling signal is not energized, then the FDD CDC method proceeds to step 710 to check whether or not the damper position sensor indicates the dam per position is OK and at the correct position or stuck in a different position (see below). If step 709 is Yes (Y), the thermostat second-stage cooling signal is energized, then the FDD CDC method proceeds to step 759 and supersedes the economizer-second-stage time delay and for an HVAC system with two (or more) AC compressors (first-stage, second-stage, etc.). At step 759, for an HVAC system with two (or more) AC compressors (first-stage, second-stage, etc.), the FDD CDC method supersedes the economizer second-stage cooling signal time delay which prevents the thermostat second-stage cooling signal from energizing the 2nd-stage AC compressor (or higher stages). At step 759, the FDD CDC method may comprise superseding the second-stage cooling signal time delay by reducing the economizer second-stage cooling signal time delay, and in some instances, setting the economizer second-stage cooling signal time delay to zero.

At step 710, the FDD CDC method checks if the damper position is okay and within a tolerance (for example +/−5%) of the commanded position as determined by a magnetometer MEMS sensor checking if the dampers are in the correct position (within +/−5%)? If step 710 is Yes (Y), and the dampers are at the minimum position, the method proceeds to step 712 and continues to energize the AC compressor. If step 710 is No (N), where the method detects the damper is in an incorrect position, then the method proceeds to step 728. If step 728 is Yes (Y), the dampers are in the closed position, then the method proceeds to step 734 to provide a FDD alarm "Fault: dampers not modulating." From step 734, the method loops back to step 712 to continue economizer cooling. If step 728 is No (N), the magnetometer MEMS device indicates the dampers are not in a closed position, then the method proceeds to step 730.

If step 730 is Yes (Y), the magnetometer MEMS device indicates the dampers are 100% open, then the method proceeds to step 732 and provides a FDD alarm "Fault: economizing when should not (see FIG. 2)" for maintenance, and proceeds to step 712 during the call for cooling. The FDD alarm in step 732 is discussed in FIG. 2. If step 730 is No (N), the dampers are not 100% open the method proceeds to step 736. If step 736 is No (N), the dampers did not move, then the method proceeds to step 734 and provides a FDD alarm "Fault: dampers not modulating (see FIG. 2)" and proceeds to step 712 during a call for cooling. The FDD alarm in step 734 is discussed in FIG. 2. If step 736 is Yes (Y), the method proceeds to step 740.

If step 740 is No (N), the damper position is not at the minimum OAF position, then method proceeds to step 742. If step 742 is Yes (Y), the damper position is greater then the minimum position, then the method proceeds to step 744 and provides a FDD alarm "Fault: excessive outdoor air" entering the conditioned space for maintenance, and proceeds to step 750 to the OAF economizer controller calibration method FIG. 1 to correct this fault in the future when the thermostat is not calling for cooling. During a current thermostat call for cooling, the FDD method proceeds from step 744 to step 712 to continue the cooling process. If step 740 is Yes (Y), the method proceeds to step 748 "Go to HVAC FDD method" (FIG. 2) and loops back to step 702 to continue "thermostat call for cooling." With the AC compressor(s) on and damper in minimum position, the dam. If step 742 is No (N), the damper position not greater than the minimum OAF damper position, then the method proceeds to step 746 to provide a FDD alarm "Fault: inadequate outdoor air" for maintenance, proceeds to step 750 to the OAF economizer controller calibration method FIG. 1 to correct this fault and proceeds to step 702 to continue "thermostat call for cooling." During a current call for cooling, the FDD method may also proceed from step 746 to step 712 (skips previous FDD steps already performed) to continue energizing the first-stage cooling signal Y1 to energize the AC system (including the first-stage DX AC compressor and HVAC fan). If the thermostat second-stage cooling signal (Y2) is active, then the method energizes the second-stage cooling signal Y2 (to energize the second-stage AC compressor and second-stage cooling fan-motor speed, if applicable) and the method proceeds to step 714.

If step 714 is No (N), where OAT and OA RH are not too high (i.e., OAT greater than 105 to 115 F or OA RH greater than 80 to 90%), then the method loops back to 702 to continue cooling until the thermostat call for cooling is satisfied. If step 714 is Yes (Y), then the method goes to step 711 and provides a: "FDD alarm or warning message OAT, outdoor air relative humidity, or outdoor air enthalpy greater than the outdoor air high-limit threshold" and the method proceeds to 713. At step 713, the method closes the dampers by overriding the economizer actuator voltage control signal based on a geofencing or an occupancy sensor signal (OCC). Closing the economizer dampers during hot weather improves comfort, reduces energy use, and meets the 10% minimum outdoor airflow requirements specified for most building occupancies in the ASHRAE 62.1-2019 Standard Ventilation for Acceptable Indoor Air Quality (discussed above). After step 713, the method proceeds to step 715. The method for method for sealing the economizer perimeter gap is shown in FIG. 17.

At step 715, the FDD method checks if the SAT is too warm (i.e., above 65 F) based on monitoring the SAT using a temperature sensor. If step 715 is No (N) the SAT is not too warm indicating the DX AC compressor is able to meet the SAT temperature requirement, then the method loops back to 701 to continue cooling until the thermostat call for cooling is satisfied. If step 715 is Yes (Y), then the method proceeds to step 748 to go to the HVAC FDD Method FIG. 2 to determine if another cooling fault is causing the SAT to be too warm. The HVAC FDD Method is performed in realtime and will provide FDD alarms if the sensors are okay in step 716.

After step 718 (FDD CDC method fully opens economizer with HVAC fan and AC compressor(s)) or after step 706 (economizer cooling with the HVAC fan), the method continues to step 720. At step 720, the magnetometer MEMS sensor checks if the economizer damper is fully open or modulating? If step 720 is No (N), then the FDD CDC method proceeds to step 724 and provides a FDD alarm "Fault: not FDD CDC or economizing when should." The method then loops back to step 722 to continue the economizer or FDD CDC method with whatever damper position is provided.

If step 720 is Yes (Y), the magnetometer MEMS sensor shows dampers are fully open or modulating properly, then the FDD CDC method proceeds to step 722.

If step 722 is Yes (Y), the OAT is less than the RAT or the HCT and the OAT is greater than the LEST or VEST and the thermostat first-stage cooling signal (Y1) is active with no thermostat second-stage cooling signal (Y2), then the FDD CDC method loops back to step 701 and continues to provide FDD CDC until the thermostat call for cooling is satisfied (i.e., no thermostat Y1 or Y2 signals).

If step 722 is No (N), the OAT is greater than RAT or the economizer controller receives a thermostat second-stage cooling signal (Y2) where the CST is 2 F (default) above the first-stage thermostat differential (3 F above the setpoint) AND the timer from 2 to 60 minutes has been reached, then the method proceeds to step 712 to energize or continue to energize the first-stage (or second-stage) AC compressor cooling and the FDD cooling delay correction method proceeds to step 714.

In some embodiments, the method includes providing FDD alarms regarding faults. In some embodiments the method communicates FDD alarms using a software application and a wired or wireless (WIFI) communication method to display fault codes or alarms using a built-in display or external software display on a building energy management system, a smart thermostat, an internet-connected computer, an internet telephony system, or a smart phone. The FDD software application may provide maintenance information to check and correct an economizer operation, an economizer damper position, an HVAC system airflow, a refrigerant charge, a heat transfer, an AC compressor(s), a fan motor(s), an expansion device(s) or other aspects of the HVAC system. The FDD embodiment may include a microprocessor with flash memory to store default data and user supplied data, process control signal inputs and process control outputs to provide economizer cooling, mechanical cooling with Direct Expansion (DX) Air Conditioning AC), space heating, minimum outdoor airflow, fan operation, and auxiliary device operation such as an exhaust fan.

The FDD embodiment may include at least one electrical signal input (voltage or current) from a thermostat where the electrical signal input is selected from the group consisting of: a first-stage cooling signal, a second-stage cooling signal, an n-stage cooling signal, a first-stage heating signal, a second-stage heating signal, an n-stage heating signal, a first-stage ventilation fan signal, a second-stage ventilation, a n-stage ventilation fan signal, at least one building occupancy signal, and at least one auxiliary signal. The FDD embodiment may also include at least one sensor input to measure at least one outdoor air, return air, supply air (or mixed air), and conditioned space air characteristic selected from the group consisting of: an air temperature, an air relative humidity, an air enthalpy, an air Carbon Dioxide ($CO_2$) concentration, and an air tracer gas concentration. The FDD embodiment may include at least one electrical signal output (voltage or current) selected from the group consisting of: an economizer actuator signal, a first-stage cooling signal, a second-stage cooling signal, an n-stage cooling signal, a first-stage heating signal, a second-stage heating signal, an n-stage heating signal, a first-stage ventilation fan signal, a second-stage ventilation, a n-stage ventilation fan signal, an exhaust fan signal, and at least one auxiliary signal.

FIG. 5 provides a graph of an economizer actuator voltage (x) versus a corresponding damper position Outdoor Airflow Fraction (OAF) (y) based on laboratory tests of a 4-ton HVAC system (48,000 Btu per hour 13.65 kW) with an uncalibrated economizer and an unsealed economizer perimeter gap (or unsealed gap) according to the known prior art 2. The known prior art control shown as a dashed line 2a assumes economizer controller actuator voltage (x) is proportional to OAF (y) where OAF is 0.0 at a 2V (closed damper position), OAF is 0.20 at a 3.6V (3.6V=0.2*[10V−2V]+2V), and OAF is 1.0 at a 10V fully open damper position. FIG. 5 and the upper right table in FIG. 6 show laboratory test measurements of the following x-versus-y data for the 4-ton HVAC system for the known prior art control 2 with the uncalibrated economizer with the unsealed gap: 1) closed damper position $x_{2c}$=2V and $OAF_{2c}$=$y_{2c}$=0.279 at data point 2c, 2) uncalibrated minimum damper position $x_{2u}$ 3.6V (20% of 8V plus 2V) and $OAF_{2u}$=$y_{2u}$=0.30 at data point 2u, 3) intermediate damper position (between the minimum and fully open position) $x_{2i}$=6V and $OAF_{2i}$=$y_{2i}$=0.392 at data point 2i, and 4) fully open damper position $x_{2o}$=10V and $OAF_{2o}$=$y_{2o}$=0.709 at data point 2o. FIG. 5 shows that the known prior art control 2 actually provides an uncontrolled outdoor airflow of 0.3 or 30% which is significantly greater than the target or minimum 0.2 or 20% OAF for this example which may be specified for the building occupancy per the ASHRAE 62.1 Standard. FIG. 5 shows unexpected laboratory test results indicating a long-felt but unsolved need for a method that meets but does not exceed the ASHRAE 62.1 Standard when a building is occupied and unoccupied.

FIG. 5 also provides data for the same 4-ton HVAC system with the OAF Economizer Controller Calibration (ECC) method including the sealed economizer perimeter gap (or sealed gap) according to the present invention 8. The OAF ECC method 8 seals the economizer perimeter gap and determines a functional relationship between the economizer actuator voltage (x) and the corresponding damper position OAF (y) based on a set of x-versus-y data for at least two or more damper positions selected from the group consisting of: a closed damper position, at least one intermediate damper position, and a fully open damper position. The sealing method comprises applying a sealing material over or into the economizer perimeter gap between the economizer frame and the HVAC system cabinet.

FIG. 5 and the upper left table in FIG. 6 provide laboratory test measurements of the following x-versus-y data for the OAF ECC method control 8 with the sealed gap: 1) closed damper position $x_{8c}$=2V and $OAF_{8c}$=0.15 at data point 8c, 2) calibrated minimum damper position $x_{8t}$ 4.3 V and $OAF_{8t}$=0.20 at data point 8t, 3) intermediate damper position $x_{8i}$=6V and $OAF_{8i}$=0.304 at data point 8i, and 4) fully open damper position $x_{8o}$=10V and $OAF_{8o}$=0.70 at data point 8o. The laboratory test data shown in FIG. 5 demonstrate that the present invention OAF ECC method provides a solution to the unsolved need to meet but not exceed the ASHRAE 62.1 and CEC standard in order to improve cooling and heating efficiency and reduce carbon dioxide emissions that contribute to global warming. The x-versus-y data shown in FIG. 5 are used to calculate the coefficients of a first-order (or greater) line fit, regression equation, or a least-squares matrix-regression equation shown in FIG. 6 for the economizer calibration method control 8 (see FIG. 5).

FIG. 6 shows measurement data for the economizer controller calibration (control 8) with the sealed economizer perimeter gap (top left table). FIG. 6 also shows measurement data for the known prior art uncalibrated economizer (control 2) and unsealed economizer perimeter gap (top right table). The economizer controller calibration method 8 is based on a second order line fit to the set of x-versus-y data. Equation 19 provides a target economizer actuator voltage ($x_t$) of 4.3V based on a target damper position $OAF_t$ ($y_t$) or required $OAF_r$ ($y_r$) of 0.20 or 20% at 8t (see FIG. 5). The known control 2 at 3.6V (based on the economizer controller voltage range of 8V times 20% equals 1.6V plus 2V offset) assumes an OAF of 0.20, but the measured OAF is 0.30 at 2u for the uncalibrated and unsealed economizer perimeter gap. The known prior art incorrectly assumes voltage is proportional to OAF. The known prior art control provides 0.30 OAF or 10% more outdoor airflow than the target $OAF_t$ ($y_t$) of 0.20 at 8t with the calibrated and sealed economizer perimeter gap. FIG. 5 shows that for the 4-ton HVAC system economizer tests, the known control 2 is inefficient and inaccurate due to: 1) excess outdoor airflow through the unsealed economizer perimeter gap, and 2) the economizer actuator voltage (x) not being calibrated to measurements of the corresponding damper positions OAF (y).

FIG. 6 illustrates how a set of x-versus-y data are used in a least squares matrix regression equation method to determine the coefficients of the Eq. 7 least-squares matrix-regression equation. The Eq. 19 quadratic formula provides the method for calculating the economizer actuator voltage (x) based on the corresponding damper position OAF (y). FIG. 6 provides a table of calibrated data for the calibrated economizer controller 8 the set of x-versus-y data based on measurements of the economizer actuator voltage ($x_i$) and corresponding measurements of the damper position $OAF_i$ ($y_i$) data. FIG. 6 shows the measurement data entered into matrix X and matrix Y in Eq. 9. Eq. 9 also provides the element numbers referring to each row and each column of the matrix X, the matrix C and the matrix Y. FIG. 6 shows the inverse-matrix X is multiplied by matrix Y to calculate the coefficient-matrix C quadratic regression coefficients in Eq. 11. FIG. 6 shows how the Eq. 19 quadratic formula uses with the required $OAF_r$ ($y_r$) of 0.2 to calculate the target economizer actuator voltage ($x_t$), measure airflow characteristics, and calculate a target damper position $OAF_t$ ($y_t$) within a tolerance (for example +/−5%) of the required minimum outdoor airflow or required $OAF_r$ ($y_r$) (per ASHRAE 62.1) from x-versus-y measurements per step 100 through step 129 of FIG. 1.

FIG. 5 and FIG. 6 show how the economizer calibration method is used to determine the functional relationship and verify that the target damper position $OAF_t$ ($y_t$) is preferably within an acceptable tolerance of the required outdoor airflow fraction. The economizer calibration method is preferably performed with the economizer perimeter gap sealed to reduce unintended and uncontrolled outdoor airflow and when the difference between OAT and RAT is at least 10 F and preferably greater than 20 F. The economizer calibration method is preferably performed to obtain a set of x-versus-y data for at least three damper positions selected from the group consisting of: a closed damper position, at least one intermediate damper position, and a fully open damper position. The at least one intermediate damper position measurement is preferably positioned close to the middle of the economizer actuator voltage range (i.e., 6 V if the offset is 2V and closed position is 2V and the fully open position is 10V) to provide an upward-opening regression curve with a positive "a" coefficient. Measuring multiple intermediate damper positions will provide a more accurate calibration curve. For HVAC systems with multiple-speed or variable-speed fan motors, the x-versus-y measurements should be made at each of the fan-motor speeds to provide a complete economizer calibration database for a set of x-versus-y data.

FIG. 7 provides calculations of the FDD CDC savings from correcting the known prior art default 62 F High-limit Shut-off Temperature (HST) (63 F minus 1 F deadband), and superseding the known prior art −1 F and −2 F HST deadband delays. The present invention FDD CDC moves the damper to the fully open position when OAT is less than or equal to HST and closes the damper when OAT increases to greater than or equal (HST plus 2 F). The FDD CDC method moves the damper to the fully open position and energizes at least one AC compressor when OAT is greater than the ACT and OAT is less then or equal to the HCT. Savings are based on comparing the same building with the present invention FDD CDC HST of 71 F for CZ06 and HST of 75 F for CZ13 and CZ15. The FDD CDC HST values are referenced to the ASHRAE 90.1 and CEC Building Energy Efficiency Standards. The calculations are based on hourly simulations of the annual energy use for a commercial retail building prototype using the DOE-2.2 building energy analysis program (LBNL 2014).

Known economizer controllers use a 2 F deadband to reduce or eliminate "hunting" where the economizer opens and closes dampers multiple times during a call for cooling when the OAT is vacillating above or below the HST. The FDD CDC method prevents economizer "hunting," and also prevents overshooting the HCT when the damper is in the fully open position, by superseding at least one thermostat second-stage time/temperature delay and energizing an AC compressor otherwise delayed by the at least one thermostat second-stage time/temperature delay. By energizing the AC compressor when the damper is in the fully open position, the FDD CDC method is able to quickly satisfy the call for cooling and prevent hunting and overshooting. FIG. 7 shows the FDD CDC method provides average savings of 1.3 to 12.5%. The average savings assume 50% weighting for correcting the known prior art default 62 F HST, 45% weighting for correcting the −1 F HST deadband, and 5% for correcting the −2 F HST deadband. The savings for correcting the default 62 F HST are 2.8 to 23.8% savings, savings for correcting the −1 F HST deadband are −0.1% to 1%, and savings for correcting the −2 F HST deadband are −0.1 to 2.3%. In the hotter climate zones (CZ13 and CZ15), the 75 F HST recommended by the ASHRAE 90.1 and the CEC Building Energy Efficiency Standards requires 0.1% more cooling energy compared to 74 F or 73 F HST (i.e., −1 F or −2 F deadband delays). The known prior art −1 F to −2 F deadband delays cannot be changed by user inputs. The known prior art reduces cooling capacity, efficiency, and occupant comfort. The FDD CDC method provides a solution to resolve these problems.

FIG. 8 provides calculations of the FDD CDC method savings for an HVAC system with an economizer based on hourly building energy simulations of a commercial retail building when the building is occupied. The building energy simulations are based on the US Department Of Energy (DOE) DOE-2.2 building energy analysis program (LBNL 2014). The DOE-2 building energy analysis program is used to predict the energy use and cost for residential and commercial buildings based on a description of the building layout, constructions, usage, lighting, equipment, and HVAC systems. The FDD CDC savings are calculated using the following heat balance equations to determine how much extra DX AC compressor energy is required to remove heat from the room air due to the thermostat second-stage time delay ($t_d$) or thermostat second-stage dead band ($T_d$). The time delay can vary by 2 to 60 minutes and the deadband delay can vary from 2 to 1° F. depending on default settings or user-selected thermostat settings. The net sensible heat removal rate $Q_{net}$ column (col.) g is calculated as follows.

$$Q_{net}=Q_{sc}+Q_e+Q_i \qquad \text{Eq. 46}$$

Where, $Q_{net}$=net DX AC sensible heat removal rate (Btu) (col. g),
$Q_{sc}$=average DOE-2 hourly DX coil sensible cooling (Btu) (col. e),
$Q_e$=average DOE-2 hourly economizer heat removal (Btu) (col. b), and
$Q_i$=average DOE-2 hourly sensible heat load (Btu) added to the room air volume from the building shell, infiltration, and solar radiation as well as internal sensible heat loads generated by occupants, lights, and equipment (col. c).

The peak internal loads are 250 Btu/hour-person from occupants, 5.1 Btu/ft$^2$ (1.5 Watts/ft$^2$) from lighting, and 3.1 Btu/ft$^2$ (1 W/ft$^2$) from equipment. The magnitude of the sensible heat load varies based on the building type and schedules (hour, day, week and month). The retail building is modeled with peak occupancy of 45 people, 6400 ft$^2$ of conditioned sales floor area, 1600 ft$^2$ of conditioned non-sales floor area, 80000 ft$^3$ of total interior volume, 0.25 window-to-wall ratio in sales area (no windows in non-sales area), 25 tons of mechanical AC compressor cooling (300,000 Btu/hr), 9400 cfm airflow (376 cfm/ton), 0.14 OAF when the economizer is closed (2V), 0.3 OAF when the economizer is at the minimum position, and 0.663 OAF when the economizer is fully open (10V).

FIG. 8 shows the economizer average heat removal varies from −4876 at 75 F OAT to 63302 at 63 F OAT (column b), and the sensible cooling load varies from −54363 to −61636 Btu per hour (column c). The following heat balance equation is used to determine the corrected DOE-2 DX AC power input for each hour.

$$e_c=e_{ac}(1-Q_v/Q_{ac}) \qquad \text{Eq. 47}$$

Where, $e_c$=corrected DOE-2 AC power (kWh) (column l),
$e_{ac}$=average DOE-2 hourly DX AC plus fan power (kWh) (column h), and
$Q_v$=−2285 Btu or quantity of heat in the room air volume which caused the CST to increase by the 2 F thermostat deadband (Btu) (column d) calculated as room volume times the air specific heat (0.244 Btu/F-lbm) times the average air density (0.073 lbm/ft$^3$) times 2 F. The FDD Thermostat CDC cooling savings are calculated as follows.

$$\Delta e_{ft}=1-e_{ac}/e_c \qquad \text{Eq. 48}$$

Where, $\Delta e_{ft}$=FDD Thermostat CDC savings occupied FIG. 8 or unoccupied FIG. 9 (column j) (dimensionless).

FIG. 8 indicates that the known prior art economizer controller cannot satisfy the thermostat call for cooling and exceeds the thermostat second-stage time delay and the thermostat second-stage temperature deadband ("Yes" in column f) when the building is occupied and the OAT ranges from 63 F to 75 F. This unresolved issue is caused by the thermostat second-stage time delay and thermostat second-stage temperature deadband delay preventing the thermostat from energizing the second-stage cooling signal for the economizer to energize the first-stage AC compressor to cool the conditioned space and prevent the CST from increasing by 2 F to 4 F. The FDD CDC method supersedes the thermostat second-stage time delay/temperature-deadband delay and energizes the AC compressor with the fully open damper position to allow the HVAC fan to provide a maximum amount of outdoor airflow for cooling when the OAT is greater than the ACT and the OAT less than or equal to least one HCT at the beginning of a thermostat call for cooling. The FDD CDC methods saves 14 to 29% compared to the known prior art control when the building is occupied (column j). Annual savings are 7.2+/−2.9% depending on the commercial building type, HVAC system, occupancy schedule, thermostat, economizer controller, and climate zone.

FIG. 9 provides calculations of the FDD cooling delay correction savings when the building is unoccupied using the same equations discussed above. FIG. 9 shows the sensible cooling load from people, lights, and equipment ranges from −21925 to −23686 Btu per hour (column c), and the economizer heat removal ranges from −4876 at 75 F OAT to 29213 at 69 F OAT. The unoccupied cooling load from people, lights, and equipment is 61% less than the occupied cooling load shown in FIG. 8 (column c). FIG. 9 indicates that the known prior art economizer controller cannot satisfy the thermostat call for cooling and exceeds the thermostat second-stage time delay and the thermostat second-stage temperature deadband ("Yes" in column f) when the building is unoccupied and the OAT ranges from 69 F to 75 F. The FDD CDC method supersedes the thermostat second-stage time delay and the thermostat second-stage deadband delay and energizes the AC compressor and fully opens the damper to provide the maximum amount of outdoor airflow for cooling when the OAT is greater than at least one low-limit control temperature and the OAT less than or equal to least one high-limit control temperature at the beginning of a thermostat call for cooling. The FDD CDC methods saves 12.4 to 16% compared to the known prior art control when the building is unoccupied (column j).

Figure 10:
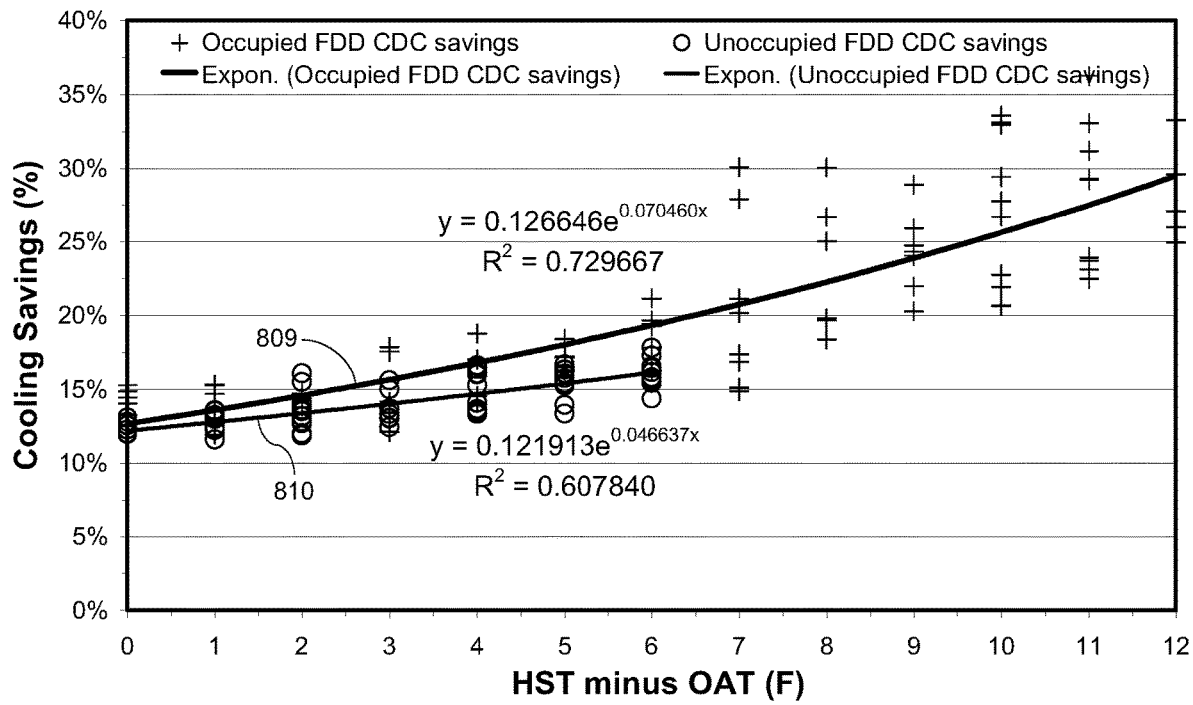
FIG. 10 provides measurements representing the FDD CDC cooling savings versus the temperature difference between the Conditioned Space Temperature (CST) and the OAT for an occupied and unoccupied building.

FIG. 10 shows a curve 809 representing the cooling savings percent (%) versus the High-limit Shut-off Temperature (HST) minus the OAT temperature difference, for an occupied building according to the FDD cooling delay correction. The HST is 75 F and OAT ranges from 63 F to 75 F. FIG. 10 also shows a curve 810 representing the FDD cooling delay correction cooling savings for an unoccupied building. The savings range from 12 to 29% for a HST-OAT temperature difference from 0 F to 12 F. FIG. 10 shows how the FDD cooling delay correction ACT varies depending on the building occupancy. When the building is occupied economizer cooling is able to meet the load up to 63 F or HST-OAT difference of 12 F due to the sensible cooling load from people, lights, and equipment. When the building is unoccupied economizer cooling is able to meet the load up to 69 F or HST-OAT difference of 6 F due to less cooling loads from people, lights, and equipment. Known prior art economizer controllers allow economizer cooling to attempt to satisfy the thermostat call for cooling with a thermostat first-stage time delay of 2 to 60 minutes and temperature deadband of 2 to 4 F. The known prior art control causes the Conditioned Space Temperature (CST) to increase by 2 to 4 F above the setpoint which increases AC compressor operation and energy use and decreases thermal comfort. The present invention FDD CDC method provides an Air-conditioner Control Temperature (ACT) to automatically determine when to increase the cooling capacity delivered to the conditioned space by the AC system depending on the OAT and the building occupancy to maximize cooling efficiency and thermal comfort.

FIG. 10 provides two trendline regression equations.

$$y=0.126646e^{-0.07046x} \qquad \text{Eq. 49}$$

Where, y=occupied FDD CDC plus fan savings based on $\Delta e_{ft}$ in FIG. 8 (dimensionless), and x=HST minus OAT with low-limit 63 F OAT and high-limit OAT of 69 to 80 F depending on climate zone. The low-limit OAT is the temperature below which the economizer can fully meet the sensible load and not the economizer-lock-out temperature.

$$y=0.12191e^{-0.046637x} \qquad \text{Eq. 50}$$

Where, y=unoccupied FDD CDC plus fan savings based on $\Delta e_{ft}$ in FIG. 9 (dimensionless), and x=unoccupied HST minus OAT with low-limit OAT of 69 F and high-limit OAT of 69 F to 80 F depending on climate zone.

Eq. 49 and Eq. 50 can be used to calculate savings for the FDD CDC method superseding the thermostat second-stage time delay and the thermostat second-stage deadband delay. The regression equations can be used with the equation provided in FIG. 13 to calculate cooling savings for the FDD CDC method superseding the thermostat delays and the economizer time delay (see below).

Figure 11:
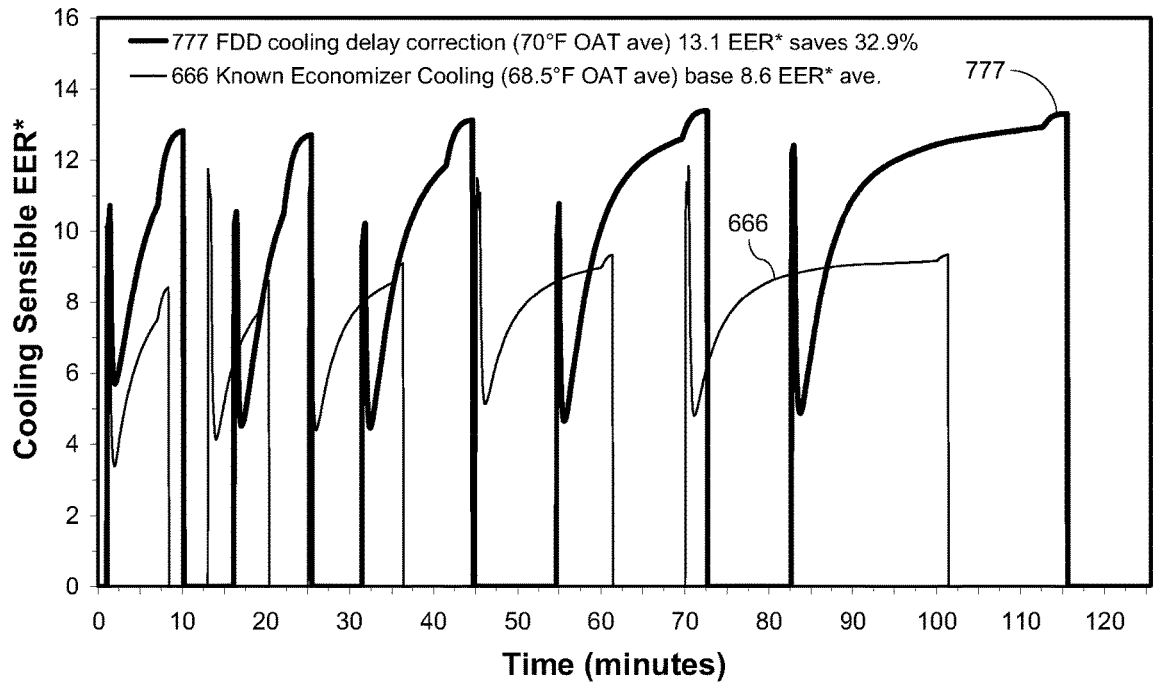
FIG. 11 shows five tests of the known economizer cooling control and five tests of the present invention FDD cooling delay correction method.

FIG. 11 shows five tests of the known economizer cooling control 666 with average application cooling sensible Energy Efficiency Ratio* (EER*) of 8.6 where EER* is the ratio of sensible cooling energy output in British thermal units (Btu) divided by the total energy input in kilo Watt hours (kWh). The known economizer control positions the dampers at the minimum OAF damper position actuator voltage command of 2.8 Volts with the DX AC compressor energized and a fixed fan-off delay operating for 80 seconds after the end of the DX AC cooling cycle.

FIG. 11 also shows five tests of the present invention FDD cooling delay correction control 777 with average application cooling sensible Energy Efficiency Ratio* (EER*) of 13.1 with average EER* improvement of 51.5% and average savings of 32.9%. The FDD cooling delay correction control positions the dampers at the fully open OAF damper position actuator voltage command of 10 Volts with the AC compressor energized and a variable fan-off delay after a cooling cycle based on the air drybulb temperature difference between the MAT and the SAT wherein the MAT is based on a mixture of outdoor air and return air and the fan-off delay operates until the MAT minus SAT drybulb temperature difference is less than 2 F.

FIG. 12 provides a table of laboratory test measurements of the OAT [column a], total power (Watts) [column b], sensible cooling capacity (Btuh) [column c], sensible Energy Efficiency Ratio (EER*s) [column d=c/b], economizer only cooling savings for a HVAC system with an economizer, fully open damper, and HVAC fan [column e], and the present invention FDD Cooling Delay Correction (CDC) savings for a HVAC system with an economizer, fully open damper, and HVAC fan plus a first-stage and a second-stage AC compressor [column f]. The laboratory maintains 75 F drybulb and 62 F wetbulb indoor conditions to emulate an occupied commercial building during the testing period. FIG. 12 shows the economizer only cooling savings [column e] are negative (−25.3%) at 65 F OAT compared to the FDD CDC method which is more efficient at 65 F OAT. The economizer is 11.5% more efficient at 60 F OAT, and 27.3% more efficient at 55 F compared to the FDD CDC method. The FDD CDC cooling method provides cooling savings when the building is occupied during economizer operation from about 63 F to 75 F. The FDD CDC method also provides cooling savings when the building is occupied during mechanical cooling with the economizer damper in the minimum position when the OAT is greater than 75 F OAT.

FIG. 13 shows the economizer-only cooling savings 819 going from 27.3% at 55 F OAT, crossing 0% at about 61.9 F OAT, and going down to −30% at 65.49 F OAT based on data provided in FIG. 12. FIG. 13 also shows the FDD CDC cooling savings 821 going from −1.9% at 55 F OAT to 47.2% at 100 F OAT. The economizer-only cooling savings 819 with fully open damper and the FDD CDC cooling savings 821 with fully open damper plus first- and second-stage AC compressor intersect at 61.054 F with the same savings of 5.45%. The FDD CDC method provides annual savings of approximately 4.9+/−1.1% depending on the commercial building type, HVAC system, economizer and thermostat settings, occupancy schedule, and climate zone. The known prior art economizer energizes the second-stage AC compressor after a default 4 to 120 minute time delay which increases energy use and reduces thermal comfort. The following trendline regression equation can be used to calculate FDD CDC cooling savings for superseding the economizer second-stage time delay.

$$y=0.844407 \, \text{Ln}(x)-3.417134 \qquad \text{Eq. 51}$$

Where, y=the FDD CDC savings for superseding the economizer second-stage time delay (dimensionless), and x=OAT from 55 to 120 F.

Eq. 51 can be used to calculate FDD CDC savings during periods of time when a known prior art economizer controller provides a second-stage time-delay during economizer cooling or AC compressor mechanical cooling. Eq. 51 can also be used with Eq. 49 and Eq. 50 from FIG. 10 to calculate FDD CDC savings from superseding the economizer second-stage time delay and the thermostat second-stage time delay/temperature-deadband delay.

FIG. 13 shows economizer-only cooling savings 819 are negative for OAT greater than 62.5 F when a building is occupied, are not obvious to persons having ordinary skill in the art who assume economizers provide enough cooling to meet commercial building cooling loads when the OAT is between 69 F and 75 F. The California Energy Commission 2019 Building Energy Efficiency Standards require a high-limit economizer drybulb setpoint temperature of 69 F to 75 F based on climate zone.

Figure 14:
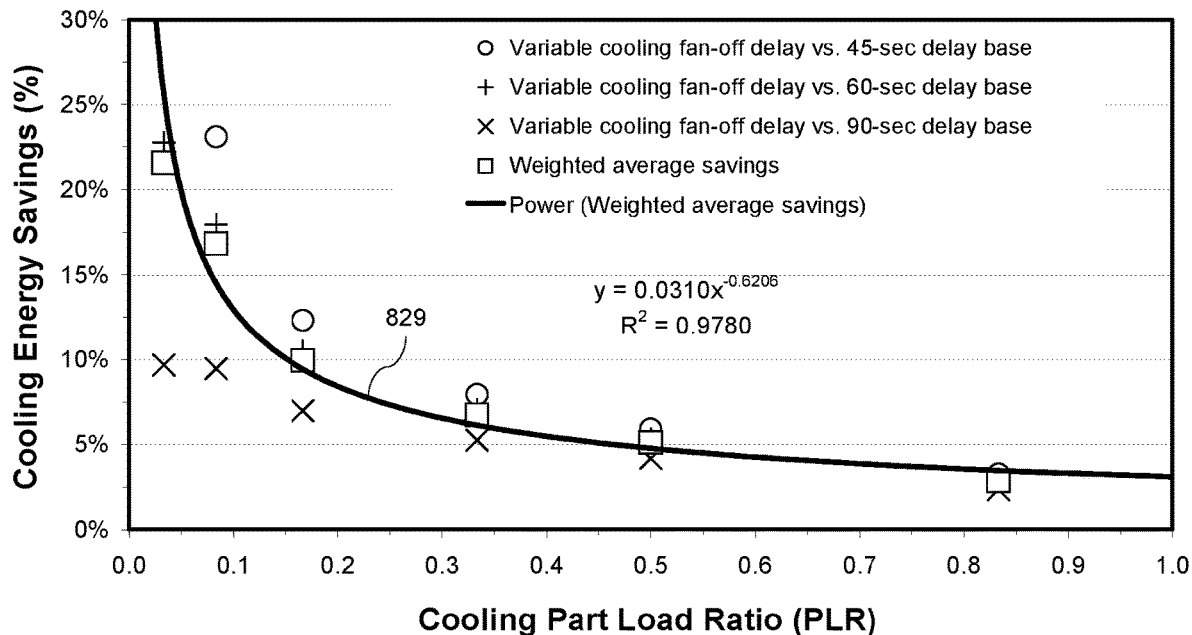
FIG. 14 provides measurements representing the cooling energy savings (%) versus the cooling Part Load Ratio (PLR) for the present invention FDD variable fan-off delay method compared to known fixed fan-off delays of 45, 60, and 90-seconds, where the PLR is defined as the sensible cooling capacity for operating for less than 60 minutes divided by the total sensible cooling capacity for 60 minutes operation.

FIG. 14 provides curve 829 representing a power-function regression curve of the cooling energy savings (%) versus cooling system Part Load Ratio (PLR) for the present invention FDD variable fan-off delay method compared to a known cooling control with a fixed fan-off delay of 45, 60, and 90-seconds. The cooling PLR is defined as the sensible cooling capacity provided by a cooling system operating for less than 60 minutes divided by the total sensible cooling capacity for the cooling system operating for 60 minutes. The FDD variable fan-off delay method energizes an HVAC fan control (G) signal to operate an HVAC fan for a variable fan-off delay after a thermostat call for heating wherein the variable fan-off delay is based on the OAT and at least one temperature selected from the group consisting of: the RAT, the MAT, the SAT, the CST. The MAT varies based on a position of the economizer damper and the OAT and the RAT.

During the cooling variable fan-off delay the economizer damper may be positioned to an intermediate or fully open damper position based on the OAT. The variable fan-off delay after the call for cooling may be based on detecting the OAT is less than or equal to the CST or RAT, and the method further including enabling an economizer controller to position an economizer damper to a fully open position and operating the HVAC fan until the CST or RAT reach at least one threshold selected from the group consisting of: the CST increases above a thermostat lower cooling differential, the CST decreases by 2 F below the thermostat lower cooling differential, the CST or RAT reach a minimum temperature, and the rate of change of the CST or RAT with respect to time reach an inflection point and start to increase. Known prior art economizers do not have an HVAC fan (G) output to energize the HVAC fan. Known fixed fan-off delays are provided by the on-board HVAC system controls or a thermostat, and not the economizer controller. Known fixed fan-off delays are generally less than 90 seconds leaving considerable energy in the HVAC system that is wasted.

Figure 15:
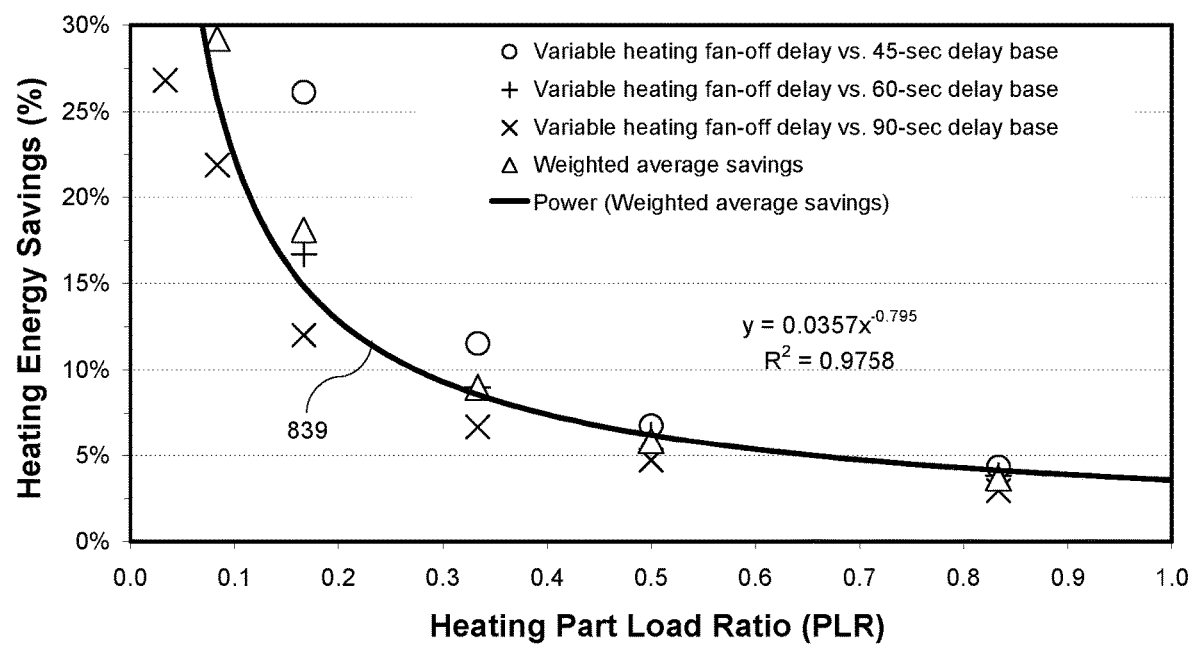
FIG. 15 provides measurements representing the heating energy savings (%) versus the heating system PLR for the present invention FDD variable fan-off delay method compared to known fixed fan-off delays of 45, 60, and 90-seconds, where the PLR is defined as the heating capacity for a heating system operating for less than 60 minutes divided by the total capacity for the heating system operating for 60 minutes.

FIG. 15 provides curve 839 representing a power-function regression curve representing the total heating system energy savings (%) versus heating system PLR for the present invention FDD variable fan-off delay method compared to known fixed fan-off delays of 45, 60, and 90-seconds. The heating PLR is defined as the heating capacity for a heating system operating for less than 60 minutes divided by the total heating capacity for the heating system operating for 60 minutes. The FDD variable fan-off delay is based on an air temperature difference between a MAT and a SAT wherein the MAT is based on a mixture of air at the OAT and the RAT and the MAT varies based on the economizer damper position and the OAT and the RAT. The method energizes the HVAC fan and operates the HVAC fan for the variable fan-off delay until an absolute value of the MAT and SAT difference is between 4 and 8 F.

Figure 16:
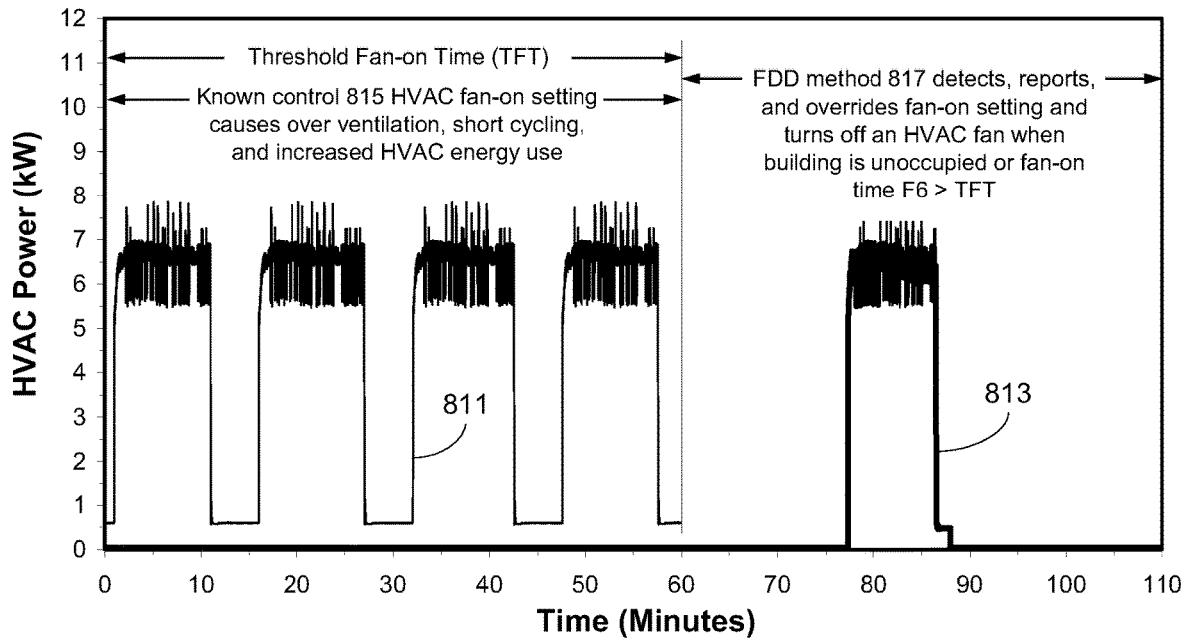
FIG. 16 provides measurements representing the total HVAC system power (kW) versus time of operation for a known control and the present invention Fault Detection Diagnostics (FDD) fan-on method which overrides a continuous fan-on fault.

FIG. 16 shows a curve 811 from 0 to 60 minutes representing the total HVAC system power (kW) including the HVAC fan versus time of operation for a known thermostat 815 fan-on setting causing constant fan power, short cycling, and increased HVAC power and energy consumption. FIG. 16 also shows a curve 813 representing the FDD method 817 operating from 60 to 110 minutes. The FDD method 817 performs at least one method: detecting a fan-on duration control, reporting a fan-on alarm message and a user overriding the fan-on setting or the FDD method overriding the fan-on setting and turning off the HVAC fan for a fraction of a fan-on duration or a fan-on duration schedule when the building is unoccupied or a fan-on setting, a fan-on time, or at least one fan-on duration (F6) is greater than a Threshold Fan-on Time (TFT). FIG. 16 shows the FDD method allows the HVAC fan to operate for a fan-on duration selected by the user which includes four HVAC cycles including the HVAC fan operating for a first time duration 817a of 60 minutes per curve 811. The HVAC fan is used to recirculate air in the conditioned space, and the fan-on duration setting or the fan-on duration schedule is used to operate the HVAC fan continuously or operate the HVAC fan for a fan-on duration independent of a thermostat call for cooling or a thermostat call for heating. The first duration 817a shown as curve 811 may also be referred to as a Threshold Fan-on Time (TFT). The TFT duration may be selected from the group consisting of: a user-selected TFT duration, a fixed TFT duration, a variable TFT duration based on HVAC parameters including the at least one fan-on duration (F6). FIG. 16 also shows curve 813 where the FDD method or the user in response to the fan-on alarm message overrides the fan-on duration and turns off the HVAC fan for a second duration 817b of 17.3 minutes from 60 minutes to 77.3 minutes or 15.7% of the fan-on duration of 110 minutes. The FDD method allows a HVAC cycle and a fan-off delay for a third duration 817c of 12.3 minutes from 77.3 minutes to 88 minutes. The FDD method allows the fan to turn on for a cooling cycle or a heating cycle and also allows the fan to turn on after the FDD method overrides the fan-on duration setting or schedule for a fraction of the fan-on duration. The FDD method or the user in response to the fan-on alarm message overrides the fan-on duration setting and turns off the HVAC fan for a fourth duration 817d of 22 minutes from 88 minutes to 110 minutes or 20% of the fan-on setting duration of 110 minutes. FIG. 16 alternatively shows the HVAC fan-on correction method 817 detecting, reporting the fan-on alarm message, and the user in response to the fan-on alarm message or the FDD method superseding an intermittent fan-on setting (fan-on for a fraction of an hour) and the user or the FDD method reducing the intermittent fan-on duration setting when the building is occupied. The HVAC fan-on correction method may also comprise at least one overriding or superseding selected from the group consisting of: overriding an intermittent fan-on duration setting and turning off the HVAC fan, overriding a fan-on duration setting or schedule and turning off the HVAC fan based on a geofencing or an occupancy sensor signal, superseding the intermittent fan-on duration setting and turning off the HVAC fan for a fraction of the intermittent fan-on duration setting, and superseding an intermittent hourly fan-on duration setting and turning off the HVAC fan for each hour or a fraction of each hour based on a thermostat call for cooling or a thermostat call for heating.

FIG. 17 shows the economizer 783 installed into the HVAC system cabinet 780 and the economizer perimeter gap 785 of the economizer frame where it connects to the HVAC system cabinet. The economizer perimeter gap 785 allows unintended, uncontrolled, and unconditioned outdoor airflow to enter the economizer, HVAC system, and conditioned space whether or not the ventilation fan is operating. The economizer 783 is designed to be considerably smaller than the opening in the HVAC system cabinet in order to allow easy installation and removal. The economizer hood 787 must be removed in order to properly seal the economizer perimeter gap 785.

Virtually all economizers installed on HVAC systems have an economizer perimeter gap 785 between the economizer frame and an opening in the HVAC system cabinet where the economizer is inserted and installed into the HVAC system cabinet 780. The economizer perimeter gap 785 allows unintended, uncontrolled, and unconditioned outdoor airflow to enter the economizer, HVAC system, and conditioned space whether or not the ventilation fan is operating. The economizer hood 787 must be removed in order to properly seal the economizer perimeter gap. Sealing around the perimeter gap of the economizer frame where it connects to the HVAC system cabinet is performed with at least one sealant selected from the group consisting of: an adhesive tape sealant, a UL-181 metal tape sealant, a UL-181A-P/B-FX tape sealant, an adhesive sealant, a mastic sealant, a caulking, a weatherstripping, a hook-and-loop fastener sealing material, a metal or plastic sealing material, and a rubber or flexible material comprising an EPDM, SBR, a silicone, a neoprene rubber, a synthetic rubber. The sealant reduces untended outdoor air leakage through the economizer perimeter frame to prevent unintended outdoor airflow during the off cycle or during the cooling or heating cycle. Sealing the economizer perimeter gap 785 includes sealing the metal surfaces between the economizer frame and the HVAC system cabinet 780 to reduce unintended outdoor airflow and increase cooling and heating efficiency. Sealing the economizer perimeter gap should be performed during installation and setup of an economizer to calibrate the economizer controller actuator voltage and ensure the corresponding damper position OAF requirements are achieved.

Laboratory tests were performed on five economizers installed on five different HVAC systems from three of the largest HVAC and economizer manufacturers to evaluate the difference in outdoor airflow between an unsealed and sealed economizer perimeter gap. The five HVAC systems have cooling capacities ranging from 3 tons (36,000 Btu per hour or 10.55 kW) to 7.5 tons (90,000 Btu per hour or 26.38 kW). Laboratory tests of the five systems found an average OAF of 19.9%+/−4.5% for the closed economizer damper position with an unsealed economizer perimeter gap. Laboratory tests after sealing the economizer perimeter gap found an average Outdoor Airflow Fraction (OAF) of 12.6%+/−1.9% for the closed economizer damper position, providing savings of 7.3+/−2.6% at the closed position. Laboratory tests of the same economizers found an average OAF of 65.9%+/−6.7% for the fully open economizer damper position with an unsealed economizer perimeter gap, and an average OAF of 65.7%+/−4.9% for the fully open damper position with the sealed economizer perimeter gap providing a difference of 0.2%.

If a building requires 20% OAF, then the known prior art economizer controllers would set the economizer actuator at 20% (3.6V=0.2*8V+2V), but most economizers will provide more outdoor airflow at 3.6V due to not being calibrated and having an unsealed economizer perimeter gap. Tests of a 4-ton HVAC system with an uncalibrated economizer controller and unsealed economizer perimeter gap provided 30% OAF at 3.6V minimum position, and tests of the same 4-ton HVAC system with a calibrated economizer controller and sealed economizer perimeter gap provided 20% OAF at a 4.3V minimum position. Tests of the other uncalibrated economizers with the unsealed economizer perimeter gap provided less than 20% OAF at 3.6V indicating that the minimum OAF cannot be met without proper calibration and the sealed economizer perimeter gap to reduce uncontrolled outdoor airflow and provide a functional relationship between the economizer actuator voltage (x) and the corresponding damper position OAF (y).

FIG. 18 shows measurements of OAF versus economizer actuator voltage measurements for economizer #1. The known control 801 assumed OAF is proportional to the economizer actuator voltage. The known control 801 assumes zero (0%) OAF at the 2V closed damper position, and 1.0 (100%) OAF at the 10V maximum or fully open position. FIG. 18 shows the measured OAF with unsealed economizer perimeter gap for the FDD calibration method 802, and the second-order line fit regression equation.

$$y=0.0076x^2-0.0107x+0.1024 \qquad \text{Eq. 52}$$

Where, y=OAF for unsealed economizer perimeter gap (dimensionless), and
x=the economizer actuator voltage (V) for the unsealed economizer perimeter gap.

FIG. 18 also shows the measured OAF with sealed economizer perimeter gap 785 for the FDD calibration method 803, and the second-order line fit regression equation.

$$y=0.0079x^2-0.0131x+0.0673 \qquad \text{Eq. 53}$$

Where, y=OAF for sealed economizer perimeter gap, and
x=the economizer actuator voltage for sealed economizer perimeter gap.

Sealing the perimeter gap 785 reduces the OAF from 0.123 to 0.082 (4.1%) at the 2V closed damper position, but only reduces the OAF from 0.75 to 0.73 (2%) at the 10V maximum or fully open damper position.

Figure 19:
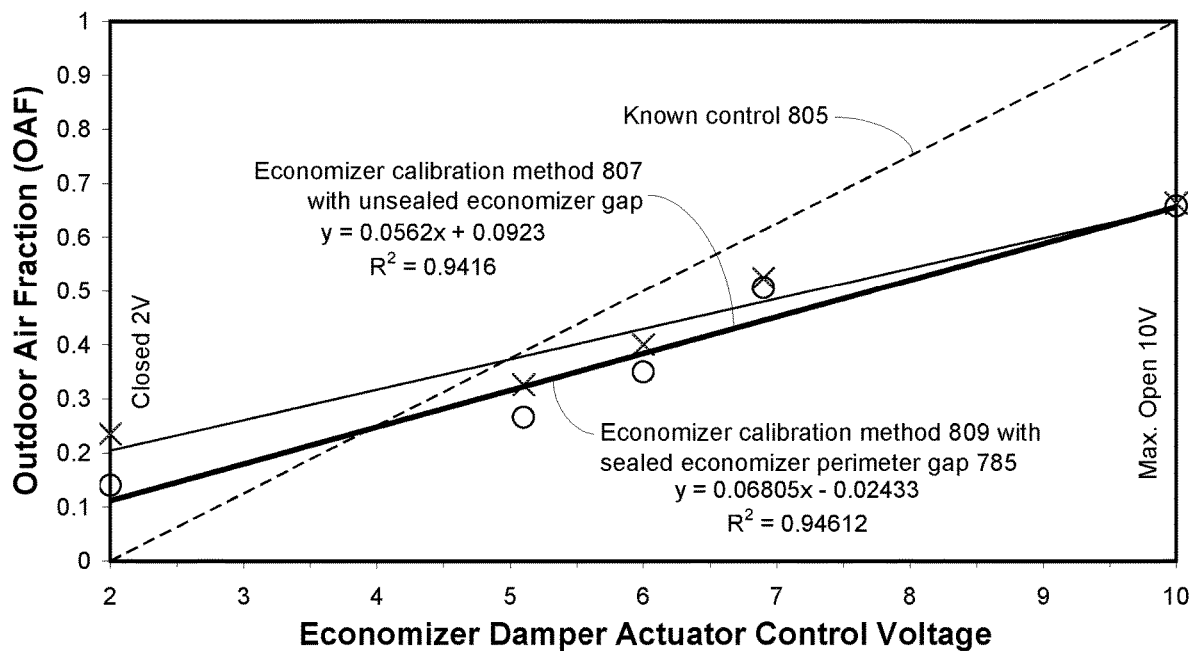
FIG. 19 shows measurements of OAF versus economizer actuator voltage measurements for economizer #5.

FIG. 19 shows measurements of OAF versus economizer actuator voltage measurements for economizer #5. The known control 805 assumed OAF is proportional to the economizer actuator voltage with zero (0%) OAF at the 2V closed position and 1.0 (100%) OAF at the 10V maximum or fully open position. FIG. 19 shows the measured OAF with unsealed economizer perimeter gap for the FDD calibration method 807 and the first-order line fit regression equation.

$$y=0.0563x-0.0923. \qquad \text{Eq. 54}$$

Where, y=OAF for unsealed economizer perimeter gap, and
x=the economizer actuator voltage for unsealed economizer perimeter gap.

FIG. 19 also shows the measured OAF with sealed economizer perimeter gap 785 for the FDD calibration method 809 and the first-order line fit regression equation.

$$y=0.06805x-0.02433 \qquad \text{Eq. 55}$$

Where, y=OAF for sealed economizer perimeter gap, and
x=the economizer actuator voltage for sealed economizer perimeter gap.

Sealing the perimeter gap 785 reduces the OAF from 0.235 to 0.14 (9.5%) at the 2V closed damper position, but only reduces the OAF from 0.663 to 0.658 (0.05%) at the 10V maximum or fully open damper position.

Figure 20:
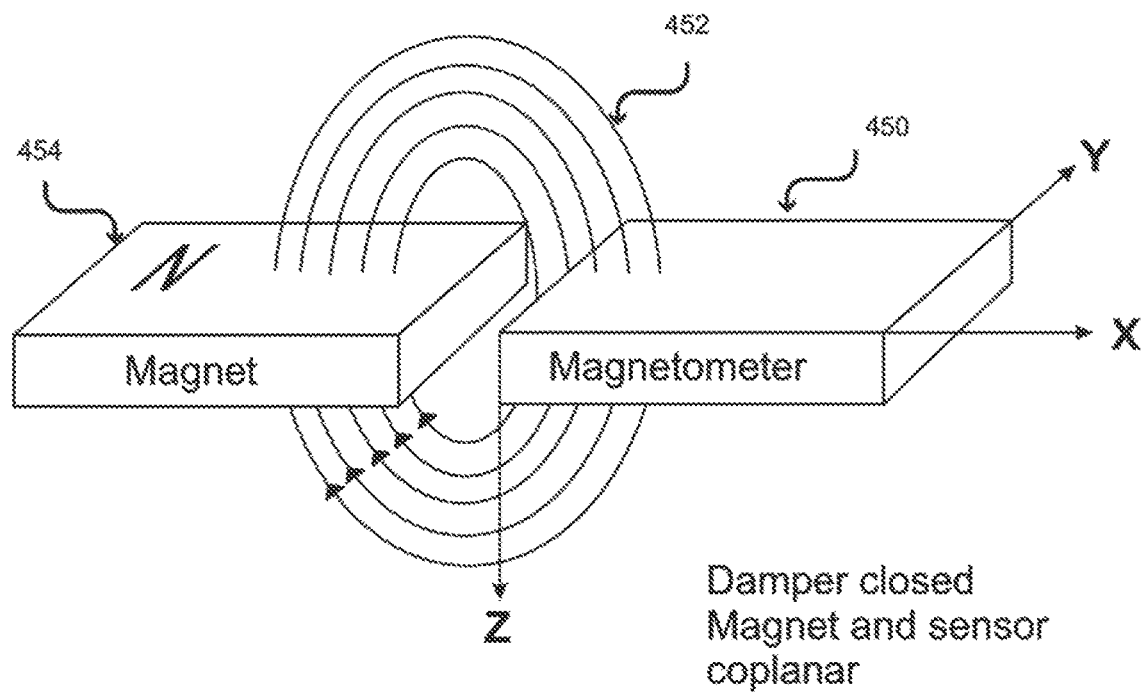
FIG. 20 shows a magnetometer co-planar with a magnet according to the present invention.

FIG. 20 shows a magnetometer 450 co-planar with a magnet 454. The magnetic field generated by the permanent magnet is in the Z plane of the 3-dimensional Micro-Electro-Mechanical Systems (MEMS) magnetometer 450.

Figure 21:
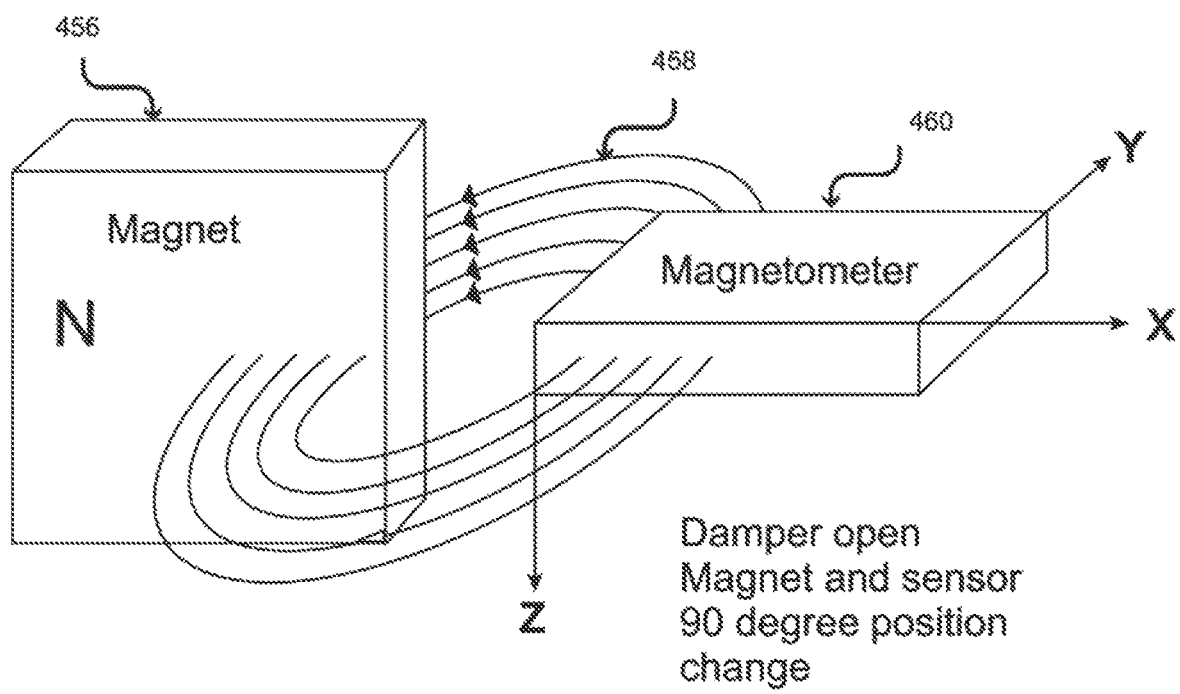
FIG. 21 shows the magnet according to the present invention rotated 90 degrees.

FIG. 21 shows the magnet 456 rotated 90 degrees from the position shown in FIG. 20. The magnetic field is in the Y plane of the 3-dimensional MEMS magnetometer 460. The magnetometer 460 is mounted to a stationary frame of an economizer to allow at least one wire to carry the magnetometer 460 measurement signal to an electronic device or economizer controller embodying the present invention to determine the position of the damper in a 3-dimensional coordinate system.

The Heating, Ventilating, Air Conditioning (HVAC) fan-on correction method comprises: detecting that a HVAC fan is controlled by a fan-on setting or a fan-on schedule; determining that the HVAC fan operating time (F6) is greater than a Threshold Fan-on Time (TFT); and performing at least one action selected from the group consisting of: providing at least one fan-on alarm message, overriding the fan-on setting or the fan-on schedule, turning off the HVAC fan, turning off an ultraviolet lamp after the HVAC fan is turned off, and turning on the ultraviolet lamp when the HVAC fan is turned on. Turning off the HVAC fan may further include waiting 10 to 60 minutes after the HVAC fan is turned off to turn off the ultraviolet lamp. Turning off the HVAC fan may also include turning off an ionizer after the HVAC fan is turned off and turning on the ionizer after the HVAC fan is turned on.

The method may also include at least one action selected from the group consisting of: superseding the fan-on setting or the fan-on schedule and turning off the HVAC fan, superseding and modifying the fan-on setting or the fan-on schedule and turning off the HVAC fan, turning off the HVAC fan for a variable or a fixed time period, skipping the fan-on schedule and not turning on the HVAC fan, turning off the HVAC fan for a fraction of the fan-on setting duration or the fan-on schedule duration, turning off the HVAC fan for 0 to 100% of the fan-on setting or the fan-on schedule, and turning off the HVAC fan for a fraction of time based on a thermostat call for cooling or a thermostat call for heating, turning off the HVAC fan based on an indoor air quality measurement, turning off the HVAC fan based on a geofencing or an occupancy sensor signal, and turning off the HVAC fan based on a user-selected fan-on duration setting or a user-selected fan-off duration schedule setting.

Overriding or superseding the fan-on setting or the fan-on schedule and turning off the HVAC fan may further include at least one action selected from the group consisting of: superseding an intermittent fan-on setting or an intermittent fan-on schedule and turning off the HVAC fan, superseding the intermittent fan-on setting or the intermittent fan-on schedule and turning off the HVAC fan for a fraction of the intermittent fan-on setting duration or the intermittent fan-on schedule duration, superseding the fan-on setting or the fan-on schedule and turning off the HVAC fan based on an indoor air quality measurement, and superseding the fan-on setting or the fan-on schedule and turning off the HVAC fan based on a geofencing or an occupancy sensor signal.

The fan-on setting or the fan-on schedule may include at least one fan-on setting or fan-on schedule selected from the group consisting of: a continuous fan-on setting, a continuous fan-on schedule, an intermittent fan-on setting, and an intermittent fan-on schedule. The HVAC fan-on duration (F6) may be determined based on at least one duration selected from the group consisting of: a continuous fan-on setting duration, a continuous fan-on schedule duration, an intermittent fan-on setting duration, and an intermittent fan-on schedule duration.

Overriding or superseding the fan-on setting or the fan-on schedule may include overriding at least one fan-on setting or fan-on schedule selected from the group consisting of: 24 hours per day and 7 days per week (24×7), 1 to 59 minutes per hour everyday, or a daily or a weekly schedule of continuous or intermittent fan-on setting or fan-on schedule. The method of detecting and turning off the HVAC fan may be based on at least one indoor air quality measurement selected from the group consisting of: an occupancy sensor or geofencing signal measurement, a Carbon Dioxide concentration measurement in parts per million (ppm), a positive or negative ion count measurement in ions per a unit volume, a Volatile Organic Compound (VOC) measurement in ppm, and a virus or bacteria particle concentration measurement per the unit volume.

The fan-on alarm message and the at least one action may be provided after the HVAC fan-on duration F6 is greater than a TFT duration, where the TFT duration is at least one duration selected from the group consisting of: 60 minutes, adjustable from 60 minutes based on occupancy, adjustable from 60 minutes based on the at least one indoor air quality measurement, a user-selected TFT duration, a fixed TFT duration, and a variable TFT duration based on at least one duration selected from the group consisting of: the at least one fan-on duration setting, the at least one fan-on duration schedule, the at least one fan-on duration command, and the at least one fan-on duration. The TFT duration may also be adjustable based on a combination of intermittent fan-on time F6 equivalent to 60 minutes in a 1 to 12 hour window. For example, intermittent fan-on of operation of 5-10 minutes per hour over 1 to 12 hours where the intermittent fan-on operation is reported as a fan-on alarm prior to turning off the HVAC fan. In another embodiment, the fan-on alarm may not be reported prior to the fan-on correction method overriding the fan-on setting or fan-on schedule and turning off the HVAC fan.

The at least one fan-on alarm message may include at least one communication method providing at least one fan-on alarm message selected from the group consisting of: the HVAC fan is turned on continuously, the HVAC fan has been turned on continuously for a monitored length of time, selecting a continuous fan-on setting or a continuous fan-on schedule will use a significant amount energy, are you sure you want to set the HVAC fan to a continuous fan-on setting or a continuous fan-on schedule, select "fan-off" or "fan-on adjust" to turn off the HVAC fan or adjust the HVAC fan-on duration for a fraction of the fan-on duration control, would you like the HVAC fan to be turned off when the building is unoccupied, the HVAC fan will be turned off when the building is unoccupied, and the HVAC fan-on duration setting has been adjusted or turned off. The at least one fan-on alarm message is selected from the group consisting of: a first fan-on alarm message asking the user to confirm, cancel, or override the at least one fan-on duration control selected by the user, a second fan-on alarm message offering the user an option to turn off the HVAC fan for a fraction of the at least one fan-on duration, a third fan-on alarm message warning the user that the at least one fan-on duration control may use a significant amount of energy, a fourth fan-on alarm message reporting an estimated energy impact associated with the at least one fan-on duration control selected by the user, a fifth fan-on alarm message reporting the HVAC fan has been operating for a monitored duration based on the at least one fan-on duration control, a sixth fan-on alarm message offering the user an option to select a first fan-on correction option to automatically override the fan-on duration control and turn off the HVAC fan for a fraction of the at least one fan-on duration to save energy, a seventh fan-on alarm message offering the user an option to select a second fan-on correction option to automatically override the fan-on duration control and turn off the HVAC fan for a fraction of the at least one fan-on duration to save energy based on an occupancy sensor signal or a geofencing signal indicating the conditioned space is unoccupied, an eighth fan-on alarm message reporting when the HVAC fan will be turned off based on the first fan-on correction option or the second fan-on correction option, and a ninth fan-on alarm message reporting when the HVAC fan will be turned on again after being turned off based on the first fan-on correction option or the second fan-on correction option.

Turning off the HVAC fan may be is based on at least one indoor air quality measurement selected from the group consisting of: an occupancy sensor or geofencing signal, a Carbon Dioxide concentration in parts per million (ppm), a positive or negative ion count measurement in ions per a unit volume, a Volatile Organic Compound (VOC) measurement in ppm, and a virus or bacteria particle concentration measurement per the unit volume.

While the invention herein disclosed has been described by means of specific embodiments and applications thereof, numerous modifications and variations could be made thereto by those skilled in the art without departing from the scope of the invention set forth in the claims.

We claim:

1. A Heating, Ventilating, Air Conditioning (HVAC) fan control method, the method comprising:
   detecting a HVAC fan is controlled by at least one fan-on duration control selected by a user;
   wherein the at least one fan-on duration control operates the HVAC fan to recirculate air in a conditioned space for the at least one fan-on duration selected by the user; and
   performing at least one action selected from the group consisting of:
   providing at least one fan-on alarm message prior to overriding the at least one fan-on duration control, and automatically overriding the at least one fan-on duration control selected by the user, the overriding to save energy.

2. The method of claim 1, wherein the at least one fan-on duration control selected by the user is selected from the group consisting of:
- a continuous fan-on duration setting or schedule,
- an intermittent fan-on duration setting or schedule,
- a variable fan-on duration setting or schedule,
- a fan-on duration setting or schedule,
- a recurring fan-on duration setting or schedule, and
- a fractional fan-on duration setting or schedule.

3. The method of claim 1, wherein the automatically overriding the at least one fan-on duration control is selected from the group consisting of:
- turning off the HVAC fan,
- turning off the HVAC fan for a fraction of the at least one fan-on duration,
- turning off the HVAC fan for a variable or a fixed fan-off duration of the at least one fan-on duration,
- not turning on the HVAC fan for at least one of the at least one fan-on duration,
- skipping at least one of the at least one fan-on duration and not turning on the HVAC fan for the at least one fan-on duration,
- turning off the HVAC fan based on a geofencing-signal, and
- turning off the HVAC fan based on an occupancy sensor signal.

4. The method of claim 1, wherein the automatically overriding the at least one fan-on duration control further includes turning off the HVAC fan for a fraction of the at least one fan-on duration based on at least one diagnostic method selected from the group consisting of:
- monitoring the at least one fan-on duration and diagnosing the at least
- one fan-on duration is greater than a Threshold Fan-on Time (TFT) duration,
- monitoring an occupancy sensor signal and detecting the occupancy sensor signal is indicating the conditioned space is unoccupied, and
monitoring a geofencing signal and detecting the geofencing signal is indicating the conditioned space is unoccupied.

5. The method of claim 4, wherein the TFT duration is at least one duration selected from the group consisting of: a user-selected TFT duration, a fixed TFT duration, and a variable TFT duration based on the at least one fan-on duration.

6. The method of claim 1, wherein the at least one fan-on duration is selected from the group consisting of:
- a continuous fan-on duration,
- an intermittent fan-on duration,
- a variable fan-on duration,
- a fan-on duration,
- a recurring fan-on duration,
- a scheduled fan-on duration, and
- a fraction or a percentage of a time duration.

7. The method of claim 1, wherein:
the providing the at least one fan-on alarm message further at least one communication method selected from the group consisting of:
- a visual display message,
- a text message,
- an email message,
- an audio communication message, and
- a voice mail message.

8. The method of claim 1, wherein the at least one fan-on alarm message is selected from the group consisting of:
- a first fan-on alarm message asking the user to confirm, cancel, or override the at least one fan-on duration control selected by the user offering the user an option to override the at least one fan-on duration control selected by the user,
- a second fan-on alarm message offering the user an option to turn off the HVAC fan for a fraction of the at least one fan-on duration,
- a third fan-on alarm message warning the user that the at least one fan-on duration control may use a significant amount of energy,
- a fourth fan-on alarm message reporting an estimated energy impact associated with the at least one fan-on duration control selected by the user,
- a fifth fan-on alarm message reporting the HVAC fan has been operating for a monitored duration based on the at least one fan-on duration control,
- a sixth fan-on alarm message offering the user an option to select a first fan-on correction option to automatically override the fan-on duration control and turn off the HVAC fan for a fraction of the at least one fan-on duration to save energy,
- a seventh fan-on alarm message offering the user an option to select a second fan-on correction option to automatically override the fan-on duration control and turn off the HVAC fan for a fraction of the at least one fan-on duration to save energy based on an occupancy sensor signal or a geofencing signal indicating the conditioned space is unoccupied,
- an eighth fan-on alarm message reporting when the HVAC fan will be turned off based on the first fan-on correction option or the second fan-on correction option, and
- a ninth fan-on alarm message reporting when the HVAC fan will be turned on again after being turned off based on the first fan-on correction option or the second fan-on correction option.

9. The method of claim 1, wherein the automatically overriding the at least one fan-on duration control comprises turning off the HVAC fan based on a geofencing or an occupancy sensor signal.

10. A Heating, Ventilating, Air Conditioning (HVAC) fan-on correction method, the method comprising:
detecting a HVAC fan is controlled by at least one fan-on duration control selected by a user;
wherein the at least one fan-on duration control operates the HVAC fan to recirculate air in a conditioned space for at least one fan-on duration selected by the user; and
automatically overriding the at least one fan-on duration control selected by the user based on a geofencing signal or an occupancy sensor signal.

11. The method of claim 10, wherein the at least one fan-on duration control selected by the user is selected from the group consisting of:
- a continuous fan-on duration setting or schedule,
- an intermittent fan-on duration setting or schedule,
- a variable fan-on duration setting or schedule,
- a fan-on duration setting or schedule,
- a recurring fan-on duration setting or schedule, and
- a fractional fan-on duration setting or schedule.

12. The method of claim 10, wherein the automatically overriding the at least one fan-on duration control is selected from the group consisting of:
- turning off the HVAC fan,
- turning off the HVAC fan for a fraction of the at least one fan-on setting duration,
- turning off the HVAC fan for a variable or a fixed fan-off duration of the at least one fan-on duration,
    - not turning on the HVAC fan for at least one of the at least one fan-on duration, skipping at least one of the at least one fan-on duration and not turning on the HVAC fan for the at least one fan-on duration,
    - turning off the HVAC fan based on a geofencing signal, and turning off the HVAC fan based on an occupancy sensor signal.

13. The method of claim 10, wherein the at least one fan-on duration is selected from the group consisting of:
- a continuous fan-on duration,
- an intermittent fan-on duration,
- a variable fan-on duration,
- a fan-on duration,
- a recurring fan-on duration,
- a scheduled fan-on duration, and
- a fraction or a percentage of a time duration.

14. The method of claim 10, wherein the automatically overriding the at least one fan-on duration control further includes turning off the HVAC fan for a fraction of the at least one fan-on duration based on at least one diagnostic method selected from the group consisting of:
- monitoring the fan-on duration and diagnosing the at least one fan-on duration is greater than a Threshold Fan-on Time (TFT) duration,
- monitoring an occupancy sensor signal and diagnosing the occupancy sensor signal is indicating the conditioned space is unoccupied, and
- monitoring a geofencing signal and diagnosing the geofencing signal is indicating the conditioned space is unoccupied.

15. The method of claim 14, wherein:
- the turning off the HVAC fan for a fraction of the at least one fan-on duration is based on diagnosing the at least one fan-on duration is greater than the TFT duration; and
- the TFT duration is at least one duration selected from the group consisting of: a user-selected TFT duration, a fixed TFT duration, and a variable TFT duration based on the at least one fan-on duration.

16. The method of claim 10, wherein the automatically overriding the at least one fan-on duration control comprises turning off the HVAC fan based on a geofencing or an occupancy sensor signal.

17. A Heating, Ventilating, Air Conditioning (HVAC) fan-on correction method, the method comprising:
- detecting a HVAC fan is controlled by at least one fan-on duration control selected by a user;
- wherein the at least one fan-on duration control operates the HVAC fan to recirculate air in a conditioned space for at least one fan-on duration; and
- providing at least one fan-on alarm message indicating that the at least one fan-on duration control selected by the user may increase energy use.

18. The method of claim 17, wherein:
- the providing the at least one fan-on alarm message further at least one communication method selected from the group consisting of:
    - a visual display message,
    - a text message,
    - an email message,
    - an audio communication message, and
    - a voice mail message.

19. The method of claim 17, wherein the at least one fan-on duration control is selected from the group consisting of:
- a continuous fan-on duration setting or schedule,
- an intermittent fan-on duration setting or schedule,
- a variable fan-on duration setting or schedule,
- a fan-on duration setting or schedule,
- a recurring fan-on duration setting or schedule, and
- a fraction of a fan-on duration setting or schedule.

20. The method of claim 17, wherein the at least one fan-on alarm message indicating that the at least one fan-on duration control selected by the user may increase energy use further includes the at least one fan-on alarm message selected from the group consisting of:
- a first fan-on alarm message offering the user an option to override the at least one fan-on duration control selected by the user,
- a second fan-on alarm message offering the user an option to turn off the HVAC fan for a fraction of the at least one fan-on duration,
- a third fan-on alarm message asking the user to confirm or cancel the at least one fan-on duration control selected by the user,
- a fourth fan-on alarm message reporting an estimated energy impact associated with the at least one fan-on duration control selected by the user,
- a fifth fan-on alarm message reporting the HVAC fan has been operating for a monitored duration based on the at least one fan-on duration control,
- a sixth fan-on alarm message offering the user an option to select a first fan-on correction option to automatically override the fan-on duration control and turn off the HVAC fan for a fraction of the at least one fan-on duration to save energy,
- a seventh fan-on alarm message offering the user an option to select a second fan-on correction option to automatically override the fan-on duration control and turn off the HVAC fan for a fraction of the at least one fan-on duration to save energy based on an occupancy sensor signal or a geofencing signal indicating the conditioned space is unoccupied,
- an eighth fan-on alarm message reporting when the HVAC fan will be turned off or based on the first fan-on correction option or the second fan-on correction option, and
- a ninth fan-on alarm message reporting when the HVAC fan will be turned on again after being turned off based on the first fan-on correction option or the second fan-on correction option.

21. The method of claim 17, wherein the at least one fan-on duration is selected from the group consisting of:
- a continuous fan-on duration,
- an intermittent fan-on duration,
- a variable fan-on duration,
- a fan-on duration,
- a recurring fan-on duration,
- a scheduled fan-on duration, and
- a fraction of a time duration.

* * * * *